(12) United States Patent
Jang et al.

(10) Patent No.: US 12,108,385 B2
(45) Date of Patent: Oct. 1, 2024

(54) METHOD AND APPARATUS FOR UPLINK DATA REPETITIVE TRANSMISSION AND RECEPTION FOR NETWORK COOPERATIVE COMMUNICATION

(71) Applicant: Samsung Electronics Co., Ltd., Suwon-si (KR)

(72) Inventors: Youngrok Jang, Suwon-si (KR); Taehyoung Kim, Suwon-si (KR); Jinhyun Park, Suwon-si (KR); Jinyoung Oh, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/452,018

(22) Filed: Oct. 22, 2021

(65) Prior Publication Data
US 2022/0132534 A1    Apr. 28, 2022

(30) Foreign Application Priority Data

Oct. 22, 2020   (KR) ........................ 10-2020-0137840
Oct. 30, 2020   (KR) ........................ 10-2020-0143768
(Continued)

(51) Int. Cl.
*H04W 72/1268*   (2023.01)
*H04L 1/08*   (2006.01)
*H04L 5/00*   (2006.01)

(52) U.S. Cl.
CPC .......... *H04W 72/1268* (2013.01); *H04L 1/08* (2013.01); *H04L 5/0048* (2013.01)

(58) Field of Classification Search
CPC ......... H04B 7/0456; H04W 72/23; H04L 1/08
See application file for complete search history.

(56) References Cited

U.S. PATENT DOCUMENTS 10,863,494 B2 * 12/2020 Zhang ..................... H04L 5/005
10,952,231 B2 *  3/2021 Liou .................... H04W 72/046
(Continued)

FOREIGN PATENT DOCUMENTS

EP          2723012 A1      4/2014
KR    10-2021-0083845 A    7/2021
(Continued)

OTHER PUBLICATIONS

Supplementary European Search Report dated Jun. 6, 2023, in connection with European Patent Application No. 21883326.7, 12 pages.
(Continued)

*Primary Examiner* — Yee F Lam

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, smart retail, security and safety services. Various embodiments of the disclosure provide a method for repeatedly transmitting/receiving uplink data in a network cooperative communication system, and an apparatus capable of performing the same.

10 Claims, 28 Drawing Sheets

(30) Foreign Application Priority Data

Feb. 3, 2021 (KR) .................. 10-2021-0015647
May 10, 2021 (KR) .................. 10-2021-0060284

(56) References Cited

U.S. PATENT DOCUMENTS

| | | | |
|---|---|---|---|
| 2018/0324793 A1 | 11/2018 | Kim et al. | |
| 2019/0281588 A1* | 9/2019 | Zhang | H04B 7/0404 |
| 2020/0083939 A1 | 3/2020 | Park et al. | |
| 2021/0144720 A1* | 5/2021 | Xu | H04W 80/02 |
| 2021/0219246 A1* | 7/2021 | Xu | H04W 52/325 |
| 2021/0226680 A1* | 7/2021 | Khoshnevisan | H04L 5/0048 |
| 2021/0336664 A1 | 10/2021 | Yang et al. | |

FOREIGN PATENT DOCUMENTS

| | | |
|---|---|---|
| WO | 2018182381 A1 | 10/2018 |
| WO | 2020143526 A1 | 7/2020 |

OTHER PUBLICATIONS

International Search Report and Written Opinion of the International Searching Authority in connection with International Application No. PCT/KR2021/014888 issued Jan. 21, 2022, 6 pages.
Apple Inc., "On Multi-TRP Reliability Enhancement", R1-2006500, 3GPP TSG-RAN WG1 Meeting #102-e, e-Meeting, Aug. 17-28, 2020, 5 pages.
Lenovo et al., "Enhancements on Multi-TRP for PDCCH, PUCCH and PUSCH", R1-2005821, 3GPP TSG RAN WG1 #102-e, e-Meeting, Aug. 17-28, 2020, 7 pages.
CMCC, "Enhancements on Multi-TRP for PDCCH, PUCCH and PUSCH", R1-2006201, 3GPP TSG RAN WG1 #102-e, e-Meeting, Aug. 17-28, 2020, 2 pages.
OPPO, "Enhancements on multi-TRP for PDCCH, PUCCH and PUSCH", R1-2005984, 3GPP TSG RAN WG1 #102-e, e-Meeting, Aug. 17-28, 2020, 3 pages.

* cited by examiner

METHOD AND APPARATUS FOR UPLINK DATA REPETITIVE TRANSMISSION AND RECEPTION FOR NETWORK COOPERATIVE COMMUNICATION

CROSS-REFERENCE TO RELATED APPLICATIONS

This application is based on and claims priority under 35 U.S.C. § 119(a) to Korean Patent Application No. 10-2020-0137840 filed on Oct. 22, 2020, Korean Patent Application No. 10-2020-0143768 filed on Oct. 30, 2020, Korean Patent Application No. 10-2021-0015647 filed on Feb. 3, 2021, and Korean Patent Application No. 10-2021-0060284 filed on May 10, 2021, in the Korean Intellectual Property Office, the disclosures of which are herein incorporated by reference in their entirety.

BACKGROUND

1. Field

The disclosure relates to a method and an apparatus for repeatedly transmitting/receiving uplink data in a network cooperative communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands (e.g., 60 GHz bands), so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems (5th generation communication systems or new radio (NR)) to IoT networks. For example, technologies such as a sensor network, machine type communication (MTC), and machine-to-machine (M2M) communication may be implemented by beamforming, MIMO, and array antenna techniques that are 5G communication technologies. Application of a cloud radio access network (RAN) as the above-described big data processing technology may also be considered an example of convergence of the 5G technology with the IoT technology.

With the advance of wireless communication systems as described above, various services can be provided and accordingly there is a need for schemes to efficiently provide these services.

The above information is presented as background information only to assist with an understanding of the disclosure. No determination has been made, and no assertion is made, as to whether any of the above might be applicable as prior art with regard to the disclosure.

SUMMARY

Various embodiments of the disclosure may provide an apparatus and a method capable of effectively providing a service in a mobile communication system.

In accordance with an aspect of the disclosure, a method performed by a terminal in a communication system is provided. The method of the terminal includes: receiving, from a base station, configuration information of physical uplink shared channel (PUSCH) repetitive transmission using one of codebook based transmission and non-codebook based transmission; receiving, from the base station, downlink control information (DCI) including a field with 2 bits, wherein each of one or more codepoints of the field indicates one or more sounding reference signal (SRS) resource sets, and at least one of one or more SRS resource indicator (SRI) fields or one or more transmission precoding matrix indicator (TPMI) fields; and performing the PUSCH repetitive transmission to the base station based on the configuration information and a codepoint indicated by the field among the one or more codepoints.

In accordance with another aspect of the disclosure, a method performed by a base station in a communication is provided. The method of the base station includes: transmitting, to a terminal, configuration information of PUSCH repetitive transmission using one of codebook based transmission and non-codebook based transmission; transmitting, to the terminal, DCI including a field with 2 bits, wherein each of one or more codepoints of the field indicates one or more SRS resource sets, and at least one of one or more SRI fields or one or more TPMI fields; and receiving, from the terminal, a PUSCH based on the configuration information and a codepoint indicated by the field among the one or more codepoints.

In accordance with another aspect of the disclosure, a terminal in a communication system is provided. The terminal comprises: a transceiver; and a controller configured to: receive, from a base station, configuration information of PUSCH repetitive transmission using one of codebook based transmission and non-codebook based transmission, receive, from the base station, DCI including a field with 2 bits, wherein each of one or more codepoints of the field indicates one or more SRS resource sets, and at least one of one or more SRI fields or one or more TPMI fields, and perform the PUSCH repetitive transmission to the base station based on the configuration information and a codepoint indicated by the field among the one or more codepoints.

In accordance with another aspect of the disclosure, a terminal in a communication system is provided. The base station comprises: a transceiver; and a controller configured to: transmit, to a terminal, configuration information of PUSCH repetitive transmission using one of codebook based transmission and non-codebook based transmission, transmit, to the terminal, DCI including a field with 2 bits, wherein each of one or more codepoints of the field indicates one or more SRS resource sets, and at least one of one or more SRI fields or one or more TPMI fields, and receive, from the terminal, a PUSCH based on the configuration information and a codepoint indicated by the field among the one or more codepoints.

Various embodiments of the disclosure provide a method for repeatedly transmitting/receiving uplink data in a network cooperative communication system, and an apparatus capable of performing the same. A more improved performance gain may be obtained therethrough.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
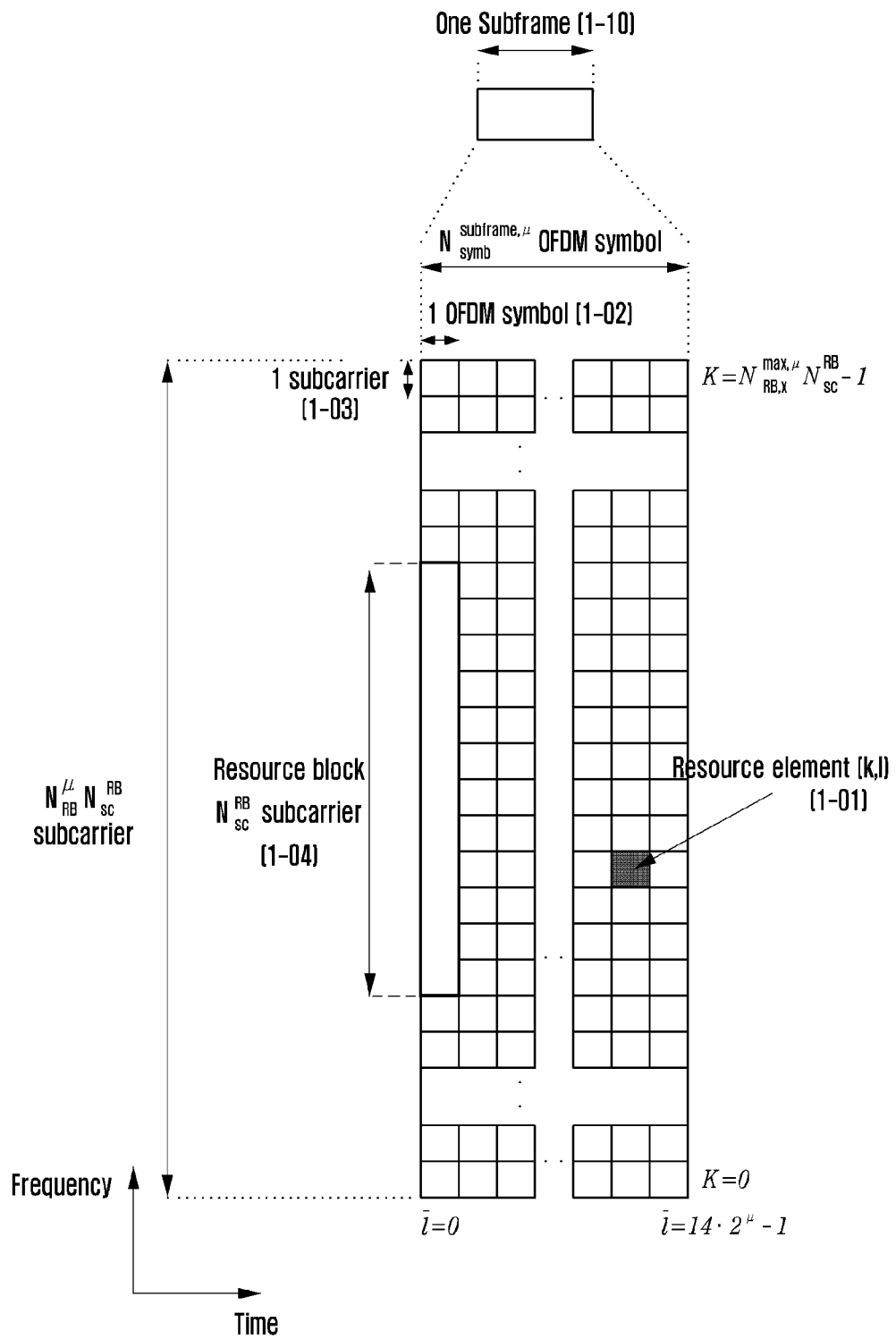
FIG. 1 illustrates a basic structure of a time-frequency domain in a wireless communication system according to an embodiment of the disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have been developed from wireless communication systems providing voice centered services to broadband wireless communication systems providing high-speed, high-quality packet data services, such as communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.16e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, a 5G communication system has to be able to freely reflect various requirements of a user and a service provider, and thus services satisfying various requirements at the same time need to be supported. The services considered for the 5G communication system include enhanced mobile broadband (eMBB), massive machine-type communication (mMTC), ultra-reliability low latency communication (URLLC), and the like.

eMBB aims to provide a higher data transmission rate than a data transmission rate supported by the LTE, LTE-A, or LTE-Pro. For example, in the 5G communication system, eMBB may be able to provide a peak data rate of 20 Gbps in the DL and a peak data rate of 10 Gbps in the UL from the viewpoint of one base station. In addition, the 5G communication system may provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and devices to provide communication functions. In addition, because the terminals supporting mMTC are more likely to be positioned in shaded areas not covered by a cell, such as a basement of a building due to nature of services, the terminals require a wider coverage than other services provided by the 5G communication system. The terminals that support mMTC may be configured as inexpensive terminals and require very long battery lifetime, such as 10 to 15 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC may provide very low latency and very high reliability. For example, URLLC-supportive services need to meet an air interface latency of less than 0.5 milliseconds and simultaneously include requirements of a packet error rate of 10-5 or less.

Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the above 5G communication system may be multiplexed in one system and may be transmitted. Here, the services may use different transmission/reception techniques and transmission/reception parameters in order to satisfy different requirements. However, 5G is not limited to the above three services.

Hereinafter, the frame structure of the 5G system will be described in more detail with reference to the drawings.

FIG. 1 illustrates the basic structure of a time-frequency domain, which is a radio resource domain in which data or a control channel is transmitted in a wireless communication system according to an embodiment of the disclosure.

Referring to FIG. 1, the horizontal axis represents a time domain, and the vertical axis represents a frequency domain. A basic unit of resources in the time-frequency domain may be a resource element (RE) 1-01. The resource element 1-01 may be defined by 1 orthogonal frequency division multiplexing (OFDM) symbol 1-02 in a time domain and 1 subcarrier 1-03 in a frequency domain. In the frequency domain, $N_{SC}^{RB}$ (for example, 12) consecutive REs may configure one resource block (RB) 1-04.

Figure 2:
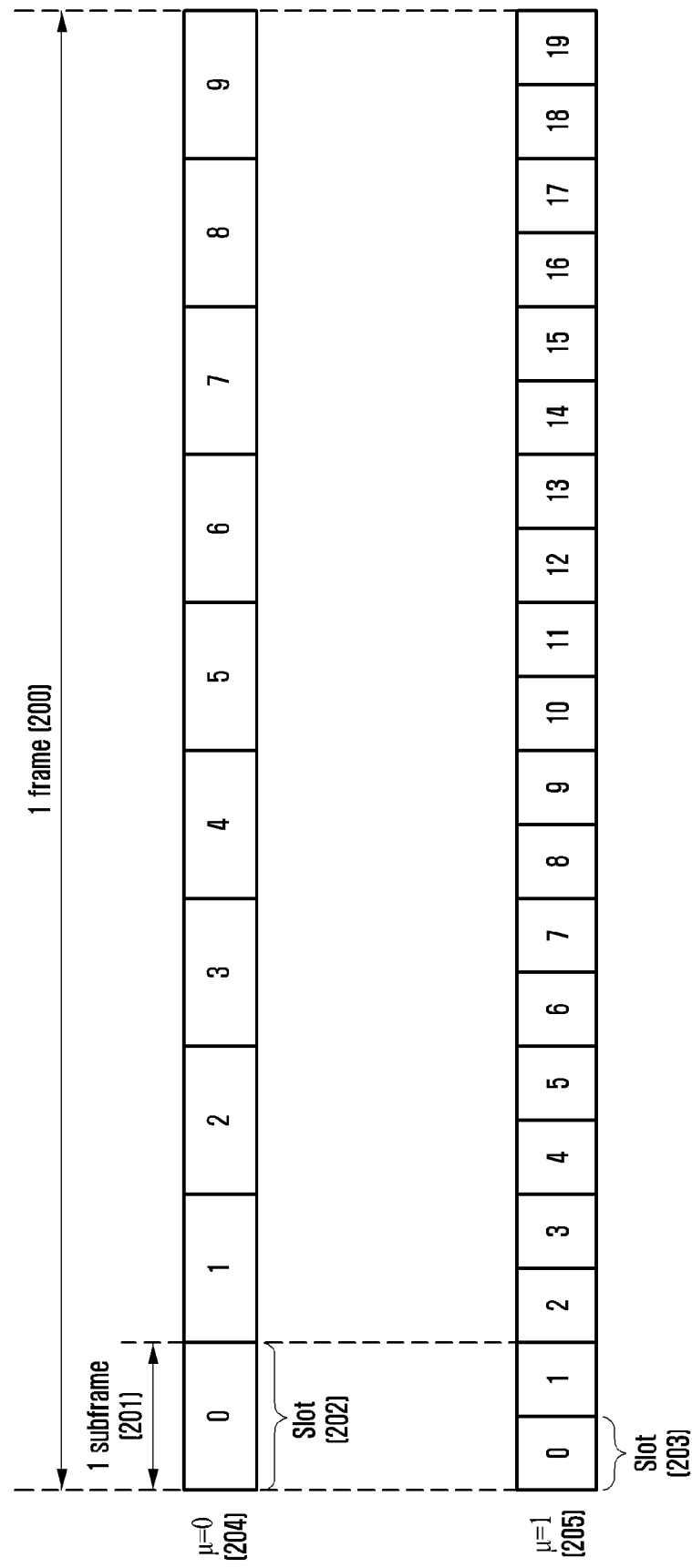
FIG. 2 illustrates a frame, a subframe, and a slot structure in a wireless communication system according to an embodiment of the disclosure.

FIG. 2 illustrates a slot structure considered in a wireless communication system according to an embodiment of the disclosure.

Referring to FIG. 2, an example of a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the number of symbols for one slot ($N_{symb}^{slot}$=14)). One subframe 201 may include one or multiple slots 202 and 203, and the number of slots 202 and 203 per one subframe 201 may differ according to configuration value p. 204 or 205 for a subcarrier spacing. In the example of FIG. 2, a case in which the subcarrier spacing configuration value is p.=0 (indicated by reference numeral 204) and p=1 (indicated by reference numeral 205) is illustrated. If p.=0 (indicated by reference numeral 204), one subframe 201 may include one slot 202, and if p=1 (indicated by reference numeral 205), one subframe 201 may include two slots 203. That is, the number of slots per one subframe ($N_{slot}^{subframe, \mu}$) may differ according to a subcarrier spacing configuration value and accordingly, the number of slots per one frame ($N_{slot}^{frame, \mu}$) may differ. According to each subcarrier spacing configuration μ, $N_{slot}^{subframe,\mu}$ and $N_{slot}^{frame, \mu}$ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, the bandwidth part (BWP) configuration in the 5G communication system will be described in detail with reference to the drawings.

Figure 3:
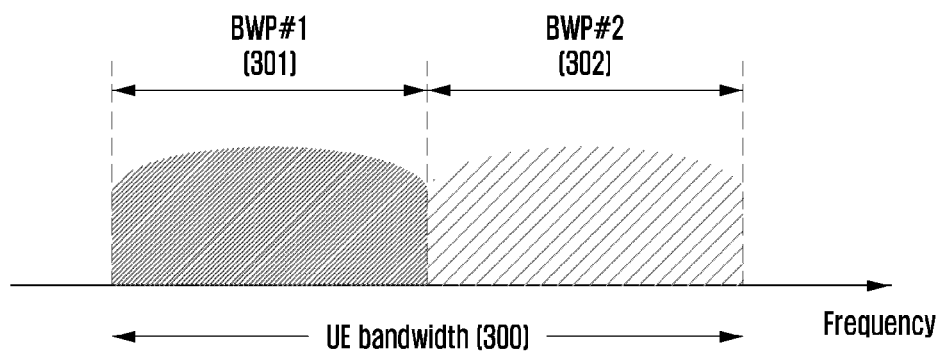
FIG. 3 illustrates an example of configuration a bandwidth part in a wireless communication system according to an embodiment of the disclosure.

FIG. 3 illustrates an example of configuration about a BWP in a wireless communication system according to an embodiment of the disclosure.

Referring to FIG. 3, an example, in which a UE bandwidth 300 is configured by two BWPs, that is, BWP #1 301 and BWP #2 302, is shown. The base station may configure one or multiple BWPs for the UE, and may configure pieces of information as shown in Table 2-1 below for each bandwidth part.

TABLE 2-1

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

An embodiment of the disclosure is not limited to the above example, and in addition to the configuration information, various parameters related to a BWP may be configured in the UE. The pieces of information may be transmitted by the base station to the UE via higher layer signaling, for example, radio resource control (RRC) signaling. At least one BWP among the configured one or multiple BWPs may be activated. Whether to activate the configured BWP may be semi-statically transmitted from the base station to the UE via RRC signaling or may be dynamically transmitted through downlink control information (DCI).

According to some embodiments, a UE before radio resource control (RRC) connection may be configured with an initial bandwidth part (BWP) for initial access from a base station through a master information block (MIB). More specifically, the UE may receive configuration information about a search apace and a control resource set (CORESET) through which the PDCCH for reception of system information required for initial access (which may correspond to remaining system information (RMSI) or system information block 1 (SIB 1)) may be transmitted through the MIB in an initial access operation. The control resource set (CORESET) and search space, which are configured through the MB, may be regarded as identity (ID) 0, respectively. The base station may notify the UE of configuration information, such as frequency allocation information, time allocation information, and numerology for the control resource set #0 through the MM. In addition, the base station may notify the UE of configuration information regarding the monitoring periodicity and occasion for the control resource set #0, that is, configuration information regarding the search space #0, through the MM. The UE may regard the frequency domain configured as the control resource set #0, obtained from the MIB, as an initial BWP for initial access. Here, the identifier (ID) of the initial BWP may be regarded as zero.

The configuration of the BWP supported by 5G may be used for various purposes.

According to some embodiment, a case, in which a bandwidth supported by the UE is less than a system bandwidth, may be supported through the BWP configuration. For example, the base station configures, in the UE, a frequency location (configuration information 2) of the BWP to enable the UE to transmit or receive data at a specific frequency location within the system bandwidth.

Further, according to some embodiment, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

In addition, according to some embodiments, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channels of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data to be transmitted or received has occurred, the UE may transmit or receive data in a BWP of 100 MHz according to an indication of the base station.

In a method of configuring the BWP, the UEs before the RRC connection may receive configuration information about the initial BWP through the master information block (MIB) in the initial connection operation. More specifically, the UE may be configured with a control resource set (CORESET) for a downlink control channel through which downlink control information (DCI) for scheduling a system information block (SIB) may be transmitted from a MIB of a physical broadcast channel (PBCH). The bandwidth of the control resource set configured through the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

Next, a synchronization signal (SS)/PBCH block in 5G will be described.

The SS/PBCH block may refer to a physical layer channel block including a primary SS (PSS), a secondary SS (SSS), and a physical broadcast channel (PBCH). Specifically, the configuration of SS/PBCH block is as follows:

PSS: A signal that serves as a reference for downlink time/frequency synchronization and provides some information of a cell ID;

SSS: A signal that serves as a reference for downlink time/frequency synchronization, and provides the remaining cell ID information that is not provided by the PSS. In addition, the SSS may serve as a reference signal for demodulation of the PBCH; and PBCH: A channel that provides essential system information required for transmission or reception of a data channel and a control channel of a UE. The essential system information may include search space related control information indicating radio resource mapping information of a control channel, scheduling control information for a separate data channel for transmission of system information, and the like.

The SS/PBCH block includes a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may obtain the MIB from the PBCH, and may be configured with the control resource set (CORESET) #0 (which may correspond to the control resource set having the CORESET index of 0) therefrom. The UE may monitor the control resource set #0 under the assumption that a demodulation reference signal (DMRS) transmitted in the selected SS/PBCH block and the control resource set #0 is quasi-colocated (QCLed). The UE may receive system information based on downlink control information transmitted from the control resource set #0. The UE may obtain, from the received system information, configuration information related to a random access channel (RACH) required for initial access. The UE may transmit a physical RACH (PRACH) to the base station by considering the selected SS/PBCH index, and the base station having received the PRACH may obtain information about an SS/PBCH block index selected by the UE. The base station may know which block is selected among the SS/PBCH blocks by the UE, and may know that the control resource set #0 associated therewith is monitored.

Figure 6:
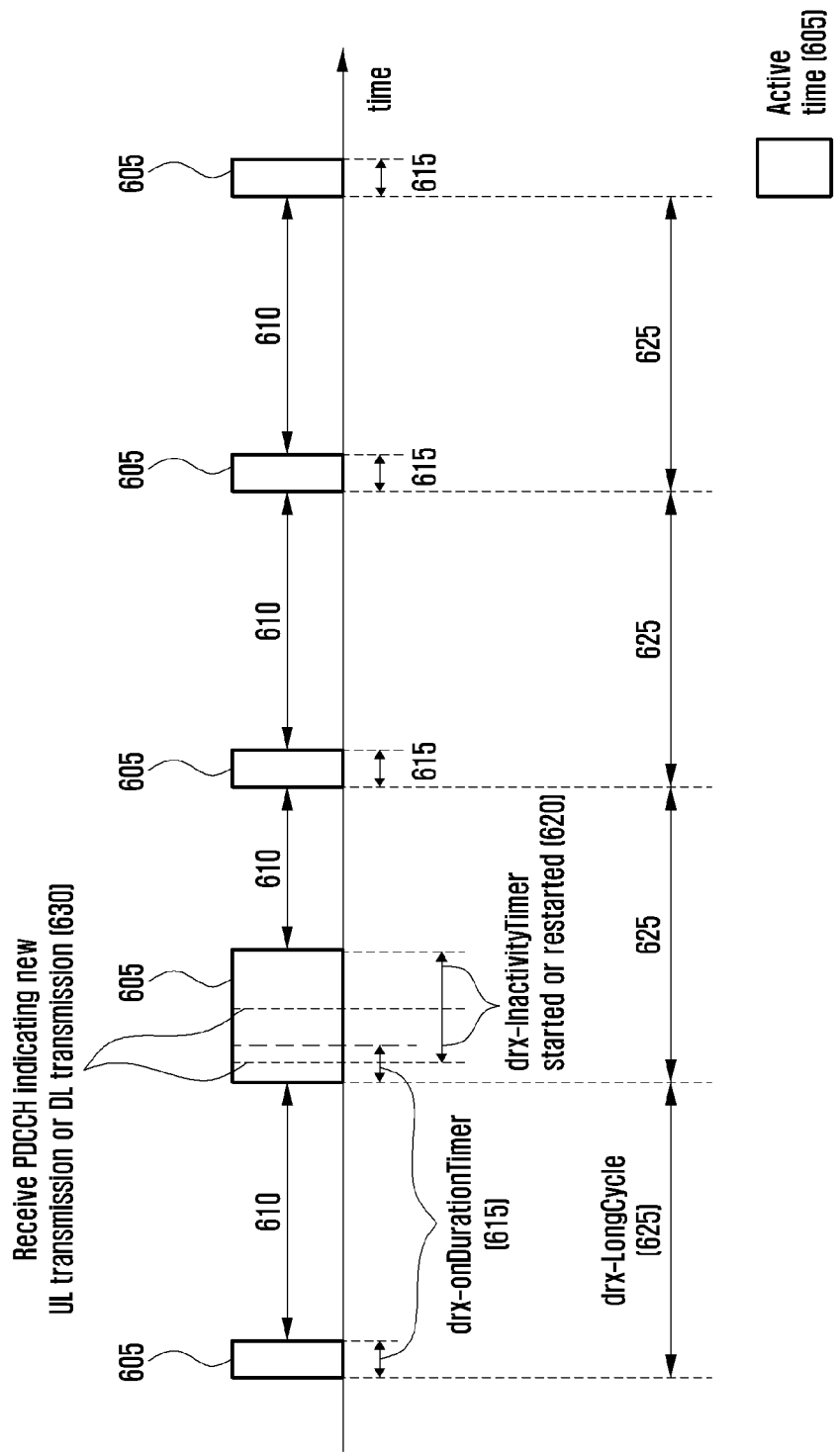
FIG. 6 illustrates an example of discontinuous reception (DRX) in a wireless communication system according to an embodiment of the disclosure.

FIG. 6 illustrates an example of a discontinuous reception (DRX) operation in a wireless communication system according to an embodiment of the disclosure.

The discontinuous reception (DRX) is an operation in which the UE that is using a service discontinuously receives data in an RRC connected state in which a radio link is established between the base station and the UE. When the DRX is applied, the UE turns on a receiver at a specific time point to monitor a control channel and turns off the receiver when no data is received during a predetermined period, and thus the power consumption of the UE may be reduced. The DRX operation may be controlled by an MAC layer device based on various parameters and a timer.

Referring to FIG. 6, an active time 605 is a time when the UE wakes up every DRX cycle and monitors the PDCCH. The active time 605 may be defined as shown in Table 2-2.

TABLE 2-2 drx-onDurationTimer, drx-InactivityTimer, drx-RetransmissionTimerDL, drx-RetransmissionTimerUL, or ra-ContentionResolutionTimer is running;

a Scheduling Request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble Here, DRX-related timers such as drx-onDurationTimer, drx-Inactivity Timer, drx-RetransmissionTimerDL, drx-RetransmissionTimerUL, ra-ContentionResolutionTimer, and the like are timers, the values of which are configured by the base station, and have a function of configuring the UE to monitor the PDCCH in a situation in which a predetermined condition is satisfied.

drx-onDurationTimer 615 is a parameter for configuring a minimum time for which the UE is awake in a DRX cycle. drx-InactivityTimer 620 is a parameter for configuration of a time for which the UE is additionally awake when receiving a PDCCH indicating new UL transmission or DL transmission (indicated by reference numeral 630). drx-RetransmissionTimerDL is a parameter for configuring a maximum time for which the UE is awake so as to receive DL retransmission in a DL HARQ procedure. The drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerDL may be configured as, for example, the time, the number of subframes, the number of slots, and the like. ra-ContentionResolutionTimer is a parameter for monitoring the PDCCH in a random access procedure.

inActive time 610 is a time configured not to monitor the PDCCH during the DRX operation, and/or a time configured not to receive the PDCCH, and the remaining time excluding the active time 605 from the entire time of performing the DRX operation may become the inActive time 610. When the PDCCH is not monitored for the active time 605, the UE may enter a sleep or inActive state to reduce power consumption.

The DRX cycle refers to a cycle in which the UE wakes up and monitors the PDCCH. That is, the DRX cycle refers to on duration occurrence period or a time interval until the UE monitors the PDCCH and then monitors the next PDCCH. There are two types of the DRX cycle, that is, short DRX cycle and long DRX cycle. The short DRX cycle may be optionally applied.

A long DRX cycle 625 is a longer cycle between the two DRX cycles configured in the UE. The UE starts the drx-onDurationTimer 615 again at a time point at which the long DRX cycle 625 has elapsed from the start point (e.g., start symbol) of the drx-onDurationTimer 615 while operating in long DRX. When operating in the long DRX cycle 625, the UE may start the drx-onDurationTimer 615 in a slot after drx-SlotOffset in a subframe satisfying Equation 1 below. The drx-SlotOffset refers to a delay before the start of the drx-onDurationTimer 615. The drx-SlotOffset may be configured as, for example, the time, the number of slots, and the like.

$$[(SFN \times 10)+\text{subframe number}] \mod (\text{drx-LongCycle}) = \text{drx-StartOffset} \quad [\text{Equation 1}]$$

Here, the drx-LongCycleStartOffset may include the long DRX cycle 625 and drx-StartOffset and may be used to define a subframe to start the long DRX cycle 625. The drx-LongCycleStartOffset may be configured as, for example, the time, the number of subframes, the number of slots, and the like.

Next, downlink control information (DCI) in a 5G system will be described in detail.

In the 5G system, scheduling information about uplink data (or physical uplink shared channel (PUSCH) or downlink data (or physical downlink shared channel (PDSCH)) is transmitted from the base station to the UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a physical downlink control channel (PDCCH) after channel coding and modulation is performed thereon. A cyclic redundancy check (CRC) may be attached to a DCI message payload. The CRC may be scrambled by a radio network temporary identifier (RNTI) corresponding to the identification information of the UE. Different RNTIs may be used according to the purpose of the DCI message, for example, a UE-specific data transmission, a power adjustment command, or a random access response. That is, the RNTI is not explicitly transmitted, but is included in a CRC calculation process and then transmitted. When receiving a DCI transmitted through the PDCCH, the UE may check a CRC by using an assigned RNTI. When a CRC check result is correct, the UE may know that the corresponding message has been transmitted to the UE.

For example, a DCI that schedules a PDSCH for system information (SI) may be scrambled by an SI-RNTI. A DCI that schedules a PDSCH for a random access response (RAR) message may be scrambled by an RA-RNTI. A DCI that schedules a PDSCH for a paging message may be scrambled by a P-RNTI. A DCI that notifies a slot format indicator (SFI) may be scrambled by an SFI-RNTI. A DCI that notifies transmit power adjustment (TPC) may be scrambled by a TPC-RNTI. A DCI that schedules UE-specific PDSCH or PUSCH may be scrambled by a cell RNTI (C-RNTI).

DCI format 0_0 may be used as a fallback DCI that schedules a PUSCH. Here, a CRC may be scrambled by a C-RNTI. The DCI format 0_0 in which the CRC is scrambled by the C-RNTI may include, for example, pieces of information below.

TABLE 3

Identifier for DCI formats - [1] bit
Frequency domain resource assignment - $[\lceil \log_2 (N_{RB}^{UL,\ BWP}(N_{RB}^{UL,\ BWP} + 1)/2)\rceil]$bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 0_1 may be used as a non-fallback DCI that schedules a PUSCH. Here, a CRC may be scrambled by a C-RNTI. The DCI format 0_1 in which the CRC is scrambled by the C-RNTI may include, for example, pieces of information below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP} / P \rceil$ bits
    For resource allocation type 1, $\lceil \log_2(N_{RB}^{UL,BWP} (N_{RB}^{UL,BWP} + 1) / 2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.

TABLE 4-continued

2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator - $\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission;
$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as a fallback DCI that schedules a PDSCH. Here, a CRC may be scrambled by a C-RNTI. The DCI format 1_0 in which the CRC is scrambled by the C-RNTI may include, for example, the following pieces of information below.

TABLE 5

Identifier for DCI formats - [1] bit

Frequency domain resource assignment - $[\lceil \log_2 (N_{RB}^{DL, BWP}(N_{RB}^{DL, BWP} + 1)/2) \rceil]$ bits Time domain resource assignment - X bits VRB-to-PRB mapping - 1 bit.

Modulation and coding scheme - 5 bits

New data indicator - 1 bit

Redundancy version - 2 bits

HARQ process number - 4 bits

Downlink assignment index - 2 bits

TPC command for scheduled PUCCH - [2] bits

PUCCH resource indicator - 3 bits

PDSCH-to-HARQ feedback timing indicator- [3] bits

DCI format 1_1 may be used as a non-fallback DCI that schedules a PDSCH. Here, a CRC may be scrambled by a C-RNTI. The DCI format 1_1 in which the CRC is scrambled by the C-RNTI may include, for example, pieces of information below.

TABLE 6

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,\,BWP}/P \rceil$ bits
    For resource allocation type 1, $\lceil \log_2(N_{RB}^{DL,\,BWP}(N_{RB}^{DL,\,BWP}+1)/2) \rceil$ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator- 0 or 1 bit
Rate matching indicator- 0, 1, or 2 bits
ZP CSI-RS trigger- 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit Hereinafter, a downlink control channel in a 5G communication system will be described in more detail with reference to the drawings.

Figure 4:
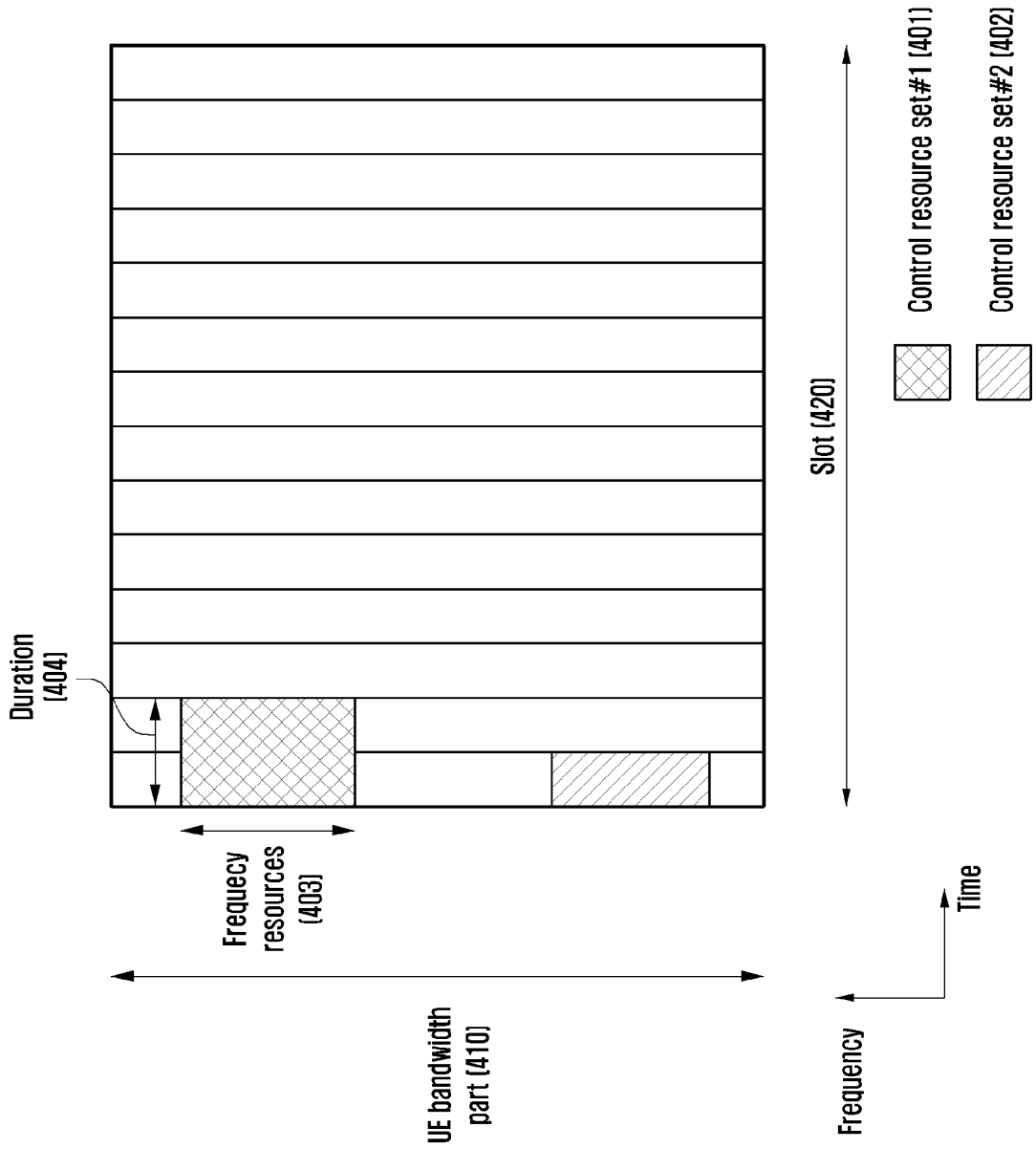
FIG. 4 illustrates an example of configuration of a control resource set of a downlink control channel in a wireless communication system according to an embodiment of the disclosure.

FIG. 4 illustrates an example of a control resource set (CORESET) through which a downlink control channel is transmitted in a 5G wireless communication system.

FIG. 4 illustrates an example in which a UE BWP 410 is configured in a frequency domain and two control resource sets (control resource set #1 401 and control resource set #2 402) are configured in one slot 420 in a time domain. The control resource sets 401 and 402 may be configured in a specific frequency resource 403 within the entire UE BWP 410 in the frequency domain. The control resource set may be configured with one or multiple OFDM symbols in the time domain, and this may be defined as a control resource set duration 404. Referring to an example illustrated in FIG. 4, the control resource set #1 401 is configured with the control resource set duration of two symbols, and the control resource set #2 402 is configured with the control resource set duration of one symbol.

The above described control resource set in 5G may be configured for the UE by the base station via higher layer signaling (e.g., system information, master information block (MIB), radio resource control (RRC) signaling). Configuration of the control resource set for the UE may be understood as providing information such as a control resource set identity, a frequency location of the control resource set, a symbol length of the control resource set, and the like. The configuration information may include, for example, pieces of information below.

TABLE 7

```
ControlResourceSet ::=              SEQUENCE {
    -- Corresponds to L1 parameter 'CORESET-ID'
    controlResourceSetId
    ControlResourceSetId,
    (Control resource set Identity)
        frequencyDomainResources            BIT       STRING
(SIZE (45)),
    (Frequency domain resource allocation information)
        duration                INTEGER
(1..maxCoReSetDuration),
    (Time domain resource allocation information)
        cce-REG-MappingType     CHOICE {
    (CCE-to-REG mapping type)
        interleaved             SEQUENCE {
            reg-BundleSize                  ENUMERATED
{n2, n3, n6},
    (REG bundle size)
            precoderGranularity             ENUMERATED
{sameAsREG-bundle, allContiguousRBs},
            interleaverSize                 ENUMERATED
{n2, n3, n6}
            (Interleaver size)
            shiftIndex
            INTEGER(0..maxNrofPhysicalResourceBlocks-1)
                                OPTIONAL
            (Interleaver shift)
        },
        nonInterleaved                      NULL
        },
        tci-StatesPDCCH
        SEQUENCE(SIZE (1..maxNrofTCI-StatesPDCCH)) OF TCI-StateId
                OPTIONAL,
    (QCL configuration information)
        tci-PresentInDCI        ENUMERATED
{enabled}
                                OPTIONAL,    -- Need S
}
```

In Table 7, tci-StatesPDCCH (simply referred to as transmission configuration indication (TCI) state) configuration information may include information about one or multiple synchronization signal (SS)/physical broadcast channel (PBCH) block (that is, synchronization signal block (SSB)) indices having a quasi-co-located (QCLed) relationship with a DMRS transmitted in the corresponding control resource set or a channel state information reference signal (CSI-RS) index.

Figure 5A:
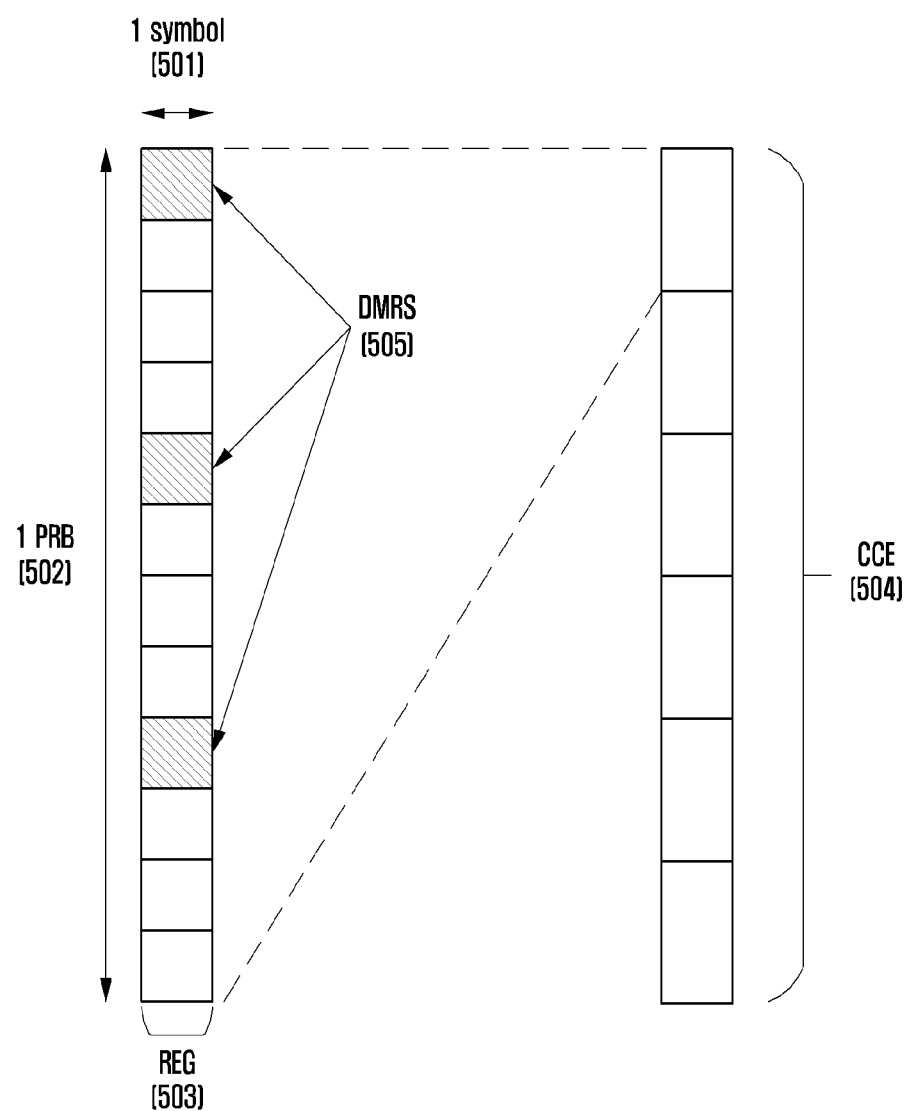
FIG. 5A illustrates a structure of a downlink control channel in a wireless communication system according to an embodiment of the disclosure.

FIG. 5A illustrates an example of a basic unit of time and frequency resources configuring a downlink control channel that can be used in a wireless communication system according to an embodiment of the disclosure.

Referring to FIG. 5A, the basic unit of time and frequency resources configuring a control channel may be referred to as a resource element group (REG) 503. The REG 503 may be defined by one OFDM symbol 501 in a time domain and one physical resource block (PRB) 502, that is, 12 subcarriers, in a frequency domain. The base station may concatenate the REG 503 to configure a downlink control channel allocation unit.

As shown in FIG. 5A, when a basic unit to which a downlink control channel is allocated in 5G is referred to as a control channel element (CCE) 504, one CCE 504 may include multiple REGs 503. When describing the REG 503 illustrated in FIG. 5A as an example, the REG 503 may include 12 resource elements (REs), and when one CCE 504 includes six REGs 503, one CCE 504 may include 72 REs. When the downlink control resource set is configured, the corresponding region may include multiple CCEs 504. A specific downlink control channel may be transmitted after being mapped to one or more CCEs 504 according to an aggregation level (AL) in the control resource set. The CCEs 504 in the control resource set are distinguished by numbers.

Here, the numbers of the CCEs 504 may be assigned according to a logical mapping scheme.

Referring to FIG. 5A, the basic unit of the downlink control channel, that is, the REG 503 may include both REs to which DCI is mapped and a region to which a DMRS 505 which is a reference signal for decoding the DCI is mapped. As illustrated in FIG. 5A, three DMRSs 505 may be transmitted in one REG 503. The number of CCEs required for transmission of the PDCCH may be 1, 2, 4, 8, or 16 according to the aggregation level (AL). A different number of CCEs may be used to implement link adaptation of the downlink control channel. For example, if AL=L, one downlink control channel may be transmitted through L CCEs. The UE needs to detect a signal in a state in which the UE does not know information about the downlink control channel, and a search space representing a set of CCEs has been defined for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. A predetermined group of UEs or all the UEs may examine the common search space of the PDCCH so as to receive cell common control information such as dynamic scheduling of system information or a paging message. For example, PDSCH scheduling allocation information for transmission of the SIB including cell operator information and the like may be received by examining the common search space of the PDCCH. In a case of the common search space, since a predetermined group of UEs or all the UEs need to receive the PDCCH, the common search space may be defined as a set of previously appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured for the UE by the base station via higher layer signaling (e.g., SIB, MIB, RRC signaling, etc.). For example, the base station may configure, in the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the configuration information for the search space of the PDCCH may include the following pieces of information.

TABLE 8

```
SearchSpace ::=                              SEQUENCE {
    -- Identity of the search space. SearchSpaceId = 0 identifies the SearchSpace
configured via PBCH (MIB) or ServingCellConfigCommon.
    searchSpaceId                            SearchSpaceId,
    (Search space identity)
    controlResourceSetId                     ControlResourceSetId,
    (Control resource set identity)
    monitoringSlotPeriodicityAndOffset       CHOICE {
    (Monitoring slot level period)
        sl1                                  NULL,
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19)
    }
        OPTIONAL,
    duration INTEGER (2..2559)
    (Monitoring length)
        monitoringSymbolsWithinSlot          BIT STRING (SIZE (14))
        OPTIONAL,
        (Monitoring symbol in slot)
        nrofCandidates                       SEQUENCE {
        (number of PDCCH candidates for each aggregation level)
            aggregationLevel1                ENUMERATED {n0, n1, n2, n3, n4, n5, n6, n8},
            aggregationLevel2                ENUMERATED {n0, n1, n2, n3, n4, n5, n6, n8},
            aggregationLevel4                ENUMERATED {n0, n1, n2, n3, n4, n5, n6, n8},
            aggregationLevel8                ENUMERATED {n0, n1, n2, n3, n4, n5, n6, n8},
            aggregationLevel16               ENUMERATED {n0, n1, n2, n3, n4, n5, n6, n8}
        },
        searchSpaceType                      CHOICE {
        (Search space type)
            -- Configures this search space as common search space (CSS) and DCI
formats to monitor.
            common
            SEQUENCE{
```

TABLE 8-continued

```
      (Common search space)
   }
      ue-Specific
      SEQUENCE {
      (UE-specific search space)
         -- Indicates whether the UE monitors in this USS for DCI formats
0-0 and 1-0 or for formats 0-1 and 1-1.
         formats
         ENUMERATED {formats0-0-And-1-0, formats0-1-And-1-1},
         ...
      }
```

The base station may configure one or more search space sets in the UE according to configuration information. According to some embodiments, the base station may configure search space set 1 and search space set 2 in the UE. The base station may configure the search space set 1 in the UE so that DCI format A scrambled by an X-RNTI is monitored in the common search space. The base station may configure the search space set 2 in the UE so that DCI format B scrambled by a Y-RNTI is monitored in the UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored, however, the disclosure is not limited thereto:

DCI format 0_0/1_0 with CRC scrambled by C-RNTI, CS-RNTI, SP-CSI-RNTI, RA-RNTI, TC-RNTI, P-RNTI, SI-RNTI;
DCI format 2_0 with CRC scrambled by SFI-RNTI;
DCI format 2_1 with CRC scrambled by INT-RNTI;
DCI format 2_2 with CRC scrambled by TPC-PUSCH-RNTI, TPC-PUCCH-RNTI; and/or
DCI format 2_3 with CRC scrambled by TPC-SRS-RNTI.

In the UE-specific search space, the following combinations of the DCI format and the RNTI may be monitored, however, the disclosure is not limited thereto:

DCI format 0_0/1_0 with CRC scrambled by C-RNTI, CS-RNTI, TC-RNTI; and/or
DCI format 1_0/1_1 with CRC scrambled by C-RNTI, CS-RNTI, TC-RNTI;

The specified RNTIs may follow the definitions and usages described below:

C-RNTI (Cell RNTI): For UE-specific PDSCH scheduling;
Temporary Cell RNTI (TC-RNTI): For UE-specific PDSCH scheduling;
Configured Scheduling RNTI (CS-RNTI): For semi-statically configured UE-specific PDSCH scheduling;
Random access RNTI (RA-RNTI): For PDSCH scheduling in random access operation;
Paging RNTI (P-RNTI): For scheduling of PDSCH through which paging is transmitted;
System information RNTI (SI-RNTI): For PDSCH scheduling in which system information is transmitted;
Interruption RNTI (INT-RNTI): For notifying of whether to puncture PDSCH;
Transmit power adjustment for PUSCH RNTI (TPC-PUSCH-RNTI): For indication of power adjustment command for PUSCH;
Transmit Power adjustment for PUCCH RNTI (TPC-PUCCH-RNTI): For indication of power adjustment command for PUCCH; and/or
Transmit Power adjustment for SRS RNTI (TPC-SRS-RNTI): For indication of power adjustment command for SRS.

The above-described specified DCI formats may follow the definitions shown in Table below

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by the following Equation 2.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 2]}$$

L: Aggregation level;
$n_{CI}$: Carrier index;
$N_{CCE,p}$: Total number of CCEs existing in the control resource set p;
$n_{s,f}^{\mu}$: Slot index;
$M_{p,s,max}^{(L)}$: Number of PDCCH candidates of aggregation level L;
$m_{s,nCI}, \ldots, 0=M_{p,s,max}^{(L)}-1$: PDCCH candidate group index of aggregation level L;
i=L-1;
$Y_{n,m}=(A_p \cdot Y_{n,m})$ mod D, $Y_{p,-1}=n_{RNTI}\neq 0$, $A_0=39827$, $A_1=39829$, $A_2=39839$, $D=65537$; and
$n_{RNTI}$: UE identifier.

The Y_(p,nμs,f) value may correspond to zero in the common search space.

In a case of the UE-specific search space, the Y_(p,nμs,f) value may correspond to a value that changes according to the UE identity (C-RNTI or ID configured by the base station for the UE) and the time index.

In 5G, multiple search space sets may be configured with different parameters (e.g., parameters in Table 8), and accordingly, the set of search space sets monitored by the UE may differ at each time point. For example, if search space set #1 is configured with the X-slot period, search space set #2 is configured with the Y-slot period, and X and Y are different, the UE may monitor both search space set #1 and space set #2 in a specific slot, and may monitor one of search space set #1 and search space set #2 in a specific slot.

A UE may perform, for each subcarrier spacing, UE capability reporting for a case of having multiple PDCCH monitoring occasions in a slot, and in this case, the term "span" may be used.

"span" denotes consecutive symbols in which the UE can monitor a PDCCH in the slot, and each PDCCH monitoring occasion is within one span. Span may be expressed as (X,Y), where x denotes the minimum number of symbols that need to be separated between the first symbols of two consecutive spans, and Y denotes the number of consecutive symbols in which the UE can monitor the PDCCH within one span. Here, the UE may monitor the PDCCH in an interval from the first symbol of the span to the Y symbol within the span.

Figure 5B:
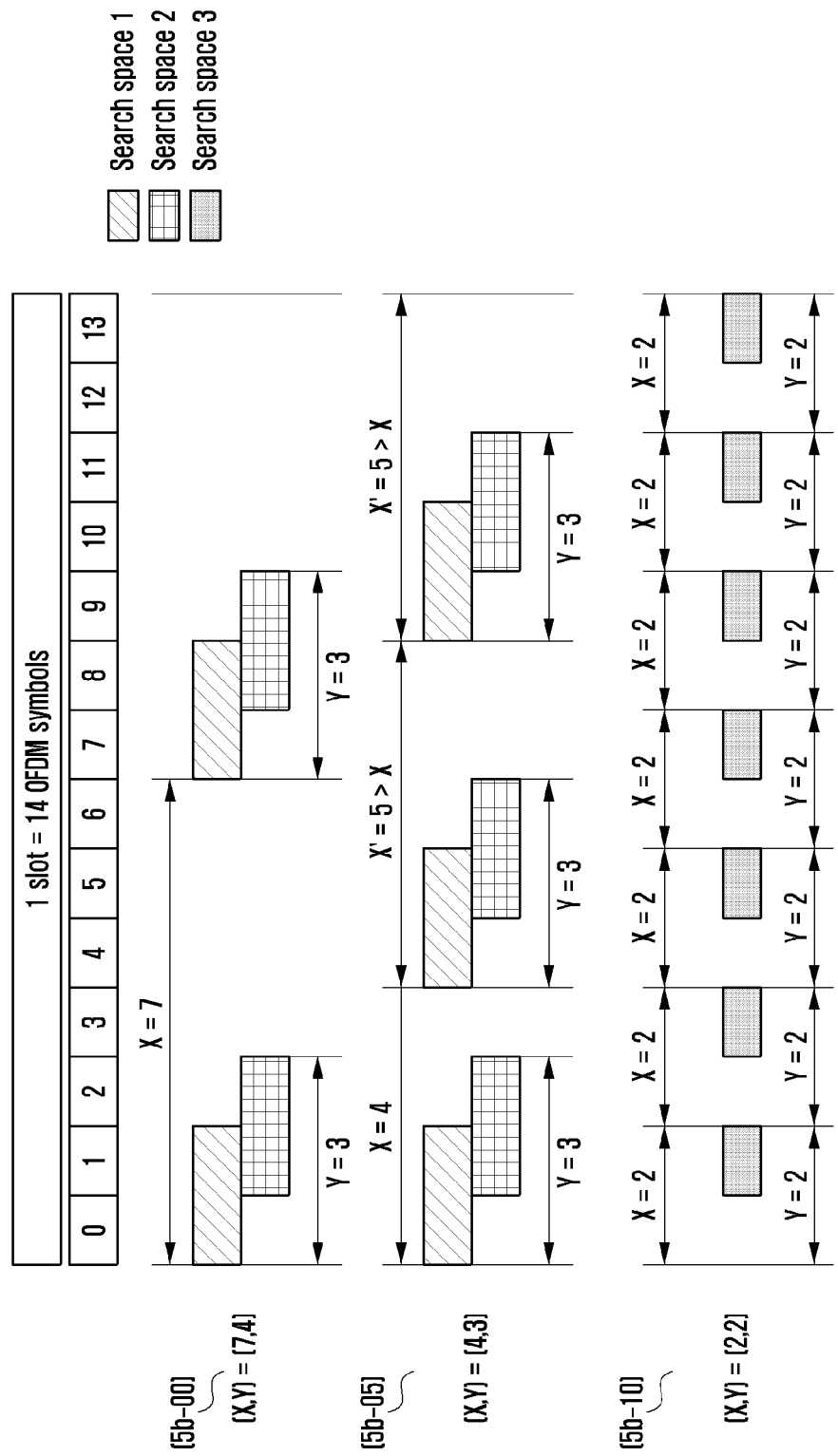
FIG. 5B illustrates, through a span, a case in which a UE may have multiple physical downlink control channel (PDCCH) monitoring occasions within a slot in a wireless communication system according to an embodiment of the disclosure.

FIG. 5B illustrates, through a span, a case in which a UE may have multiple PDCCH monitoring occasions within a slot in a wireless communication system.

Span can be expressed as (X, Y)=(7, 4), (4, 3), and (2, 2), and this three cases are indicated by reference numerals (5b-00), (5b-05), and (5b-10), respectively, in FIG. 5B. As an example, (5b-00) represents a case in which two spans that can be expressed by (7,4) exist in a slot. The interval between the first symbols of two spans is expressed as X=7, PDCCH monitoring occasions may exist within a total of Y symbols (Y=3) from the first symbol of each span, and search spaces 1 and 2 may exist within Y symbols (Y=3). As another example, (5b-05) represents a case in which a total of three spans that can be expressed as (4, 3) exist in a slot, and the interval between the second and third spans is shown to be separated by X' symbols (X'=5) greater than X=4.

The slot position in which the above-described common search space and UE-specific search space are located is indicated by the monitoringSymbolsWitninSlot parameter in Table 10-1, and the symbol position in a slot is indicated by a bitmap through the monitoringSymbolsWithinSlot parameter in Table 9. On the other hand, the symbol position in a slot in which the UE can monitor the search space may be reported to the base station through the following UE capabilities:

UE capability 1 (hereinafter referred to as FG 3-1):this UE capability denotes, as shown in Table 10-1 below, if one monitoring occasion (MO) for the type 1 and type 3 common search space or UE-specific search space exists in a slot, UE capability capable of monitoring the MO when the corresponding MO occasion is located within the first 3 symbols in a slot. This UE capability is a mandatory capability that all UEs supporting NR may support, and whether this capability is supported is not explicitly reported to the base station.

TABLE 10-1

| Index | Feature group | Components | Field name in TS 38.331 |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table | n/a |

TABLE 10-1-continued

| Feature Index group | Components | Field name in TS 38.331 |
|---|---|---|
| | 5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter referred to as FG 3-2): this UE capability denotes, as shown in Table 10-2 below, if a monitoring occasion (MO: monitoring occasion) for a common search space or a UE-specific search space exists in a slot, UE capability capable of monitoring regardless of the location of the start symbol of the MO. This UE capability may be optionally supported by the UE, and whether this capability is supported is explicitly reported to the base station.

TABLE 10-2

| Feature Index group | Components | Field name in TS 38.331 |
|---|---|---|
| 3-2 PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter referred to as FG 3-5, 3-5a, and 3-5b): as shown in Table 10-3 below, this UE capability indicates a pattern of a MO that the UE can monitor when multiple monitoring occasions (MOs) for a common search space or a UE-specific search space exist in a slot. The above-described pattern includes an interval X between start symbols between different MOs, and a maximum symbol length Y for one MO. The combination of (X, Y) supported by the UE may be one or multiple {(2, 2), (4, 3), and (7, 3)}. This UE capability is optionally supported by the UE, and whether this capability is supported and a combination of (X, Y) described above are explicitly reported to the base station.

TABLE 10-3

| Feature Index group | Components | Field name in TS 38.331 [2] |
|---|---|---|
| 3-5 For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |

TABLE 10-3-continued

| Index | Feature group | Components | Field name in TS 38.331 [2] |
|---|---|---|---|
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI | |

TABLE 10-3-continued

| Feature Index group | Components | Field name in TS 38.331 [2] |
|---|---|---|
| | scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether the above-described UE capability 2, and/or UE capability 3 is supported and related parameters to the base station. The base station may perform time-domain resource allocation for the common search space and the UE-specific search space based on the reported UE capability. When performing the resource allocation, the base station may prevent the UE from locating the MO in a location that cannot be monitored.

When multiple search space sets are configured for a UE, the following conditions may be considered in a method for determining a search space configured to bebe monitored by the UE.

If the UE is configured with the value of monitoringCapabilityConfig-r16, which is higher layer signaling, as r15monitoringcapability, the UE defines the number of PDCCH candidates that can be monitored and the maximum value of the number of CCEs configuring the entire search space (the entire search space refers to the entire CCE set corresponding to the union area of multiple search space sets) for each slot. Further, if the value of monitoringCapabilityConfig-r16 is configured with r16monitoringcapability, the UE defines the number of PDCCH candidates that can be monitored and the maximum value of the number of CCEs configuring the entire search space (the entire search space refers to the entire CCE set corresponding to the union area of multiple search space sets) for each span.

As described above, according to the configuration value of higher layer signaling, $M\mu$, which is the maximum number of PDCCH candidate groups that the UE can monitor, may be defined by the following Table 11-1 if the same is defined on a slot basis in a cell configured with a subcarrier spacing of 15·2μ, kHz, and if the same is defined on a span basis, $M\mu$ may be defined by the following Table 11-2.

TABLE 11-1

| μ | Maximum number of PDCCH candidates per slot and per serving cell ($M^\mu$) |
|---|---|
| 0 | 44 |
| 1 | 36 |

TABLE 11-1-continued

| μ | Maximum number of PDCCH candidates per slot and per serving cell ($M^\mu$) |
|---|---|
| 2 | 22 |
| 3 | 20 |

TABLE 11-2

| | Maximum number $M^\mu$ of monitored PDCCH candidates per span for combination (X, Y) and per serving cell | | |
|---|---|---|---|
| μ | (2, 2) | (4, 3) | (7, 4) |
| 0 | 14 | 28 | 44 |
| 1 | 12 | 24 | 36 |

As described above, according to the configuration value of higher layer signaling, $C\mu$, which is the maximum number of CCEs confiuring the entire search space (here, the entire search space denotes the entire set of CCEs corresponding to the union region of multiple search space sets), may be defined by the following Table 11-3 if the same is defined on a slot basis in a cell configured with a subcarrier spacing of 15.2μ, kHz, and if the same is defined on a span basis, $C\mu$ may be defined by the following Table 11-4.

TABLE 11-3

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 11-4

| | Maximum number $C^H$ of non-overlapped CCEs per span for combination (X, Y) and per serving cell | | |
|---|---|---|---|
| μ | (2, 2) | (4, 3) | (7, 4) |
| 0 | 18 | 36 | 56 |
| 1 | 18 | 36 | 56 |

For the convenience of description, a situation in which both conditions 1 and 2 are satisfied at a specific time point is defined as "condition A." Therefore, not satisfying condition A may refer to not satisfying at least one of the above conditions 1 and 2.

According to the configuration of the search space sets of the base station, a case in which the above-described condition A is not satisfied at a specific time point may occur. If condition A is not satisfied at a specific time point, the UE may select and monitor only some of the search space sets configured to satisfy condition A at the time point, and the base station may transmit PDCCH to the selected search space sets.

A method of selecting some search spaces in the entire configured search space set may conform to the following method.

If condition A for PDCCH is not satisfied at a specific time point (slot), the UE (or base station) may select a search space set, in which a search space type is configured to be a common search space, from among search space sets existing at a corresponding time point, preferentially over a search space set in which a search space type is configured to be a UE-specific search space.

If all search space sets configured to have common search spaces are selected (i.e., if condition A is satisfied even after all search spaces configured to be common search spaces are selected), the UE (or base station) may select the search space sets configured to have UE-specific search spaces. Here, if there are multiple search space sets configured to have UE-specific search spaces, a search space set having a low search space set index may have a higher priority. In consideration of the priority, the UE-specific search space sets may be selected within a range in which condition A is satisfied.

In the wireless communication system, one or more different antenna ports (or different antenna ports may be replaced by one or more channels, signals, and combinations thereof, but in the description of the disclosure below, uniformly referred to as different antenna ports for convenience of explanation) may be associated with each other by a quasi co-location (QCL) configuration as shown in Table 12 below. The TCI state is for announcing a QCL relationship between a PDCCH (or PDCCH DMRS) and another RS or channel, and a certain reference antenna port A (reference RS #A) and another target antenna port B (target RS #B) are QCLed denotes that the UE is allowed to apply some or all of the large-scale channel parameters estimated from the antenna port A to the channel measurement from the antenna port B. QCL is required to correlate different parameters, depending on situatons, such as 1) time tracking affected by average delay and delay spread, 2) frequency tracking affected by Doppler shift and Doppler spread, 3) radio resource management (RRM) affected by average gain, and 4) beam management (BM) affected by spatial parameters. Accordingly, NR supports four types of QCL relationships as shown in Table 12 below.

TABLE 12

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Some or all of various parameters, such as angle of arrival (AoA), power angular spectrum (PAS) of AoA, angle of departure (AoD), PAS of AoD, transmit/receive channel correlation, transmit/receive beamforming, and spatial channel correlation may be collectively referred to as the spatial RX parameter.

The QCL relationship can be configured for the UE through the RRC parameters TCI-State and QCL-Info as shown in Table 13 below. Referring to Table 13, the base station configures one or more TCI states for the UE and informs the UE of up to two QCL relationships (qcl-Type1, qcl-Type2) for RS referring to the ID of the TCI state, that is, target RS. Here, pieces of QCL information (QCL-Info) included in each TCI state includes the serving cell index and BWP index of the reference RS indicated by the corresponding QCL information, the type and ID of the reference RS, and the QCL type as shown in Table 12 above.

TABLE 13

```
TCI-State ::=                             SEQUENCE {
    tci-StateId                               TCI-StateId,
    (ID of corresponding TCI state)
    qcl-Type1                                 QCL-Info,
    (QCL information of first reference RS of RS (target RS) referring to corresponding
TCI sate ID)
    qcl-Type2                                 QCL-Info
                            OPTIONAL,         -- Need R
    (QCL information of second reference RS of RS (target RS) referring to
corresponding TCI sate ID)
    ...
}
QCL-Info ::=                              SEQUENCE {
    cell                                      ServCellIndex
                            OPTIONAL,         -- Need R
    (Serving cell index of reference RS indicated by corresponding QCL information)
    bwp-Id                                    BWP-Id
                            OPTIONAL, -- Cond CSI-RS-Indicated
    (BWP index of reference RS indicated by corresponding QCL information)
    referenceSignal                           CHOICE {
        csi-rs                                    NZP-CSI-RS-ResourceId,
        ssb                                       SSB-Index
```

TABLE 13-continued

```
  (One of CSI-RS and SSB ID indicated by corresponding QCL
information)
  },
  qcl-Type          ENUMERATED {typeA, typeB, typeC, typeD},
  ...
}
```

Figure 7:
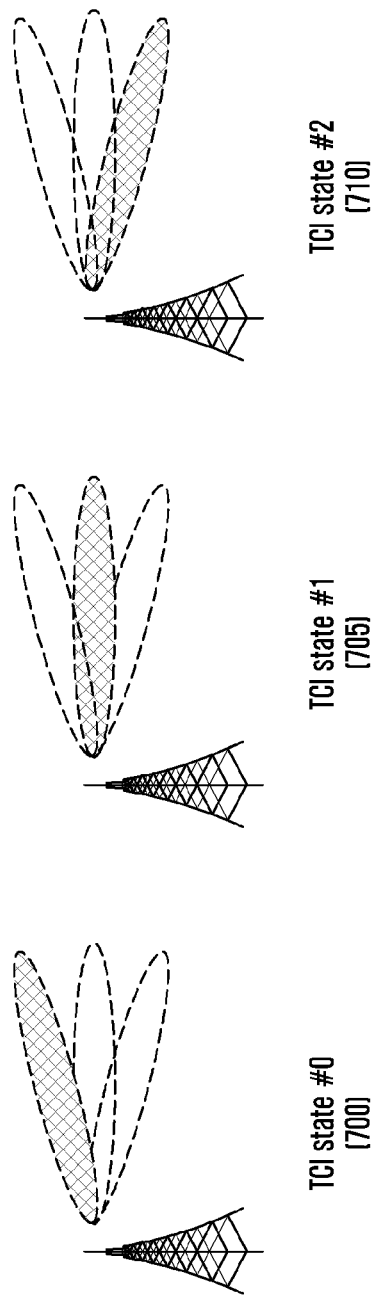
FIG. 7 illustrates an example of base station beam allocation according to a transmission configuration indication (TCI) state configuration in a wireless communication system according to an embodiment of the disclosure.

FIG. 7 illustrates an example of base station beam allocation according to TCI state configuration in a wireless communication system according to an embodiment of the disclosure.

Referring to FIG. 7, a base station may transmit information on N different beams to a UE through N different TCI states. For example, if N=3 as shown in FIG. 7, the base station may allow qcl-Type2 parameters included in three TCI states 700, 705, and 710 to be associated with CSI-RS or SSB corresponding to different beams, and to be configured with QCL type D, and thus may provide notification that antenna ports referring to the different TCI states 700, 705, and 710 are associated with different spatial Rx parameters, that is, different beams.

Tables 14-1 to 14-5 below show valid TCI state configurations according to target antenna port types.

Table 14-1 shows valid TCI state configuration when the target antenna port is CSI-RS for tracking (TRS). The TRS refers to an NZP CSI-RS, in which a repetition parameter is not configured and trs-Info is configured to be true, among CSI-RSs. Configuration 3 in Table 14-1 may be used for aperiodic TRS.

TABLE 14-1

Valid TCI state configuration when target antenna port is CSI-RS for tracking (TRS)

| Valid TCI state configuration | DL RS1 | qcl-Type1 | DL RS2 (if configured) | qcl-Type2 (if confiugred) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS1) | QCL-TypeD |

Table 14-2 shows valid TCI state configuration when the target antenna port is CSI-RS for CSI. The CSI-RS for CSI refers to an NZP CSI-RS, in which a parameter (e.g., a repetition parameter) indicating repetition is not configured and trs-Info is not configured to be true, among CSI-RSs.

TABLE 14-2

Valid TCI state configuration when target antenna port is CSI-RS for CSI

| Valid TCI state configuration | DL RS1 | qcl-Type1 | DL RS2 (if configured) | qcl-Type2 (if confiugred) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS1) | QCL-TypeD |
| 4 | TRS | QCL-TypeB | | |

Table 14-3 shows a valid TCI state configuration when a target antenna port is CSI-RS for beam management (BM, which has the same meaning as CSI-RS for L1 RSRP reporting). The CSI-RS for BM denotes an NZP CSI-RS, in which a repetition parameter is configured and has a value of On or Off, and trs-Info is not configured to be true, among CSI-RSs.

TABLE 14-3

Valid TCI state configuration when target antenna port is CSI-RS for BM (for L1 RSRP reporting)

| Valid TCI state configuration | DL RS1 | qcl-Type1 | DL RS2 (if configured) | qcl-Type2 (if confiugred) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 14-4 shows valid TCI state configuration when a target antenna port is a PDCCH DMRS.

TABLE 14-4

Valid TCI state configuration when
target antenna port is PDCCH DMRS

| Valid TCI state configuration | DL RS1 | qcl-Type1 | DL RS2 (if configured) | qcl-Type2 (if confiugred) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS1) | QCL-TypeD |

Table 14-5 shows a valid TCI state configuration when the target antenna port is a PDSCH DMRS.

TABLE 14-5

Valid TCI state configuration when
target antenna port is PDSCH DMRS

| Valid TCI state configuration | DL RS1 | qcl-Type1 | DL RS2 (if configured) | qcl-Type2 (if confiugred) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration method according to Tables 14-1 to 14-5, a target antenna port and a reference antenna port for each stage are configured to be "SSB"–>"TRS"–>"CSI-RS for CSI, CSI-RS for BM, PDCCH DMRS, or PDSCH DMRS." Accordingly, it is possible to link the statistical characteristics that can be measured from the SSB and the TRS to each of antenna ports to help the reception operation of a UE.

Specifically, TCI state combinations applicable to a PDCCH DMRS antenna port are shown in Table 14-6 below. In Table 14-6, the fourth row is a combination assumed by the UE before RRC configuration, and configuration after RRC is not possible.

TABLE 14-6

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
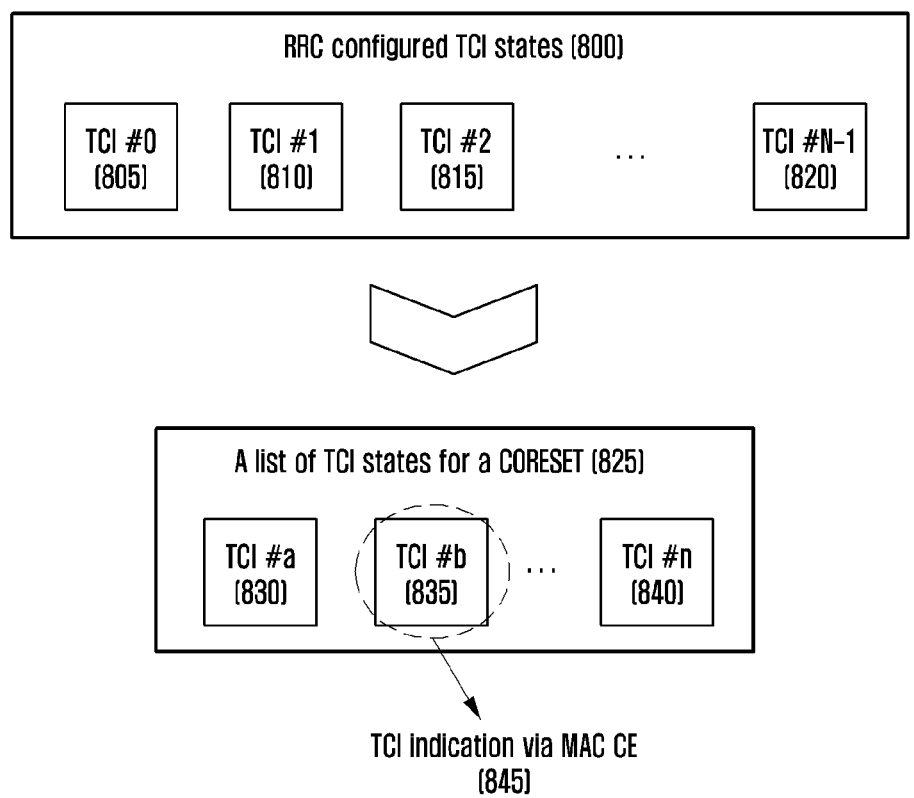
FIG. 8 illustrates an example of a TCI state allocation method for a PDCCH in a wireless communication system according to an embodiment of the disclosure.

In NR, a hierarchical signaling method as shown in FIG. 8 is supported for dynamic allocation of a PDCCH beam.

FIG. 8 illustrates an example of a TCI state allocation method for a PDCCH in a wireless communication system according to an embodiment of the disclosure.

Referring to FIG. 8, a base station may configure N TCI states 805, 810, 815, . . . , and 820 for a UE via RRC signaling 800, and may configure some of the TCI states as TCI states for a CORESET (indicated by reference numeral 825). Thereafter, the base station may indicate one of the TCI states 830, 835, . . . , and 840 for the CORESET to the UE via MAC CE signaling (indicated by reference numeral 845). Thereafter, the UE may receive a PDCCH based on beam information included in a TCI state indicated by the MAC CE signaling.

Figure 9:
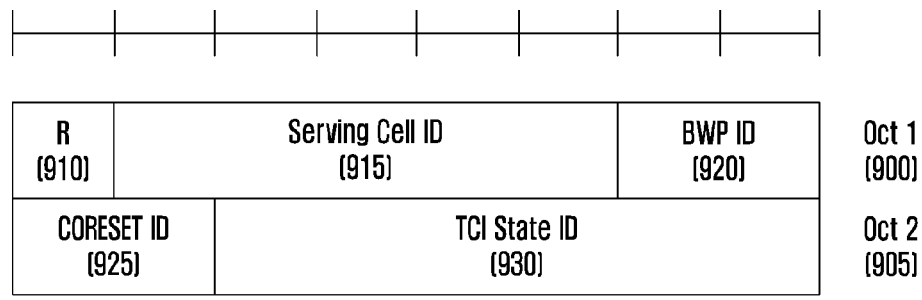
FIG. 9 illustrates a TCI indication medium access control (MAC) control element (CE) signaling structure for a PDCCH demodulation reference signal (DMRS) in a wireless communication system according to an embodiment of the disclosure.

FIG. 9 illustrates a TCI indication MAC CE signaling structure for a PDCCH DMRS in a wireless communication system according to an embodiment of the disclosure.

Referring to FIG. 9, the TCI indication MAC CE signaling for the PDCCH DMRS is configured by 2 bytes (16 bits), and includes a reserved bit 910 formed of 1 bit, a serving cell ID 915 formed of 5 bits, a BWP ID 920 formed of two bits, a CORESET ID 925 formed of 2 bits, and a TCI state ID 930 formed of 6 bits.

Figure 10:
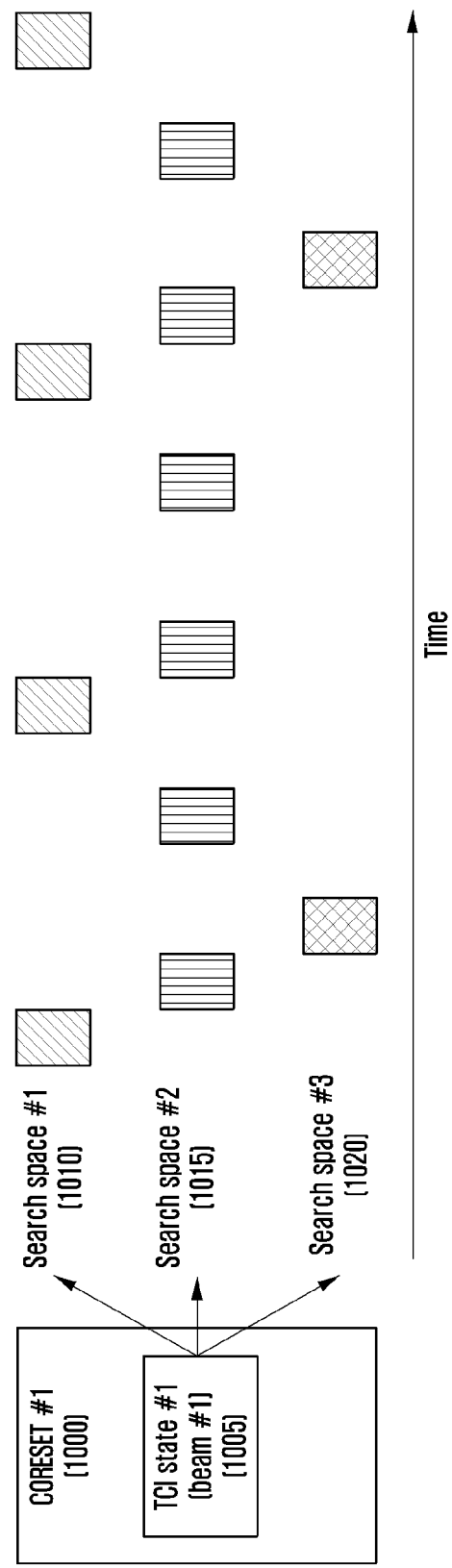
FIG. 10 illustrates an example of CORESET and search space beam configuration in a wireless communication system according to an embodiment of the disclosure.

FIG. 10 illustrates an example of CORESET and search space beam configuration in a wireless communication system according to an embodiment of the disclosure. Referring to FIG. 10, the base station may indicate one in a list of TCI states included in a CORESET 1000 configuration through MAC CE signaling (indicated by reference numeral 1005). Thereafter, until another TCI state is indicated to the corresponding CORESET through another MAC CE signaling, the UE considers that the same QCL information (beam #1) 1005 is applied to one or more search spaces 1010, 1015, and 1020 connected to the CORESET. According to the above-described PDCCH beam allocation method, it is difficult to indicate a beam change faster than the MAC CE signaling delay, and has an advantage in that the same beam is applied to respective CORESETs at once regardless of search space characteristics, flexible PDCCH beam operation is difficult. Hereinafter, embodiments of the disclosure provide a more flexible PDCCH beam configuration and operation method. Hereinafter, in describing an embodiment of the disclosure, several distinguished examples are provided for convenience of description, but these are not mutually exclusive and can be applied by appropriately combining with each other depending on the situation.

The base station may provide, to the UE, configuration of one or multiple TCI states for a specific control resource set, and may activate one of the configured TCI states through a MAC CE activation command. For example, {TCI state#0, TCI state#1, and TCI state#2} are configured as the TCI state in the control resource set #1, and the base station may transmit, to the UE, a command of activating to assume the TCI state#0 as the TCI state for the control resource set #1 through the MAC CE. Based on the activation command for the TCI state received by the MAC CE, the UE may correctly receive the DMRS of the corresponding control resource set based on QCL information in the activated TCI state.

For the control resource set #0 in which the index is configured to be 0, if the UE does not receive the MAC CE activation command for the TCI state of the control resource set #0, the UE may assume that DMRS transmitted in the control resource set #0 is QCLed with an SS/PBCH block identified during the initial access procedure or non-contention-based random access procedure that is not triggered by a PDCCH command.

In relation to the control resource set #X in which the index is configured to be a value other than 0, if the UE has not received the TCI state for the control resource set #X, or the UE is configured with one or more TCI states but has not received the MAC CE activation command for activating one of the TCI states, the UE may assume that DMRS transmitted in the control resource set #X is QCLed with an SS/PBCH block identified during the initial access procedure.

Figure 11:
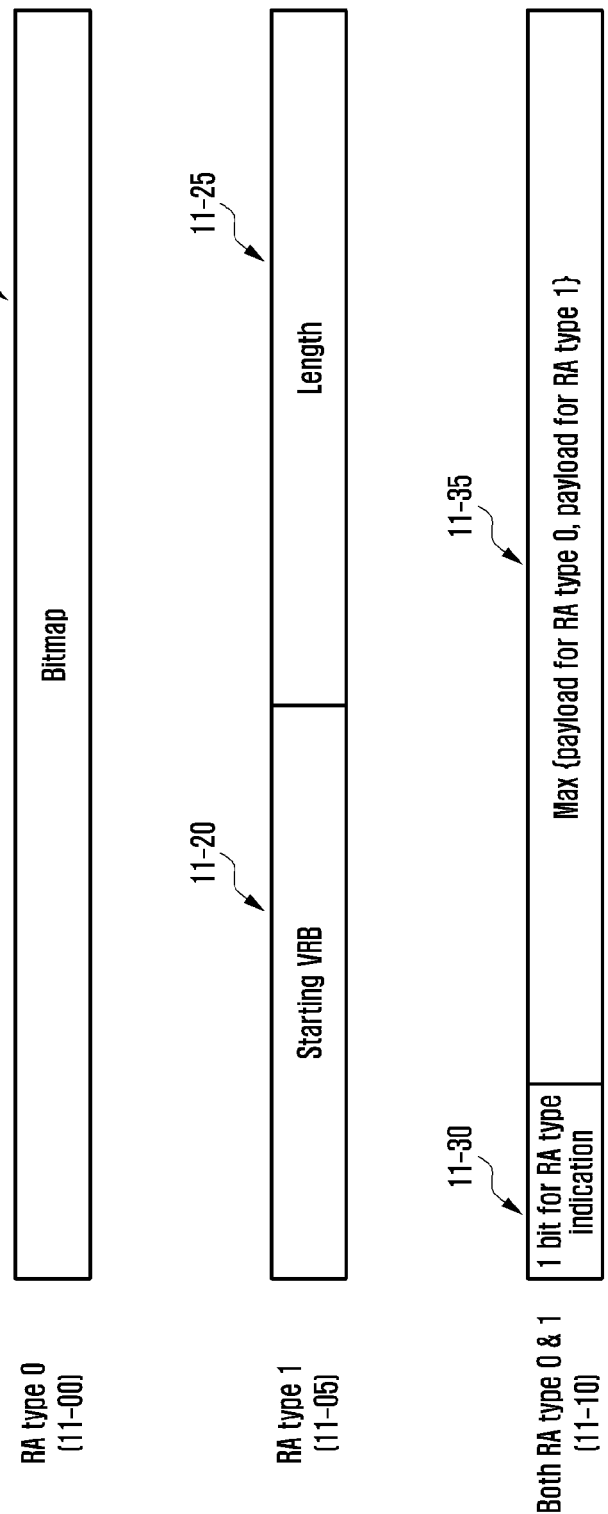
FIG. 11 illustrates an example of frequency-domain resource allocation of a PDSCH in a wireless communication system according to an embodiment of the disclosure.

FIG. 11 illustrates an example of frequency-domain resource allocation of a physical downlink shared channel (PDSCH) in a wireless communication system according to an embodiment of the disclosure.

FIG. 11 shows three frequency-domain resource allocation methods of type 0 (11-00), type 1 (11-05), and dynamic switch (11-10) configurable through a higher layer in an NR wireless communication system.

Referring to FIG. 11, if a UE is configured to use only resource type 0 via higher layer signaling (indicated by reference numeral 11-00), some downlink control information (DCI) for allocation of PDSCH to the corresponding UE includes a bitmap formed of NRBG bits. Conditions for this will be described again later. In this case, NRBG denotes the number of resource block groups (RBGs) determined as shown in Table 15-1 below according to a BWP size allocated by a BWP indicator and a higher layer parameter rbg-Size, and data is transmitted to the RBG indicated as 1 in the bitmap.

TABLE 15-1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (indicated by reference numeral 11-05), some DCI for allocation of the PDSCH to the UE includes frequency-domain resource allocation information configured by $[\log_2(N_{RB}^{DL,BWP}(N_{RB}^{DL,BWP}+1)/2]$ bits. Conditions for this will be described again later. Through this information, the base station may configure a starting VRB 11-20 and the length of frequency-domain resources 11-25 continuously allocated therefrom.

If the UE is configured to use both resource type 0 and resource type 1 via higher layer signaling (indicated by reference numeral 11-10), some DCI for allocation of PDSCH to the UE includes frequency-domain resource allocation information configured by bits of a greater value 11-35 among a payload 11-15 for configuration of resource type 0 and payloads 11-20 and 11-25 for configuration of resource type 1, a condition for which will be described later. Here, one bit is added to the most significant bit (MSB) of the frequency-domain resource allocation information in the DCI, if the corresponding bit has a value of "0," 0 indicates that resource type 0 is used, and if the corresponding bit has a value of "1," 1 indicates that resource type 1 is used.

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). For PDSCH, a table including maxNrofDL-Allocations=16 entries may be configured, and for PUSCH, a table including maxNrofUL-Allocations=16 entries may be configured. In an embodiment, the time-domain resource allocation information may include PDCCH-to-PDSCH slot timing (corresponding to a time interval in slot units between a time point at which a PDCCH is received and a time point at which a PDSCH scheduled by the received PDCCH is transmitted, and denoted by K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information such as Table 15-2 or Table 15-3 below may be transmitted from the base station to the UE.

TABLE 15-2

| PDSCH-TimeDomainResourceAllocationList infomration element |
|---|
| PDSCH-TimeDomainResourceAllocationList ::= SEQUENCE (SIZE(1.. maxNrofDL-Allocations)) OF PDSCH-TimeDomainResourceAllocation<br>PDSCH-TimeDomainResourceAllocation ::= SEQUENCE {<br>  k0 INTEGER (0..32)<br>  OPTIONAL, --Need S<br>  (PDCCH-to-PDSCH timing, slot units)<br>  mapping type ENUMERATED {typeA, typeB},<br>  (PDSCH mapping type)<br>  startSymbolAndLength INTEGER (0..127)<br>  (Start symbol and length of PDSCH)<br>} |

TABLE 15-3

| PUSCH-TimeDomainResourceAllocationList infomration element |
|---|
| PUSCH-TimeDomainResourceAllocationList ::= SEQUENCE (SIZE(1.. maxNrofUL-Allocations)) OF PUSCH-TimeDomainResourceAllocation<br>PUSCH-TimeDomainResourceAllocation ::= SEQUENCE {<br>  k2 INTEGER (0..32)<br>  OPTIONAL, --Need S<br>  (PDCCH-to-PUSCH timing, slot units)<br>  mapping type ENUMERATED {typeA, typeB},<br>  (PUSCH mapping type)<br>  startSymbolAndLength INTEGER (0..127)<br>  (Start symbol and length of PUSCH)<br>} |

The base station may notify one of the entries in the above-described table representing the time-domain resource allocation information to the UE via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 12:
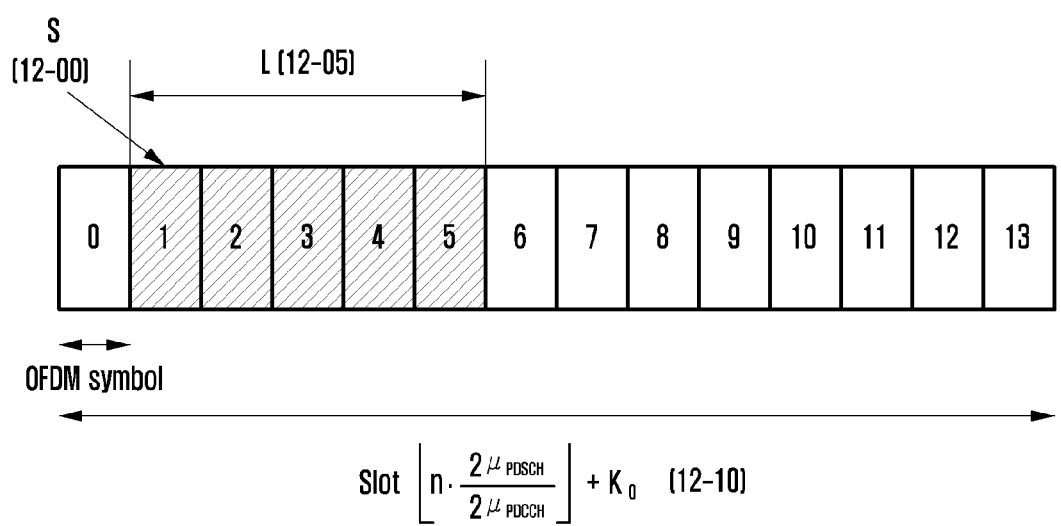
FIG. 12 illustrates an example of time-domain resource allocation of a PDSCH in a wireless communication system according to an embodiment.

FIG. 12 illustrates an example of time-domain resource allocation of a PDSCH in a wireless communication system according to an embodiment of the disclosure.

Referring to FIG. 12, a base station may indicate a time-domain position of a PDSCH resource according to a start position 12-00 and a length 12-05 of an OFDM symbol in a slot dynamically indicated based on the subcarrier spacing (SCS) (μPDSCH, μPDCCH) of a data channel and a control channel configured using a higher layer, a scheduling offset (K0) value, and DCI.

Figure 13A:
FIG. 13A illustrates an example of time-domain resource allocation according to subcarrier spacings of a data channel and a control channel in a wireless communication system according to an embodiment.

FIG. 13A illustrates an example of time-domain resource allocation according to the subcarrier spacings of a data channel and a control channel in a wireless communication system according to an embodiment of the disclosure.

Referring to FIG. 13A, if a data channel and a control channel have the same subcarrier spacing (13a-00, μPDSCH=μPDCCH), since a data slot number and a control slot number are the same, a base station and a UE may generate a scheduling offset in accordance with predetermined slot offset K0. If the subcarrier spacing of the data channel and the subcarrier spacing of the control channel are different (13a-05, μPDSC≠μPDCCH), since a data slot number and a control slot number are different, the base station and the UE may gnerate a scheduling offset in accordance with the predetermined slot offset K0 based on the subcarrier spacing of the PDCCH.

Next, a method for estimating an uplink channel by using a sounding reference signal (SRS) transmission of the UE will be described. The base station may configure at least one SRS configuration for each uplink BWP in order to transfer configuration information for SRS transmission to the UE, and may configure at least one SRS resource set for each SRS configuration. As an example, the base station and the UE may exchange higher layer signaling information as follows in order to transfer information about the SRS resource set:

- srs-ResourceSetId: SRS resource set index;
- srs-ResourceIdList: a set of SRS resource indexes referenced in the SRS resource set;
- resourceType: This is the time-domain transmission configuration of the SRS resource referenced in the SRS resource set, and may be configured to be one of "periodic," "semi-persistent," and "aperiodic." If the resourceType is configured to be "periodic" or "semi-persistent," the associated CSI-RS information may be provided according to the usage of the SRS resource set. If the resourceType is configured to be "aperiodic," an aperiodic SRS resource trigger list and slot offset information may be provided, and associated CSI-RS information may be provided according to the usage of the SRS resource set;
- usage: is a configuration for the usage of the SRS resource referenced in the SRS resource set, and may be configured to be one of "beamManagement," "codebook," "nonCodebook," and "antennaSwitching"; And/or
- alpha, p0, pathlossReferenceRS, srs-PowerControlAdjustmentStates: provides parameter configurations for adjusting the transmit power of the SRS resource referenced in the SRS resource set.

The UE may understand that the SRS resource included in the set of SRS resource indexes referenced in the SRS resource set follows the information configured in the SRS resource set.

In addition, the base station and the UE may transmit or receive higher layer signaling information in order to transfer individual configuration information for the SRS resource. As an example, the individual configuration information for the SRS resource may include time-frequency domain mapping information in a slot of the SRS resource, and the time-frequency domain mapping information may include information about frequency hopping in a slot or between slots of the SRS resource. In addition, the individual configuration information for the SRS resource may include the time-domain transmission configuration of the SRS resource, and may be configured to be one of "periodic," "semi-persistent," and "aperiodic." The individual configuration information may be limited to have the same time-domain transmission configuration as the SRS resource set including the SRS resource. If the time-domain transmission configuration of the SRS resource is configured to be "periodic" or "semi-persistent," the SRS resource transmission period and slot offset (e.g., periodicityAndOffset) may be additionally included in the time-domain transmission configuration.

The base station may activate, deactivate, or trigger SRS transmission to the UE via higher layer signaling including RRC signaling or MAC CE signaling, or L1 signaling (e.g., DCI). For example, the base station may activate or deactivate periodic SRS transmission to the UE via higher layer signaling. The base station may indicate the UE to activate the SRS resource set, in which the resourceType is configured as periodic, via higher layer signaling, and the UE may transmit a SRS based on the SRS resource referenced in the activated SRS resource set. The time-frequency domain resource mapping in a slot of the transmitted SRS resource follows the resource mapping information configured in the SRS resource, and the slot mapping including the transmission period and the slot offset follows the periodicityAndOffset configured in the SRS resource. In addition, the spatial domain transmission filter applied to the SRS resource to be transmitted may refer to spatial relation info configurerd in the SRS resource, or may refer to associated CSI-RS information configured in the SRS resource set including the SRS resource. The UE may transmit the SRS resource within the uplink BWP activated for the periodic SRS resource activated via higher layer signaling.

For example, the base station may activate or deactivate semi-persistent SRS transmission to the UE via higher layer signaling. The base station may indicate to activate the SRS resource set through MAC CE signaling, and the UE may transmit a SRS based on the SRS resource referenced in the activated SRS resource set. The SRS resource set activated through MAC CE signaling may be limited to the SRS resource set in which the resourceType is configured to be semi-persistent. The time-frequency domain resource mapping in a slot of the SRS resource to be transmitted follows the resource mapping information configured in the SRS resource, and the slot mapping including the transmission period and the slot offset follows the periodicityAndOffset configured in the SRS resource. In addition, the spatial domain transmission filter applied to the SRS resource to be transmitted may refer to spatial relation info configured in the SRS resource, or may refer to associated CSI-RS information configured in the SRS resource set including the SRS resource. If spatial relation info is configured in the SRS resource, a spatial domain transmission filter may be determined, not based on the configured spatial relation info, but by referring to configuration information for the spatial relation info transfered through MAC CE signaling that activates semi-persistent SRS transmission. The UE may transmit a SRS based on the SRS resource in the uplink BWP activated for the semi-persistent SRS resource activated via higher layer signaling.

For example, the base station may trigger aperiodic SRS transmission to the UE through DCI. The base station may indicate one of aperiodic SRS resource triggers (aperiodicSRS-ResourceTrigger) through an SRS request field of DCI. The UE may understand that the SRS resource set including the aperiodic SRS resource trigger indicated through DCI in the aperiodic SRS resource trigger list, among the configuration information of the SRS resource set, is triggered. The UE may transmit a SRS based on the SRS resource referenced in the triggered SRS resource set. The time-frequency domain resource mapping in the slot of the SRS resource to be transmitted follows the resource mapping information configured in the SRS resource. In addition, the slot mapping of the resource of the SRS to be transmitted may be determined through the slot offset between the PDCCH including DCI and the SRS resource, and the slot offset may refer to the value(s) included in the slot offset set configured in the SRS resource set. Specifically, the slot offset between the PDCCH including DCI and the resource of the SRS may be applied with a value indicated in the time domain resource assignment field of DCI among the offset value(s) included in the slot offset set configured in the SRS resource set. In addition, the spatial domain transmission filter applied to the SRS resource to be transmitted may refer to spatial relation info configured in the SRS resource, or may refer to associated CSI-RS information configured in the SRS resource set including the SRS resource. The UE may transmit a SRS based on the SRS resource in the uplink BWP activated for the aperiodic SRS resource triggered through DCI.

When the base station triggers aperiodic SRS transmission to the UE through DCI, in order for the UE to transmit the SRS by applying the configuration information for the SRS resource thereto, the minimum time interval between the PDCCH including the DCI for triggering the aperiodic SRS transmission and the transmitted SRS may be required. The time interval for SRS transmission of the UE may be defined as the number of symbols between the first symbol to which the SRS resource, which is transmitted first among the transmitted SRS resource(s), is mapped, and the last symbol of the PDCCH including the DCI for triggering aperiodic SRS transmission. The minimum time interval may be determined by making reference to PUSCH preparation procedure time required for UE to prepare PUSCH transmission.

In addition, the minimum time interval may have a different value depending on the usage of the SRS resource set including the transmitted SRS resource. For example, the minimum time interval may be determined as an N2 symbol defined in consideration of the UE processing capability according to the UE capability by making reference to the PUSCH preparation procedure time of the UE. In addition, if the usage of the SRS resource set is configured to be "codebook" or "antennaSwitching" by considering the usage of the SRS resource set including the transmitted SRS resource, the minimum time interval is configured to be N2 symbol, and if the usage of the SRS resource set is configured to be "nonCodebook" or "beamManagement," the minimum time interval may be configured to be N2+14 symbol. If the time interval for aperiodic SRS transmission is greater than or equal to the minimum time interval, the UE may transmit the aperiodic SRS, and if the time interval for aperiodic SRS transmission is less than the minimum time interval, the UE may ignore DCI for triggering the aperiodic SRS.

TABLE 16-1

| | |
|---|---|
| SRS-Resource ::= | SEQUENCE { |
| srs-ResourceId | SRS-ResourceId, |
| nrofSRS-Ports | ENUMERATED {port1, ports2, ports4}, |
| ptrs-PortIndex | ENUMERATED {n0, n1 } OPTIONAL,  -- Need R |
| transmissionComb | CHOICE { |
| n2 | SEQUENCE { |
| combOffset-n2 | INTEGER (0..1), |
| cyclicShift-n2 | INTEGER (0..7) |
| }, | |
| n4 | SEQUENCE { |
| combOffset-n4 | INTEGER (0..3), |
| cyclicShift-n4 | INTEGER (0..11) |
| } | |
| }, | |
| resourceMapping | SEQUENCE { |
| startPosition | INTEGER (0..5), |
| nrofSymbols | ENUMERATED {n1, n2, n4}, |
| repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
| c-SRS | INTEGER (0..63), |
| b-SRS | INTEGER (0..3), |
| b-hop | INTEGER (0..3) |
| }, | |
| groupOrSequenceHopping | ENUMERATED { neither, groupHopping, sequenceHopping }, |
| resourceType | CHOICE { |
| aperiodic | SEQUENCE { |
| ... | |
| }, | |

TABLE 16-1-continued

```
    semi-persistent             SEQUENCE {
        periodicityAndOffset-sp         SRS-
PeriodicityAndOffset,
        ...
    },
    periodic                    SEQUENCE {
        periodicityAndOffset-p          SRS-
PeriodicityAndOffset,
        ...
    }
  },
  sequenceId                    INTEGER (0..1023),
  spatialRelationInfo           SRS-SpatialRelationInfo
OPTIONAL,    -- Need R
  ...
}
```

The spatialRelationInfo configuration information in Table 16-1 is allowed to be applied to the beam information of the reference signal and a beam used for the corresponding SRS transmission by referring to one reference signal. For example, the configuration of spatialRelationInfo may include information as shown in Table 16-2 below.

TABLE 16-2

```
SRS-SpatialRelationInfo ::=  SEQUENCE {
    servingCellId            ServCellIndex   OPTIONAL,
-- Need S
    referenceSignal          CHOICE {
        ssb-Index                SSB-Index,
        csi-RS-Index             NZP-CSI-RS-ResourceId,
        srs                      SEQUENCE {
            resourceId               SRS-ResourceId,
            uplinkBWP                BWP-Id
        }
    }
}
```

Referring to the spatialRelationInfo configuration, an SS/PBCH block index, CSI-RS index, or SRS index may be configured as an index of a reference signal to be referenced in order to use beam information of a specific reference signal. The higher layer signaling referenceSignal is configuration information indicating which reference signal beam information is to be referred to for the corresponding SRS transmission, ssb-Index denotes the index of the SS/PBCH block, csi-RS-Index denotes the index of the CSI-RS, and srs denotes the index of the SRS. If the value of the higher layer signaling referenceSignal is configured to be "ssb-Index," the UE may apply a reception beam used when receiving the SS/PBCH block corresponding to the ssb-Index as a transmission beam of the corresponding SRS transmission. If the value of the higher layer signaling referenceSignal is configured to be "csi-RS-Index," the UE may apply a reception beam used when receiving the CSI-RS corresponding to the csi-RS-Index as a transmission beam of the corresponding SRS transmission. If the value of the higher layer signaling referenceSignal is configured to be "srs," the UE may apply a transmission beam used when transmitting the SRS corresponding to srs as a transmission beam of the corresponding SRS transmission.

Next, a method of scheduling PUSCH transmission will be described. PUSCH transmission may be dynamically scheduled by a UL grant in DCI or may be operated by a configured grant Type 1 or Type 2. Dynamic scheduling indication for PUSCH transmission is possible using DCI format 0_0 or 0_1.

Configured grant Type 1 PUSCH transmission does not receive a UL grant in DCI, and may be semi-statically configured through reception of configuredGrantConfig including rrc-ConfiguredUplinkGrant of Table 16-3 via higher layer signaling. Configured grant Type 2 PUSCH transmission may be semi-persistently scheduled by UL grant in DCI after reception of configuredGrantConfig that does not include the rrc-ConfiguredUplinkGrant of Table 16-3 via higher layer signaling. When PUSCH transmission is operated by a configured grant, parameters applied to PUSCH transmission are applied through configuredGrantConfig, which is higher layer signaling of Table 16-3, except for dataScramblingIdentityPUSCH, txConfig, codebookSubset, maxRank, and scaling of UCI-OnPUSCH, which are provided by pusch-Config of Table 16-4, which is higher layer signaling. If the UE is provided with transformPrecoder in configuredGrantConfig, which is higher layer signaling of Table 16-3, the UE applies tp-pi2BPSK in the pusch-Config of Table 16-4 with regagrd to PUSCH transmission operated by the configured grant.

TABLE 16-3

```
ConfiguredGrantConfig ::=    SEQUENCE {
    frequencyHopping             ENUMERATED {intraSlot, interSlot}
OPTIONAL,   -- Need S,
    cg-DMRS-Configuration        DMRS-UplinkConfig,
    mcs-Table                    ENUMERATED {qam256,
qam64LowSE}                                             OPTIONAL,  -- Need
S
    mcs-TableTransformPrecoder   ENUMERATED {qam256, qam64LowSE}
OPTIONAL,   -- Need S
    uci-OnPUSCH                  SetupRelease { CG-UCI-OnPUSCH }
OPTIONAL,   -- Need M
    resourceAllocation           ENUMERATED { resourceAllocationType0,
resourceAllocationType1, dynamicSwitch },
    rbg-Size                     ENUMERATED {config2}
```

TABLE 16-3-continued

```
OPTIONAL,    -- Need S
  powerControlLoopToUse        ENUMERATED {n0, n1},
  p0-PUSCH-Alpha               P0-PUSCH-AlphaSetId,
  transformPrecoder            ENUMERATED {enabled, disabled}
OPTIONAL,    -- Need S
  nrofHARQ-Processes           INTEGER(1..16),
  repK                          ENUMERATED {n1, n2, n4, n8},
  repK-RV                       ENUMERATED {s1-0231, s2-0303, s3-
0000}                          OPTIONAL,   -- Need R
  periodicity                  ENUMERATED {
                                         sym2, sym7, sym1x14,
sym2x14, sym4x14, sym5x14, sym8x14, sym10x14, sym16x14, sym20x14,
                                         sym32x14, sym40x14,
sym64x14, sym80x14, sym128x14, sym160x14, sym256x14, sym320x14, sym512x14,
                                         sym640x14, sym1024x14,
sym1280x14, sym2560x14, sym5120x14,
                                         sym6, sym1x12, sym2x12,
sym4x12, sym5x12, sym8x12, sym10x12, sym16x12, sym20x12, sym32x12,
                                         sym40x12, sym64x12,
sym80x12, sym128x12, sym160x12, sym256x12, sym320x12, sym512x12, sym640x12,
                                         sym1280x12, sym2560x12
  },
  configuredGrantTimer         INTEGER (1..64)
OPTIONAL,    -- Need R
  rrc-ConfiguredUplinkGrant    SEQUENCE {
    timeDomainOffset                 INTEGER (0..5119),
    timeDomainAllocation             INTEGER (0..15),
    frequencyDomainAllocation        BIT STRING (SIZE(18)),
    antennaPort                      INTEGER (0..31),
    dmrs-SeqInitialization           INTEGER (0..1)
OPTIONAL,    -- Need R
    precodingAndNumberOfLayers       INTEGER (0..63),
    srs-ResourceIndicator            INTEGER (0..15)
OPTIONAL,    -- Need R
    mcsAndTBS                        INTEGER (0..31),
    frequencyHoppingOffset           INTEGER (1..
maxNrofPhysicalResourceBlocks-1)     OPTIONAL,  -- Need R
    pathlossReferenceIndex           INTEGER (0..maxNrofPUSCH-
PathlossReferenceRSs-1),
    ...
  }
OPTIONAL,    -- Need R
  ...
}
```

Next, a PUSCH transmission method will be described. A DMRS antenna port for PUSCH transmission is the same as an antenna port for SRS transmission. PUSCH transmission may be based on a codebook-based transmission method and a non-codebook-based transmission method, respectively, depending on whether the value of txConfig in pusch-Config of Table 16-4, which is higher layer signaling, is "codebook" or "nonCodebook."

As described above, PUSCH transmission may be dynamically scheduled through DCI format 0_0 or 0_1, and may be semi-statically configured by a configured grant. If the UE is indicated to schedule PUSCH transmission through DCI format 0_0, the UE performs beam configuration for PUSCH transmission by using pucch-spatialRelationInfoID corresponding to the UE-specific PUCCH resource corresponding to the minimum ID in the uplink BWP activated in the serving cell, and here, PUSCH transmission is based on a single antenna port. The UE does not expect scheduling for PUSCH transmission through DCI format 0_0 within a BWP in which the PUCCH resource including the pucch-spatialRelationInfo is not configured. If the UE has not configured with txConfig in pusch-Config of Table 16-4, the UE does not expect to be scheduled in DCI format 0_1.

TABLE 16-4

```
PUSCH-Config ::=               SEQUENCE {
  dataScramblingIdentityPUSCH      INTEGER (0..1023)
OPTIONAL,   -- Need S
  txConfig                         ENUMERATED {codebook,
nonCodebook}                         OPTIONAL,   -- Need S
  dmrs-UplinkForPUSCH-MappingTypeA  SetupRelease { DMRS-
UplinkConfig }                       OPTIONAL,   -- Need M
  dmrs-UplinkForPUSCH-MappingTypeB  SetupRelease { DMRS-
UplinkConfig }                       OPTIONAL,   -- Need M
  pusch-PowerControl               PUSCH-PowerControl
OPTIONAL,   -- Need M
  frequencyHopping                 ENUMERATED {intraSlot, interSlot}
OPTIONAL,   -- Need S
  frequencyHoppingOffsetLists      SEQUENCE (SIZE (1..4)) OF
INTEGER (1.. maxNrofPhysicalResourceBlocks-1)
```

TABLE 16-4-continued

```
OPTIONAL,   -- Need M
    resourceAllocation                      ENUMERATED
{ resourceAllocationType0, resourceAllocationType1, dynamicSwitch},
    pusch-TimeDomainAllocationList          SetupRelease { PUSCH-
TimeDomainResourceAllocationList }          OPTIONAL,   -- Need M
    pusch-AggregationFactor                 ENUMERATED { n2, n4, n8 }
OPTIONAL,   -- Need S
    mcs-Table                               ENUMERATED {qam256,
qam64LowSE}                                     OPTIONAL,   -- Need S
    mcs-TableTransformPrecoder              ENUMERATED {qam256,
qam64LowSE}                                     OPTIONAL,   -- Need S
    transformPrecoder                       ENUMERATED {enabled, disabled}
OPTIONAL,   -- Need S
    codebookSubset                          ENUMERATED
{fullyAndPartialAndNonCoherent, partialAndNonCoherent,nonCoherent}
OPTIONAL, -- Cond codebookBased
    maxRank                                 INTEGER (1..4)
OPTIONAL, -- Cond codebookBased
    rbg-Size                                ENUMERATED { config2}
OPTIONAL, -- Need S
    uci-OnPUSCH                             SetupRelease { UCI-OnPUSCH}
OPTIONAL, -- Need M
    tp-pi2BPSK                              ENUMERATED {enabled}
OPTIONAL, -- Need S
    ...
}
```

Next, codebook-based PUSCH transmission will be described. Codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by a configured grant, the UE determines a precoder for PUSCH transmission based on an SRS resource indicator (SRI), a transmission precoding matrix indicator (TPMI), and a transmission rank (the number of PUSCH transport layers).

Here, the SRI may be given through a field SRS resource indicator in DCI or may be configured through srs-ResourceIndicator, which is higher layer signaling. The UE is configured with at least one SRS resource when transmitting a codebook-based PUSCH, and may be configured with up to two SRS resoureces. When the UE is provided with an SRI through DCI, the SRS resource indicated by the corresponding SRI denotes an SRS resource corresponding to the SRI among SRS resources transmitted before the PDCCH including the corresponding SRI. In addition, TPMI and transmission rank may be given through field precoding information and number of layers in DCI, or may be configured through precodingAndNumberOfLayers, which is higher layer signaling. TPMI is used to indicate a precoder applied to PUSCH transmission. If the UE is configured with one SRS resource, the TPMI is used to indicate a precoder to be applied in the configured one SRS resource. If the UE is configured with multiple SRS resources, the TPMI is used to indicate a precoder to be applied in the SRS resource indicated through the SRI.

A precoder to be used for PUSCH transmission is selected from an uplink codebook having the same number of antenna ports as the value of nrofSRS-Ports in SRS-Config, which is higher layer signaling. In codebook-based PUSCH transmission, the UE determines a codebook subset based on the TPMI and codebookSubset in pusch-Config, which is higher layer signaling. CodebookSubset in pusch-Config, which is higher layer signaling, may be configured with one of "fullyAndPartialAndNonCoherent," "partialAndNonCoherent," or "nonCoherent" based on the UE capability reported by the UE to the base station. If the UE reports "partialAndNonCoherent" as UE capability, the UE does not expect that the value of codebookSubset, which is higher layer signaling, is configured to be "fullyAndPartialAndNonCoherent." In addition, if the UE reports "nonCoherent" as UE capability, the UE does not expect that the value of codebookSubset, which is higher layer signaling, is configured to be "fullyAndPartialAndNonCoherent" or "partialAndNonCoherent." When nrofSRS-Ports in SRS-ResourceSet, which is higher layer signaling, indicates two SRS antenna ports, the UE does not expect that the value of codebookSubset, which is higher layer signaling, is configured to be "partialAndNonCoherent."

The UE may be configured with one SRS resource set in which the value of usage in the SRS-ResourceSet, which is higher layer signaling, is configured to be "codebook," and one SRS resource in the corresponding SRS resource set may be indicated through SRI. If multiple SRS resources are configured in the SRS resource set in which the usage value in the SRS-ResourceSet, which is higher layer signaling, is configured to be "codebook," the UE expects that the values of nrofSRS-Ports in the SRS-Resource, which is higher layer signaling, are configured to be the same value with respect to all SRS resources.

The UE transmits, to the base station, an SRS based on one or multiple SRS resources included in the SRS resource set in which the value of usage is configured to be "codebook" according to higher layer signaling, and the base station indicates the UE to perform PUSCH transmission by selecting one of the SRS resources used by the UE and using transmission beam information of the corresponding SRS resource. Here, in the codebook-based PUSCH transmission, the SRI is used as information for selection of the index of one SRS resource and is included in the DCI. Additionally, the base station includes, in the DCI, information indicating a rank and a TPMI to be used by the UE for PUSCH transmission. The UE performs PUSCH transmission by using the SRS resource indicated by the SRI and applying a rank indicated based on the transmission beam of the SRS resource and a precoder indicated by the TPMI.

Next, non-codebook-based PUSCH transmission will be described. Non-codebook-based PUSCH transmission may be dynamically scheduled through DCI format 0_0 or 0_1, and may be semi-statically operated by a configured grant.

When at least one SRS resource is configured in the SRS resource set in which the value of usage in the SRS-ResourceSet, which is higher layer signaling, is configured to be "nonCodebook," the UE may be scheduled with non-codebook-based PUSCH transmission through DCI format 0_1.

For the SRS resource set in which the value of usage in the SRS-ResourceSet, which is higher layer signaling, is configured to be "nonCodebook," the UE may be configured with one connected (or, associated) NZP CSI-RS resource (non-zero power CSI-RS). The UE may perform calculation of the precoder for SRS transmission by measuring the NZP CSI-RS resource connected to (or, associated with) the SRS resource set. If the difference between the last received symbol of the aperiodic NZP CSI-RS resource connected to the SRS resource set and the first symbol of aperiodic SRS transmission in the UE is less than 42 symbols, the UE does not expect information on the precoder for SRS transmission to be updated.

When the value of resourceType in the SRS-ResourceSet, which is higher layer signaling, is configured to be "aperiodic," the connected NZP CSI-RS is indicated by SRS request, which is a field in DCI format 0_1 or 1_1. Here, if the connected (or, associated) NZP CSI-RS resource is an aperiodic NZP CSI-RS resource, the connected (or, associated) NZP CSI-RS exists when the value of the SRS request field in DCI format 0_1 or 1_1 is not "00." In this case, the DCI may not indicate cross carrier or cross BWP scheduling. In addition, if the value of the SRS request indicates the existence of the NZP CSI-RS, the corresponding NZP CSI-RS is located in a slot in which a PDCCH including the SRS request field is transmitted. Here, TCI states configured via the scheduled subcarrier are not configured to be QCL-TypeD.

If a periodic or semi-persistent SRS resource set is configured, the connected (or, associated) NZP CSI-RS may be indicated through associatedCSI-RS in the SRS-ResourceSet, which is higher layer signaling. For non-codebook-based transmission, the UE does not expect that spatialRelationInfo, which is higher layer signaling for SRS resource, and associatedCSI-RS in SRS-ResourceSet, which is higher layer signaling, are configured together.

When the UE is configured with multiple SRS resources, the UE may determine a precoder to be applied to PUSCH transmission and a transmission rank, based on the SRI indicated by the base station. Here, the SRI may be indicated through a field SRS resource indicator in DCI or may be configured through srs-ResourceIndicator, which is higher layer signaling. As in the above-described codebook-based PUSCH transmission, when the UE is provided with an SRI through DCI, an SRS resource indicated by the SRI denotes an SRS resource corresponding to the SRI among SRS resources transmitted before the PDCCH including the SRI. The UE may use one or multiple SRS resources for SRS transmission, and the maximum number of SRS resources that can be simultaneously transmitted in the same symbol in one SRS resource set are determined by UE capability reported by the UE to the base station. Here, the SRS resources simultaneously transmitted by the UE occupy the same RB. The UE configures one SRS port for each SRS resource. Only one SRS resource set in which the value of usage in the SRS-ResourceSet, which is higher layer signaling, is configured to be "nonCodebook" can be configured, and up to four SRS resources for non-codebook-based PUSCH transmission can be configured.

The base station transmits one NZP-CSI-RS connected to (or, associated with) the SRS resource set to the UE, and the UE performs calculation of a precoder to be used for transmission of one or multiple SRS resources in the corresponding SRS resource set based on a result of measurement at the time of reception of the NZP-CSI-RS. The UE applies, to the base station, the calculated precoder when transmitting one or multiple SRS resources in the SRS resource set in which usage is configured to be "nonCodebook," and the base station selects one or multiple SRS resources among the received one or multiple SRS resources. In this case, in non-codebook-based PUSCH transmission, the SRI indicates an index capable of expressing one or a combination of multiple SRS resources, and the SRI is included in the DCI. Here, the number of SRS resources indicated by the SRI transmitted by the base station may be the number of transmission layers of the PUSCH, and the UE performs PUSCH transmission by applying a precoder applied for SRS resource transmission to each layer.

Next, a PUSCH preparation procedure time will be described. When the base station schedules the UE to transmit a PUSCH using DCI format 0_0 or DCI format 0_1, the UE may require a PUSCH preparation procedure time for transmission of a PUSCH by applying transmission methods indicated through DCI (transmission precoding method of SRS resource, number of transmission layers, or spatial domain transmission filter). In NR, the PUSCH preparation procedure time is defined in consideration of the above methods. The PUSCH preparation procedure time of UE may follow Equation 3 below.

$$T_{proc,2}=\max((N_2+d_{2,1}+d_2)(2048+144)\kappa 2^{-\mu}T_c+T_{ext}+T_{switch},d_{2,2}).$$

Each variable in the above Tproc,2 may have the following meaning:

N2: the number of symbols determined according to numerology $\mu$ and UE processing capability 1 or 2 according to the UE capability. When UE processing capability 1 is reported according to the capability report of the UE, N2 may have the value of Table 16-5. Further, when UE processing capability 2 is reported and it is configured that UE processing capability 2 can be used via higher layer signaling, N2 may have the value of Table 16-6.

TABLE 16-5

| $\mu$ | PUSCH preparation time $N_2$ [symbols] |
|---|---|
| 0 | 10 |
| 1 | 12 |
| 2 | 23 |
| 3 | 36 |

TABLE 16-6

| $\mu$ | PUSCH preparation time $N_2$ [symbols] |
|---|---|
| 0 | 5 |
| 1 | 5.5 |
| 2 | 11 for frequency range 1 | d2,1: the number of symbols configured to be 0 when all resource elements of the first OFDM symbol of PUSCH transmission are configured to include only DM-RS, and otherwise, the number of symbols configured to be 1;

$\kappa$: 64

$\mu$: follows $\mu_{DL}$ or $\mu_{UL}$, which makes Tproc,2 larger. $\mu_{DL}$ denotes a downlink numerology in which a PDCCH including a DCI for scheduling a PUSCH is transmitted, and $\mu_{UL}$ denotes an uplink numerology in which a PUSCH is transmitted;

Tc: has $1/(\Delta f_{max} \cdot N_f)$, $\Delta f_{max}=480 \cdot 10^3$Hz, and $N_f=4096$;

d2,2: is based on the BWP switching time when DCI for scheduling PUSCH indicates BWP switching, and otherwise it has the value of 0;

d2: when OFDM symbols of a PUCCH, a PUSCH having a high priority index, and a PUCCH having a low priority index overlap in a time domain, the d2 value of the PUSCH having a high priority index is used. Otherwise, d2 has the value of 0;

Text: when the UE uses a shared spectrum channel access method, the UE may calculate text and apply the calculated text to PUSCH preparation procedure time. Otherwise, Ttext is assumed to be 0; and/or Tswitch: when the uplink switching interval is triggered, Tswitch is assumed to be the switching interval time. Otherwise, Tswitch is assumed to be 0.

The base station and the UE may determine that the PUSCH preparation procedure time is not sufficient, when considering time-domain resource mapping information of the PUSCH scheduled through DCI and timing advance (TA) effect between uplink and downlink, if the first symbol of the PUSCH starts earlier than the first uplink symbol where the CP starts after Tproc,2 from the last symbol of the PDCCH including the DCI for scheduling the PUSCH. If not, the base station and the UE determine that the PUSCH preparation procedure time is sufficient. The UE may transmit the PUSCH only if the PUSCH preparation procedure time is sufficient, and may ignore the DCI for scheduling the PUSCH when the PUSCH preparation procedure time is not sufficient.

Next, PUSCH repetitive transmission will be described. When the UE is scheduled with PUSCH transmission in DCI format 0_1 in the PDCCH including CRC scrambled by C-RNTI, MCS-C-RNTI, or CS-RNTI, if the UE is configured with higher layer signaling pusch-AggregationFactor, the same symbol allocation is applied in consecutive slots equal to the pusch-AggregationFactor, and PUSCH transmission is limited to single rank transmission. For example, the UE may repeat the same TB in consecutive slots equal to pusch-AggregationFactor, and may apply the same symbol allocation to each slot. Table 16-7 shows the redundancy version applied to PUSCH repetitive transmission for each slot. If the UE is scheduled with PUSCH repetitive transmission in DCI format 0_1 in multiple slots, and if at least one symbol, in the slots in which PUSCH repetitive transmission is performed according to information of higher layer signaling tdd-UL-DL-ConfigurationCommon or tdd-UL-DL-ConfigurationDedicated, is indicated as a downlink symbol, the UE does not perform PUSCH transmission in a slot in which the corresponding symbol is located.

TABLE 16-7

| rv$_{id}$ indicated by the DCI scheduling the PUSCH | rv$_{id}$ to be applied to n$^{th}$ transmission occasion | | | |
| --- | --- | --- | --- | --- |
| | n mode 4 = 0 | n mode 4 = 1 | n mode 4 = 2 | n mode 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel in a 5G system will be described in detail. In the 5G system, two types of repetitive transmission methods of the uplink data channel are supported: PUSCH repetitive transmission type A and PUSCH repetitive transmission type B. The UE may be configured with one of PUSCH repetitive transmission types A and B via higher layer signaling.

In one example of PUSCH repetitive transmission type A:

As described above, the position of the start symbol and the symbol length of the uplink data channel are determined in one slot by a time-domain resource allocation method, and a base station may provide notification of the number of repetitive transmissions to a UE via higher layer signaling (e.g., RRC signaling) or L1 signaling (e.g., DCI); and The UE may perform repetitive transmission, in consecutive slots, of an uplink data channel having the same uplink data channel length and start symbol as configured based on the number of repetitive transmissions received from the base station. Here, if a slot configured for downlink by the base station to the UE or at least one symbol among symbols of an uplink data channel configured for the UE are configured for downlink, the UE omits uplink data channel transmission but counts the number of repetitive transmissions of the uplink data channel.

In one example of PUSCH repetitive transmission type B:

As described above, the start symbol and length of the uplink data channel are determined in one slot by the time-domain resource allocation method, and the base station may provide notification of the number of repetitive transmissions to the UE via higher layer signaling (e.g., RRC signaling) or L1 signaling (e.g., DCI);

Based on the first configured start symbol and length of the uplink data channel, nominal repetition of the uplink data channel is determined as follows. A slot in which the nth nominal repetition begins is given by $$K_s + \left\lfloor \frac{S + n \cdot L}{N_{symb}^{slot}} \right\rfloor,$$

and a start symbol in the slot is given by mod(S+n·L, $N_{symb}^{slot}$). A slot in which the nth nominal repetition ends is given by $$K_s + \left\lfloor \frac{S + (n+1) \cdot L - 1}{N_{symb}^{slot}} \right\rfloor,$$

and an end symbol in the slot is given by mod(S+(n+1)·L−1, $N_{symb}^{slot}$). Here, n=0, . . . , number of repetitions-1, S is the start symbol of the configured uplink data channel, and L represents the symbol length of the configured uplink data channel. Ks denotes a slot in which PUSCH transmission starts, and $N_{symb}^{slot}$ denotes the number of symbols for one slot.

The UE determines an invalid symbol for PUSCH repetitive transmission type B. A symbol configured for downlink by tdd-UL-DL-ConfigurationCommon or tdd-UL-DL-ConfigurationDedicated is determined as an invalid symbol for PUSCH repetitive transmission type B. Additionally, an invalid symbol may be configured using a higher layer parameter (e.g., InvalidSymbolPattern). A higher layer parameter (e.g., InvalidSymbolPattern) provides a symbol-level bitmap spanning one or two slots so that invalid symbols can be configured. In the bitmap, "1" represents an invalid symbol. Additionally, the period and pattern of the bitmap may be configured using a higher layer parameter (e.g., periodicityAndPattern). If a higher layer parameter (e.g., InvalidSymbolPattern) is configured and InvalidSymbolPatternIndicator-ForDCIFormat0_1 or InvalidSymbolPatternIndicator-ForDCIFormat0_2 parameter indicates 1, the UE applies an invalid symbol pattern, and if the parameter indicates 0, the UE does not apply the invalid symbol pattern. If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE applies an invalid symbol pattern.

After the invalid symbol is determined, the UE may consider, for each nominal repetition, symbols other than the invalid symbol as valid symbols. If one or more valid symbols are included in each nominal repetition, the nominal repetition may include one or more actual repetitions. Here, each actual repetition includes a consecutive set of valid symbols that can be used for PUSCH repetitive transmission type B in one slot.

Figure 13B:
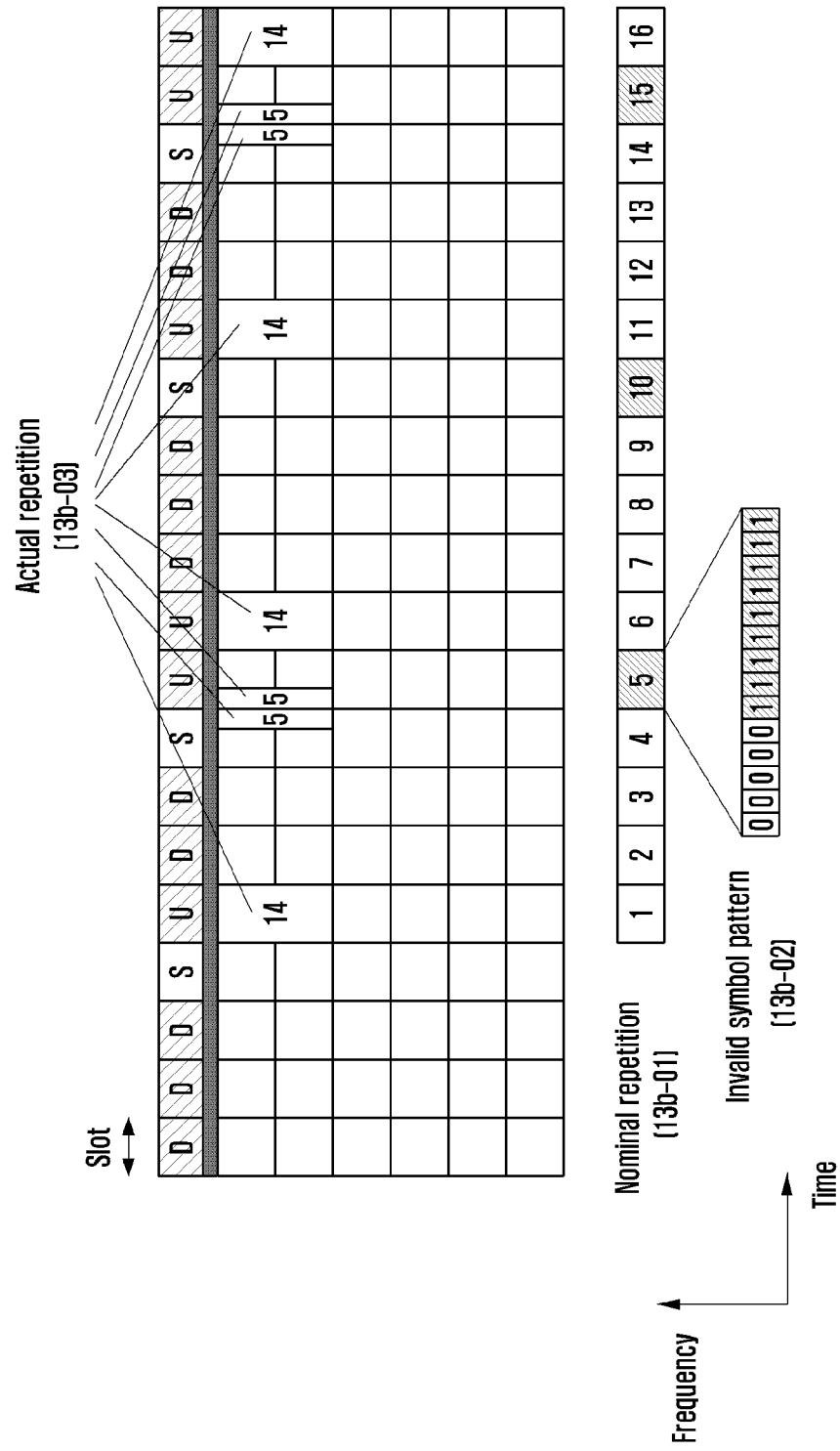
FIG. 13B illustrates an example of PUSCH repetitive transmission type B in a wireless communication system according to an embodiment of the disclosure.

FIG. 13B illustrates an example of PUSCH repetitive transmission type B in a wireless communication system according to an embodiment of the disclosure.

The UE may be configured with the uplink data channel having a start symbol S of 0, the uplink data channel length L of 14, and the number of repetitive transmissions being configured as 16. In this case, nominal repetition is indicated in 16 consecutive slots (indicated by reference numeral 13b-01). Thereafter, the UE may determine a symbol, which is configured as a downlink symbol in each nominal repetition 13b-01, as an invalid symbol. In addition, the UE determines symbols configured to be "1" in an invalid symbol pattern 13b-02 as invalid symbols. In each nominal repetition, when valid symbols, which are not invalid symbols, are configured by one or more consecutive symbols in one slot, the valid symbols are configured as actual repetition and transmitted (indicated by reference numeral 13b-03).

In addition, with regard to PUSCH repetitive transmission, in NR Release 16, the following additional methods may be defined for configured grant-based PUSCH transmission and UL grant-based PUSCH transmission beyond the slot boundary.

In one example of Method 1 (mini-slot level repetition), two or more PUSCH repetitive transmissions are scheduled, through one UL grant, within one slot or beyond the boundary of consecutive slots. In addition, with regard to method 1, time-domain resource allocation information in DCI indicates a resource of the first repetitive transmission. In addition, according to time domain resource information of the first repetitive transmission and the uplink or downlink direction determined for each symbol of each slot, time domain resource information of the remaining repetitive transmissions may be determined. Each repetitive transmission occupies consecutive symbols.

In one example of Method 2 (multi-segment transmission), two or more PUSCH repetitive transmissions are scheduled in consecutive slots through one UL grant. In this case, one transmission is designated for each slot, and different starting points or different repetition lengths may be configured for each of transmissions. In addition, in method 2, the time-domain resource allocation information in DCI indicates the start points and repetition lengths of all repetitive transmissions. In addition, in a case of performing repetitive transmission in a single slot by using method 2, if multiple bundles of consecutive uplink symbols exist in the corresponding slot, each repetitive transmission is performed for each bundle of uplink symbols. If a bundle of consecutive uplink symbols only exists in the corresponding slot, one PUSCH repetitive transmission is performed according to the method of NR Release 15.

In one example of Method 3, two or more PUSCH repetitive transmissions are scheduled in consecutive slots through two or more UL grants. Here, one transmission is designated for each slot, and the n-th UL grant may be received before the PUSCH transmission scheduled with the (n-1)th UL grant ends.

In one example of Method 4, one or multiple PUSCH repetitive transmissions in a single slot, or two or more PUSCH repetitive transmissions spanning the boundary of consecutive slots may be supported through one UL grant or one configured grant. The number of repetitions indicated by the base station to the UE is only a nominal value, and the number of PUSCH repetitive transmissions actually performed by the UE may be greater than the nominal number of repetitions. The time-domain resource allocation information in DCI or in a configured grant denotes a resource of the first repetitive transmission indicated by the base station. Time domain resource information of the remaining repetitive transmissions may be determined by referring to at least resource information of the first repetitive transmission and the uplink or downlink direction of the symbols. If the time domain resource information of the repetitive transmission indicated by the base station spans the slot boundary or includes an uplink/downlink switching point, the repetitive transmission may be divided into multiple repetitive transmissions. In this case, one repetitive transmission may be included for each uplink period in one slot.

Hereinafter, frequency hopping of an uplink data channel (physical uplink shared channel (PUSCH)) in a 5G system will be described in detail.

In 5G, as a frequency hopping method of an uplink data channel, two methods are supported for each PUSCH repetition transmission type. First, PUSCH repetitive transmission type A supports intra-slot frequency hopping and inter-slot frequency hopping, and PUSCH repetitive transmission type B supports inter-repetition frequency hopping and inter-slot frequency hopping.

The intra-slot frequency hopping method supported by PUSCH repetitive transmission type A is a method in which the UE changes the allocated resources of the frequency domain by a configured frequency offset in two hops within one slot and transmits the same. In intra-slot frequency hopping, the start RB of each hop may be expressed by Equation 4.

$$RB_{start} = \begin{cases} RB_{start} & i = 0 \\ (RB_{start} + RB_{offset}) \bmod N_{BWP}^{size} & i = 1 \end{cases} \quad \text{[Equation 4]}$$

In Equation 4, i=0 and i=1 indicate the first hop and the second hop, respectively, and $RB_{start}$ denotes the start RB in the UL BWP and is calculated based on the frequency resource allocation method. $RB_{offset}$ indicates the frequency offset between the two hops through the higher layer parameter. The number of symbols of the first hop may be represented by $[N_{symb}^{PUSCH,s}/2]$ and the number of symbols of the second hop may be represented by $N_{symb}^{PUSCH,s} - [N_{symb}^{PUSCH,s}/2]$. $N_{symb}^{PUSCH,s}$ is the length of PUSCH transmission in one slot, and is represented by the number of OFDM symbols.

Next, the inter-slot frequency hopping method supported by the PUSCH repetitive transmission types A and B is a method in which the UE changes the allocated resources of the frequency domain for each slot by a configured frequency offset and transmits the same. In inter-slot frequency hopping, a start RB during a $n_s^\mu$ slot may be expressed by Equation 5.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In Equation 5, $N_s^\mu$ is a current slot number in multi-slot PUSCH transmission, $RB_{start}$ indicates a start RB in the UL BWP, and is calculated based on a frequency resource allocation method. $RB_{offset}$ denotes a frequency offset between two hops via a higher layer parameter.

Next, the inter-repetition frequency hopping method supported by the PUSCH repetitive transmission type B is to perform transmission by moving a resource, which is allocated in the frequency domain for one or multiple actual repetitions within each nominal repetition, by a configurted frequency offset. RBstart(n), which is the index of the start RB in the frequency domain for one or multiple actual repetitions within the n-th nominal repetition, may be defined by Equation 6 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 6]}$$

In Equation 6, n denotes an index of nominal repetition, and $RB_{offset}$ denotes an RB offset between two hops via a higher layer parameter.

In LTE and NR, the UE may perform a procedure of reporting the UE-supported capability to the corresponding base station while being connected to the serving base station. In the description below, this is referred to as a UE capability report.

The base station transmits a UE capability enquiry message requesting a capability report to the UE which is in a connected state. The UE capability enquiry message may include a UE capability request for each radio access technology (RAT) type of the base station. The request for each RAT type may include supported frequency band information and the like. Further, the UE capability enquiry message may make a request for UE capability for each of multiple RAT types through one RRC message container transmitted by the base station, or the base station may transmit multiple UE capability enquiry messages including a UE capability request for each RAT type to the UE. For example, the UE capability enquiry may be repeated multiple times, and the UE may configure a UE capability information message corresponding to the repeated UE capability enquiry and make multiple reports of the UE capability information message. In the next generation telecommunication system, a UE capability request for NR, LTE, and multi-RAT dual connectivity (MR-DC) including E-UTRA-NR dual connectivity (EN-DC) may be made. Further, in general, the UE capability enquiry message is transmitted initially after the UE establishes a connection with a base station. However, the UE capability enquiry message may be requested under any condition if the base station needs.

In the above operation, the UE, which has received a request for a UE capability report from the base station, configures a UE capability according to frequency band information and a RAT type, which are requested by the base station. A method for configuring a UE capability by a UE in the NR system may be summarized as follows:

1. If the UE receives lists of LTE, and/or NR frequency bands according to a UE capability request from a base station, the UE configures a band combination (BC) of EN-DC and NR stand-alone (SA). For example, the UE configures a candidate BC list for EN-DC and NR SA, based on frequency bands requested, through FreqBandList, by the base station. Further, the bands are prioritized in the order described in the FreqBandList.

2. If the base station requests the UE capability report by setting the "eutra-nr-only" flag or the "eutra" flag, matters relating to NR SA BCs among the configured BC candidate list are completely removed by the UE. This may occur only if the LTE base station (eNB) requests "eutra" capability.

3. Thereafter, the UE removes fallback BCs from the candidate BC list configured in the above operation. Here, the fallback BCs refer to BCs which is obtainable by removing a band corresponding to at least one SCell band from a random BC, and a fallback BC is omittable because a BC before removing a band corresponding to at least one SCell may already cover the fallback BC. This operation is further applied to MR-DC, i.e., LTE bands. The BCs remaining after performing this operation are included in the final "candidate BC list."

4. The UE selects BCs to be reported by selecting BCs suitable for the requested RAT type from the final "candidate BC list." In this operation, the UE configures the supportedBandCombinationList in a predetermined order. That is, the UE configures BCs and a UE capability to report according to a predetermined order of RAT type (nr->eutra-nr->eutra). Further, the UE configures featureSetCombination for the configured supportedBandCombinationList and configures a list of "candidate feature set combinations" from a candidate BC list from which a list of fallback BCs (including the same or lower level capabilities) has been removed. The above "candidate feature set combinations" include all of feature set combinations for NR and EUTRA-NA BC, and may be obtained from feature set combinations of containers of UE-NR-Capabilities and UE-MRDC-Capabilities.

5. Further, if the requested RAT type is EUTRA-NR and makes some influence, featureSetCombinations is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

Figure 14:
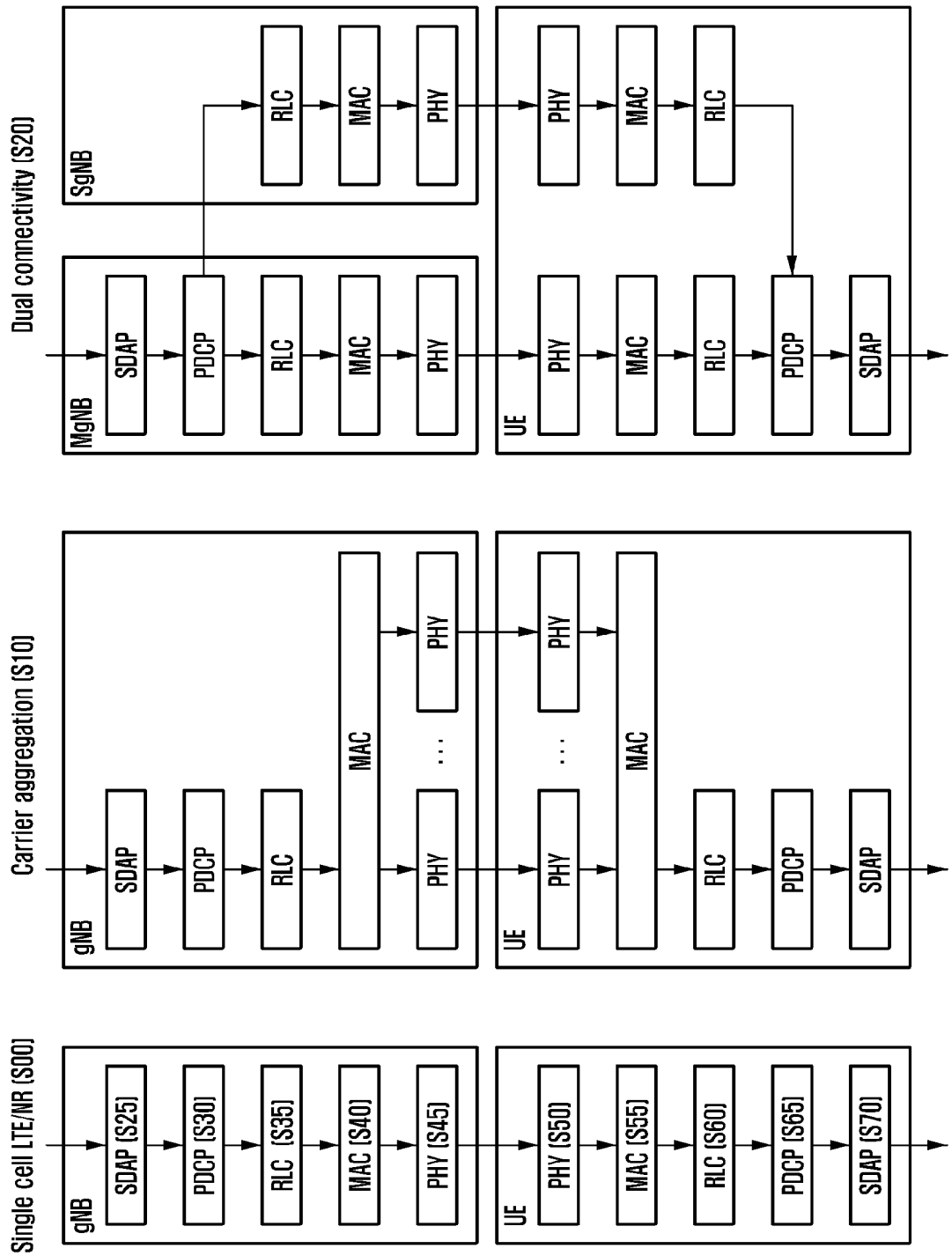
FIG. 14 illustrates a protocol structure of a base station and a UE radio protocol in a single cell, carrier aggregation (CA), and dual connectivity (DC) situation in a wireless communication system according to an embodiment of the disclosure.

FIG. 14 illustrates a radio protocol structure of a base station and a UE in a single cell, carrier aggregation, and dual connectivity situation in a wireless communication system according to an embodiment of the disclosure.

Referring to FIG. 14, the radio protocol of the next generation mobile communication system includes, for each of a UE and an NR base station, NR service data adaptation protocols (NR SDAPs) S25 and S70, NR packet data convergence protocols (NR PDCPs) S30 and S65, and NR radio link controls (NR RLCs) S35 and S60, and NR medium access control (NR MACS) S40 and S55.

The main functions of the NR SPAPs S25 and S70 may include some of the following functions:
Transfer of user plane data;
Mapping between a QoS flow and a data bearer (DRB) for both DL and UL;
Marking QoS flow ID in both DL and UL packets; and/or
Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The main functions of the NR PDCPs S30 and S65 may include some of the following functions:
Header compression and decompression: ROHC only;
Transfer of user data;
In-sequence delivery of higher layer PDUs;
Out-of-sequence delivery of higher layer PDUs;
PDCP PDU reordering for reception;
Duplicate detection of lower layer SDUs;
Retransmission of PDCP SDUs;
Ciphering and deciphering; and/or
Timer-based SDU discard in uplink.

In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs S35 and S60 may include some of the following functions:
Transfer of higher layer PDUs;
In-sequence delivery of higher layer PDUs;
Out-of-sequence delivery of higher layer PDUs;
Error Correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and/or
RLC re-establishment.

The in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU.

In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs S40 and S55 may be connected to multiple NR RLC layer devices configured in one UE, and the main functions of the NR MAC may include some of the following functions:
Mapping between logical channels and transport channels;
Multiplexing/de-multiplexing of MAC SDUs;
Scheduling information reporting;
Error correction through HARQ;
Priority handling between logical channels of one UE;
Priority handling between UEs by means of dynamic scheduling;
MBMS service identification;
Transport format selection; and/or
Padding.

The NR PHY layers S45 and S50 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The detailed structure of the radio protocol structure may be variously changed according to a carrier (or cell) operating method. For example, when the base station performs single carrier (or cell)-based data transmission to the UE, the base station and the UE use a protocol structure, which has a single structure for each layer, such as S00. On the other hand, when the base station transmits data to the UE based on carrier aggregation (CA) using multiple carriers in a single TRP, the base station and the UE has a single structure up to RLC but uses a protocol structure of multiplexing a PHY layer through a MAC layer, such as S10. As another example, when the base station transmits data to the UE based on dual connectivity (DC) using multiple carriers in multiple TRP, the base station and the terminal have a single structure up to RLC, but uses a protocol structure of multiplexing a PHY layer through a MAC layer, such as S20.

According to an embodiment of the disclosure, non-coherent joint transmission (NC-JT) may be used for the UE to receive a PDSCH from multiple TRPs.

Unlike the conventional communication system, 5G wireless communication system can support not only a service requiring a high transmission rate, but also a service having a very short transmission delay and a service requiring a high connection density. In a wireless communication network including multiple cells, transmission and reception points (TRPs), or beams, cooperative communication (coordinated transmission) between respective cells, TRPs, and/or beams may satisfy various service requirements by increasing the strength of a signal received by the UE or efficiently peroming interference control between respective cells, TRPs, and/or beams. For convenience of explanation in the following description of the disclosure, a cell, transmission point, panel, beam, and/or a transmission direction, which can be distinguished by higher layer/L1 parameters such as TCI state or spatial relation information, or indicators such as cell ID, TRP ID, and panel ID, are collectively referred to as a transmission reception point (TRP). Therefore, in actual application, it is possible to appropriately replace TRP by one of the above terms.

Joint transmission (JT) is a representative transmission technology for the above-described cooperative communication, and which performs signal transmission to one UE through multiple different cells, TRPs, and/or beams to increase the throughput or the strength of a signal received by the UE. In the case, channels between the respective cells, TRPs, and/or beams and the UE may have significantly different characteristics. In particular, non-coherent joint transmission (NC-JT) supporting non-coherent precoding between cells, TRPs, and/or beams, individual precoding may require individual precoding, MCS, resource allocation, TCI indication, and the like according to link-specific channel characteristic between each cell, TRP, and/or beam and the UE.

The above-described NC-JT transmission may be applied to at least one channel among a downlink data channel (physical downlink shared channel (PDSCH)), a downlink control channel (physical downlink control channel (PDCCH)), an uplink data channel (physical uplink shared channel (PUSCH)), and an uplink control channel (physical uplink control channel (PUCCH)). During PDSCH transmission, transmission information such as precoding, MCS, resource allocation, and TCI is indicated by DL DCI, and in order to perform NC-JT transmission, the transmission information needs to be independently indicated for each cell, TRP, and/or beam. This is a major factor that increases the payload required for DL DCI transmission, which may adversely affect the reception performance of PDCCH for transmission of DCI. Therefore, it is necessary to carefully design a tradeoff between the amount of DCI information and the control information reception performance for JT support of PDSCH.

Figure 15:
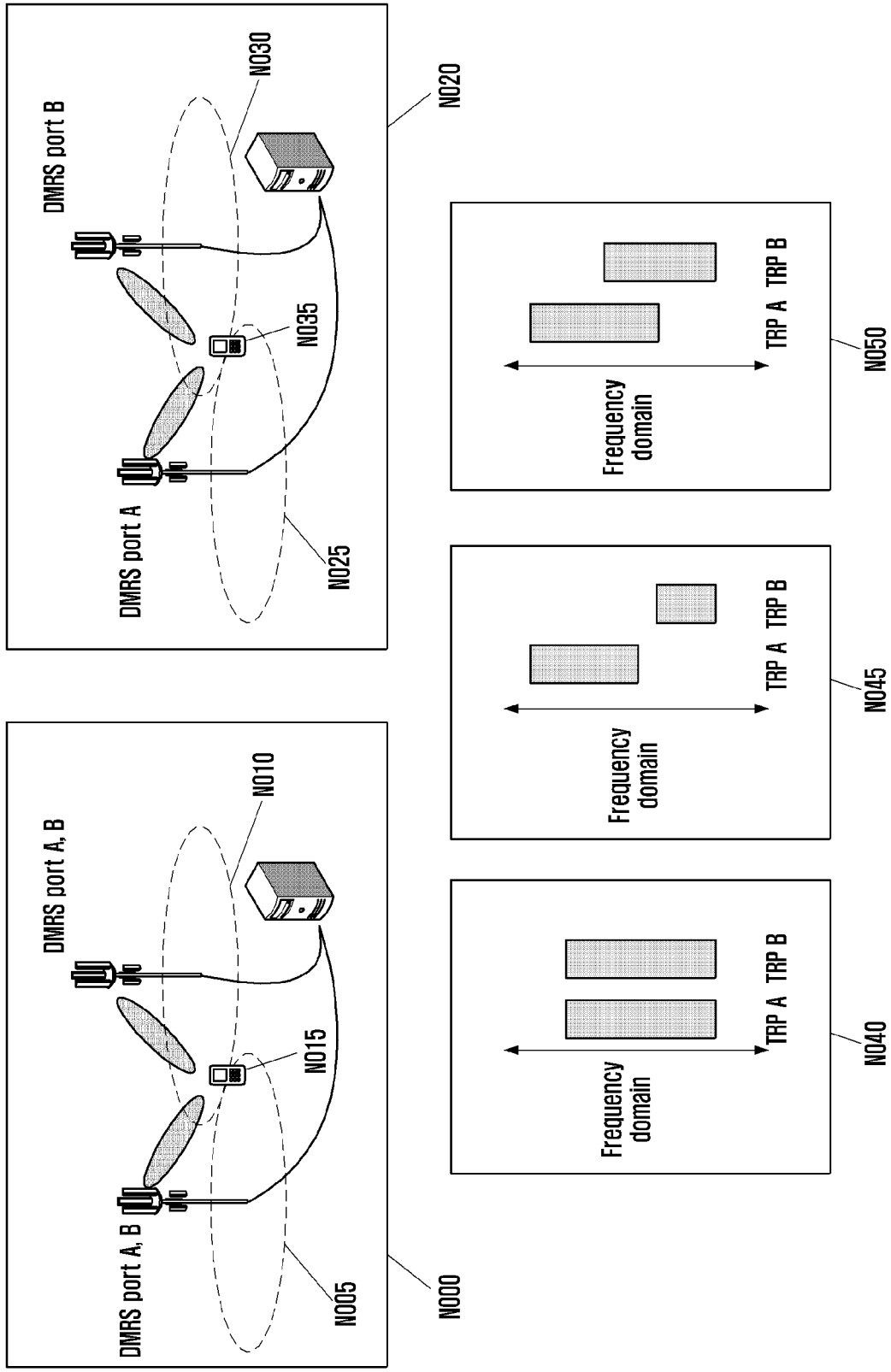
FIG. 15 illustrates an example of an antenna port configuration and resource allocation for cooperative communication in a wireless communication system according to an embodiment of the disclosure.

FIG. 15 illustrates an example of an antenna port configuration and resource allocation for PDSCH transmission using cooperative communication in a wireless communication system according to an embodiment of the disclosure.

Referring to FIG. 15, an example for PDSCH transmission is illustrated according to a joint transmission (JT) scheme, and examples of radio resource allocation for each TRP are illustrated.

In FIG. 15, an example (indicated by reference numeral N000) of coherent joint transmission (NC-JT) supporting coherent precoding between cells, TRPs, and/or beams is shown.

In a case of C-JT, TRP A N005 and TRP B N010 may transmit single data (PDSCH) to the UE N015, and multiple TRPs may perform joint precoding. This may refer that the same DMRS ports are used for the same PDSCH transmission in TRP A N005 and TRP B N010. For example, TRP A N005 and TRP B N010 may transmit DRMS to the UE through DMRS port A and DMRS B, respectively. In this case, the UE may receive one DCI information for receiving one PDSCH demodulated based on the DMRS transmitted through the DMRS ports A and B.

In FIG. 15, an example (indicated by reference numeral N020) of non-coherent joint transmission (NC-JT) supporting non-coherent precoding between respective cells, TRPs, and/or beams is shown.

In a case of NC-JT, a PDSCH is transmitted to the UE N035 for each cell, TRP, and/or beam, and individual precoding may be applied to each PDSCH. Each cell, TRP, and/or beam may be used for transmission of a different PDSCH or a different PDSCH layer to the UE to improve throughput compared to single cell, TRP, and/or beam transmission. In addition, each cell, TRP, and/or beam may repeatedly transmit the same PDSCH to the UE to improve reliability compared to single cell, TRP, and/or beam transmission. For convenience of explantion, a cell, a TRP, and/or a beam is hereinafter collectively referred to as a TRP.

When all the frequency and time resources used for PDSCH transmission by multiple TRPs are the same (indicated by reference numeral N040), when the frequency and time resources used by multiple TRPs do not overlap at all (indicated by reference numeral N045), and when some of the frequency and time resources used by multiple TRPs overlap (indicated by reference numeral N050), various radio resource allocations may be considered.

In order to simultaneously allocate a plurality of PDSCHs to one UE for NC-JT support, DCI of various types, structures, and relationships may be considered.

Figure 16:
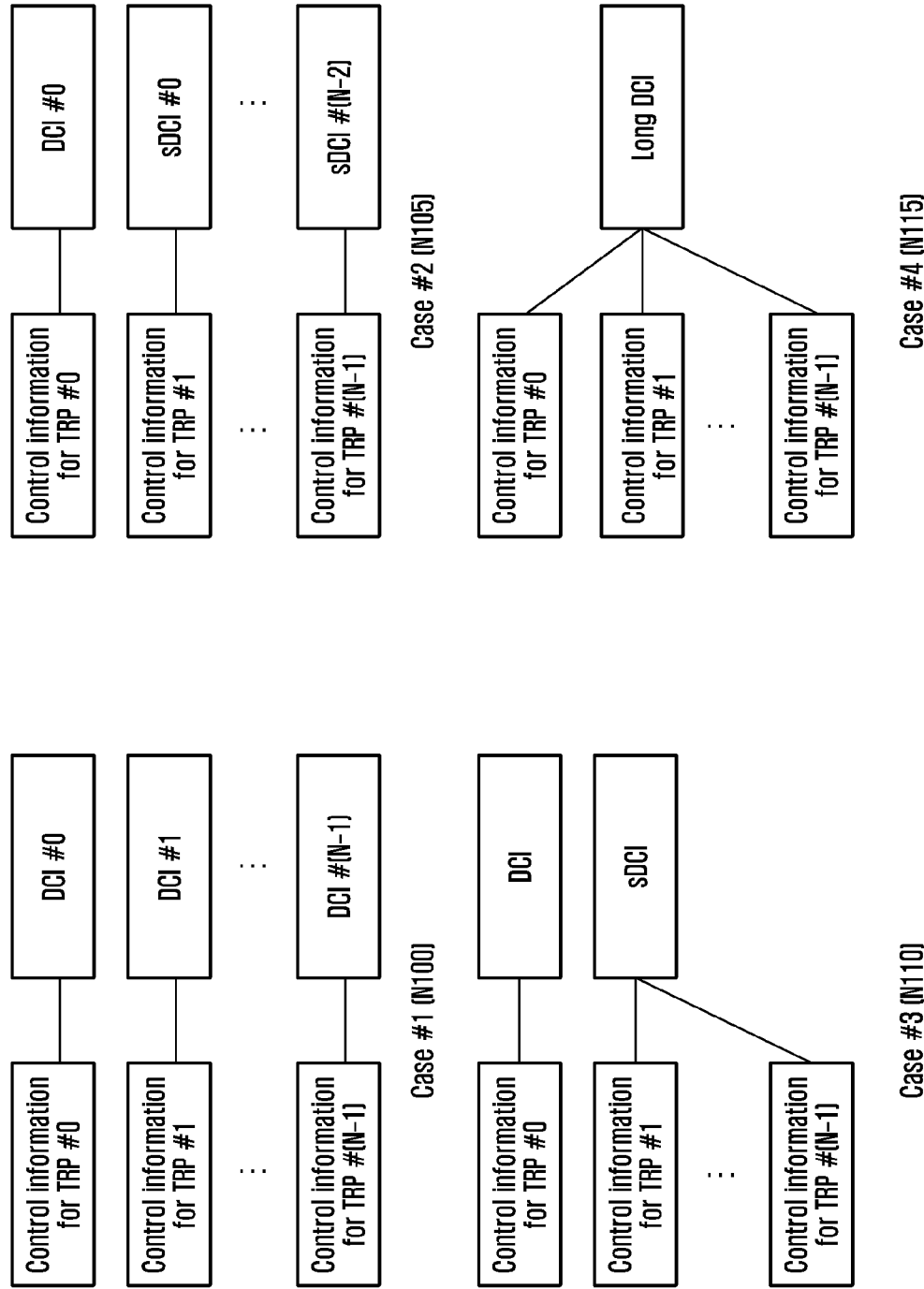
FIG. 16 illustrates an example of configuration of downlink control information (DCI) for cooperative communication in a wireless communication system according to an embodiment of the disclosure.

FIG. 16 illustrates an example configuration of downlink control information (DCI) for NC-JT for transmission of a different PDSCH or a different PDSCH layer to the UE by each TRP in a wireless communication system according to an embodiment of the disclosure.

Referring to FIG. 16, case #1 (N100) is an example in which control information for PDSCHs transmitted from (N-1) additional TRPs and control information for PDSCHs transmitted in serving TRP (same DCI format) are transmitted independently from each other, in a situation in which different (N-1) PDSCHs are transmitted from (N-1) additional TRPs (TRP #1 to TRP #(N-1)) in addition to serving TRP (TRP #0) used for single PDSCH transmission. That is, the UE may acquire control information for PDSCHs transmitted from different TRPs (TRP #0 to TRP #(N-1)) through pieces of independent DCI (DCI #0 to DCI #(N-1)). The format between pieces of independent DCI may be the same or different from each other, and the payload between DCIs may also be the same or different from each other. In the above-described case #1, the freedom degree for control or allocation of each PDSCH can be completely guaranteed, but when each piece of DCI is transmitted from a different TRP, a coverage difference for each DCI may occur, and reception performance may deteriorate.

Case #2 (N105) is an example in which each piece of control information (DCI) for PDSCH transmitted from (N-1) additional TRPs is transmitted and the each piece of DCI is dependent on control information for PDSCH transmitted from serving TRP, in a situation in which different (N-1) PDSCHs are transmitted from (N-1) additional TRPs (TRP #1 to TRP #(N-1)) in addition to serving TRP (TRP #0) used for single PDSCH transmission.

For example, in a case of DCI #0, which is control information for the PDSCH transmitted from the serving TRP (TRP #0), all information elements of DCI format 1_0, DCI format 1_1, and DCI format 1_2 are included, but shortened DCI (hereinafter, sDCI)) (sDCI #0 to sDCI #(N-2)), which is control information for PDSCHs transmitted from cooperative TRP (TRP #1 to TRP #(N-1)) may include only some of the information elements of DCI format 1_0, DCI format 1_1, DCI format 1_2. Therefore, in a case of sDCI for transmission of control information for PDSCHs transmitted from cooperative TRPs, the payload may be small compared to normal DCI (nDCI) for transmission of control information related to PDSCH transmitted from the serving TRP and thus may include reserved bits, based on comparison with nDCI.

In case #2 described above, the degree of freedom for control or allocation of each PDSCH may be limited according to the contents of the information element included in the sDCI, or since the reception performance of sDCI is superior to that of nDCI, the probability of occurrence of a coverage difference for each DCI may be lowered.

Case #3 (N110) is an example in which one piece of control information for PDSCHs transmitted in (N-1) additional TRPs is transmitted and this DCI is dependent on control information for PDSCHs transmitted from serving TRP, in a situation in which different (N-1) PDSCHs are transmitted from (N-1) additional TRPs (TRP #1 to TRP #(N-1)) other than serving TRP (TRP #0) used when transmitting a single PDSCH.

For example, in a case of DCI #0, which is control information for the PDSCH transmitted from the serving TRP (TRP #0), all information elements of DCI format 1_0, DCI format 1_1, and DCI format 1_2 are included, and in a case of control information for PDSCHs transmitted from cooperative TRP (TRP #1 to TRP #(N-1)), only some of the information elements of DCI format 1_0, DCI format 1_1, and DCI format 1_2 may be included in one "secondary" DCI (sDCI) and transmitted. For example, the sDCI may include at least one of HARQ-related information such as frequency domain resource assignment, time domain resource assignment, and MCS of cooperative TRPs. In addition, in a case of information not included in the sDCI, such as a bandwidth part (BWP) indicator or a carrier indicator, DCI (DCI #0, normal DCI, nDCI) of serving TRP may be followed.

In case #3 (N110), the freedom degree for control or allocation of each PDSCH may be limited according to the contents of the information element included in the sDCI. However, it is possible to adjust the reception performance of sDCI, and the complexity of DCI blind decoding of the UE may be reduced compared to case #1 (N100) or case #2 (N105).

Case #4 (N115) is an example in which control information for PDSCHs transmitted from (N-1) additional TRPs is transmitted through the same DCI (long DCI (LDCI)) as control information for PDSCHs transmitted from a serving TRP, in a situation in which different (N-1) PDSCHs are transmitted from (N-1) additional TRPs (TRP #1 to TRP #(N-1)) in addition to serving TRP (TRP #0) used for single PDSCH transmission. That is, the UE may obtain control information for PDSCHs transmitted from different TRPs (TRP #0 to TRP #(N-1)) through single DCI. In case #4 (N115), the complexity of DCI blind decoding of the UE may not increase, but the degree of freedom of PDSCH control or allocation may be low, such that the number of cooperative TRPs is limited according to the long DCI payload limitation.

In the following descriptions and embodiments, sDCI may refer to various pieces of supplementary DCI such as shortened DCI, secondary DCI, or normal DCI (DCI format 1_0 to 1_1 described above) including PDSCH control information transmitted in the cooperative TRP. If not specified, the description is similarly applicable to the various pieces of supplementary DCI.

In the following description and embodiments, case #1 (N100), case #2 (N105), and case #3 (N110) in which one or more DCI (PDCCH) is used for NC-JT support are classified into multiple PDCCH-based NC-JTs, and case #4 (N115) in which single DCI (PDCCH) is used for NC-JT support can be classified as a single PDCCH-based NC-JT. In multiple PDCCH-based PDSCH transmission, a CORESET in which DCI of a serving TRP (TRP #0) is scheduled and a CORESET in which DCI of a cooperative TRPs (TRP #1 to TRP #(N-1)) are scheduled can be distinguished. As a method for distinguishing CORESETs, there may be a method for distinguishing through a higher layer indicator for each CORESET, a method for distinguishing through a beam configuration for each CORESET, and the like. In addition, in a single PDCCH-based NC-JT, single DCI schedules a single PDSCH having a plurality of layers instead of scheduling a plurality of PDSCHs, and the above-mentioned plurality of layers may be transmitted from a plurality of TRPs. Here, a connection relationship (or, association) between a layer and a TRP for transmission of the layer may be indicated through a transmission configuration indicator (TCI) indication for the layer.

In the embodiments of the disclosure, "cooperative TRP" may be replaced by various terms including a "cooperative panel" or a "cooperative beam" when actually used.

In embodiments of the disclosure, the expression that "NC-JT is applied" is used herein for convenience of explanation, but it may be variously interpreted to fit the context, such as "the UE simultaneously receives one or more PDSCHs in one BWP," "the UE simultaneously receives PDSCHs based on two or more transmission configuration indicator (TCI) indications in one BWP," "a PDSCH received by the UE is associated with one or more DMRS port group," and the like.

In the disclosure, a radio protocol architecture for NC-JT may be variously used depending on TRP development scenarios. For example, when there is no or little backhaul delay between cooperative TRPs, it is possible to use a structure based on MAC layer multiplexing similar to S10 of FIG. 14 (CA-like method). On the other hand, when the backhaul delay between cooperative TRPs is so large that the backhaul delay cannot be ignored (e.g., when 2 ms or more is required for information exchange such as CSI, scheduling, HARQ-ACK, and the like between cooperative TRPs), similar to S20 of FIG. 14, it is possible to secure characteristics robust to delay by using an independent structure for each TRP from the RLC layer (DC-like method).

A UE supporting C-JT/NC-JT may receive a C-JT/NC-JT related parameter or setting value from a higher layer configuration, and may set an RRC parameter of the UE based on the received parameter or value. For higher layer configuration, the UE may utilize a UE capability parameter, for example, tci-StatePDSCH. Here, the UE capability parameter, for example, tci-StatePDSCH may define TCI states for the purpose of PDSCH transmission, and the number of TCI states may be configured to be 4, 8, 16, 32, 64, and 128 in FR1, may be configured to be 64 and 128 in FR2, and up to eight states, which can be indicated by 3 bits of the TCI field of DCI through a MAC CE message, among the configured number. The maximum value of 128 denotes a value indicated by maxNumberConfiguredTClstatesPerCC in the tci-StatePDSCH parameter included in capability signaling of the UE. As such, a series of configuration processes from higher layer configuration to MAC CE configuration may be applied to a beamforming indication or a beamforming change command for at least one PDSCH in one TRP.

For convenience of explanation in the following description of the disclosure, a cell, transmission point, panel, beam, and/or a transmission direction, which can be distinguished by higher layer/L1 parameters such as TCI state or spatial relation information, or indicators such as cell ID, TRP ID, and panel ID, are collectively referred to as a transmission reception point (TRP). Therefore, in actual application, it is possible to appropriately replace TRP by one of the above terms.

Referring to the above-described PUSCH-related descriptions, the current Rel-15/16 NR is focused on, with regard to PUSCH repetitive transmission, a single cell and/or a single TRP and/or a single panel and/or a single beam and/or a single transmission direction. Specifically, in a case of PUSCH repetitive transmission, transmission in a single TRP is considered regardless of codebook-based or non-codebook-based transmission. For example, with regard to the codebook-based PUSCH transmission, a transmission beam of the UE may be determined by the SRI and TPMI transmitted from the base station, that is, a single TRP to the UE. Similarly, with regard to non-codebook-based PUSCH transmission, an NZP CSI-RS that can be configured from a base station, that is, a single TRP may be configured for the UE, and the transmission beam of the UE may be determined by the SRI transfered from the single TRP. Therefore, if there is a degradation factor having a large temporal and spatial correlation, such as blockage, in a channel between the UE and a specific TRP, PUSCH repetitive transmission to a single TRP is likely to fail to meet expected performance.

Therefore, in order to overcome such degradation, PUSCH repetitive transmission considering multiple TRPs may be supported in Rel-17 or future releases. This may be a method of maximizing a diversity gain in consideration of a channel between a UE and multiple TRPs having different spatial characteristics. In order to support this, the UE needs to support configuration for PUSCH repetitive transmission to multiple TRPs. For example, configurations or indication schemes for power adjustment and multiple transmission beams to be used during PUSCH repetitive transmission considering multiple TRPs are required. In addition, higher layer signaling or dynamic indication is required for distinguishing between the repetitive transmission scheme considering a single TRP defined in Rel-15/16 and the PUSCH repetitive transmission considering the multiple TRPs to be newly defined in Rel-17. In addition, as a method for improving PUSCH transmission and reception performance, a method in which the transmission beam and frequency hopping are determined by being associated with each other so that the spatial diversity gain through repetitive transmission to multiple TRPs and frequency diversity through frequency hopping can be simultaneously obtained in order to maximize the diversity gain is required.

The disclosure can minimize the loss of uplink data and the transmission delay time during PUSCH repetitive transmission considering multiple TRPs by providing a processing method for the above-described requirements. With respect to various cases, a method for configuring or indicating PUSCH repetitive transmission to multiple TRPs by the UE will be described in detail in the following embodiments.

Hereinafter, embodiments of the disclosure will be described in detail with reference to the accompanying drawings. Hereinafter, a base station is a subject that performs resource allocation of a terminal, and may be at least one of gNode B, gNB, eNode B, Node B, base station (BS), a radio access unit, a base station controller, or a node on a network. The terminal may include a user equipment (UE), a mobile station (MS), a cellular phone, a smart phone, a computer, or a multimedia system capable of performing a communication function. Hereinafter, an embodiment of the disclosure will be described using a 5G system as an example, but the embodiment of the disclosure may be applied to other communication systems having a similar technical background or channel type. For example, LTE or LTE-A mobile communication and mobile communication technologies developed after 5G may be included therein. Accordingly, the embodiments of the disclosure may be applied to other communication systems through some modifications within a range not significantly departing from the scope of the disclosure as determination made by those of skilled in the art. The contents of the disclosure are applicable to FDD and TDD systems.

In addition, in the description of the disclosure, if it is determined that a detailed description of a related function or configuration may unnecessarily obscure the subject matter of the disclosure, the detailed description thereof will be omitted. In addition, the terms described below are terms defined in consideration of functions in the disclosure, which may vary according to intentions or customs of users and operators. Therefore, the definition may be made based on the content throughout this specification.

Hereinafter, in describing the disclosure, higher layer signaling may be signaling corresponding to at least one or a combination of one or more of the following signaling:
  Master information block (MIB);
  System information block (SIB) or SIB X (X=1, 2, . . . );
  Radio resource control (RRC); and/or
  Medium access control (MAC) control element (CE).

In addition, L1 signaling may be signaling corresponding to at least one or a combination of one or more of signaling methods using the following physical layer channels or signaling:
  Physical downlink control channel (PDCCH);
  Downlink control information (DCI);
  UE-specific DCI;
  Group common DCI;
  Common DCI;
  Scheduling DCI (for example, DCI used for scheduling downlink or uplink data);

Non-scheduling DCI (for example, DCI not for the purpose of scheduling downlink or uplink data);
Physical uplink control channel (PUCCH); and/or
Uplink control information (UCI).

Hereinafter, in the disclosure, determinination of the priority between A and B may be mentioned in various ways, such as selecting one having a higher priority according to a predetermined priority rule and performing an operation corresponding thereto, or omitting or droppiong an operation having a lower priority.

Hereinafter, in the disclosure, transmitting (or receiving) a physical channel such as PDCCH, PDSCH, PUCCH, or PUSCH may mean transmitting (or receiving) a signal through the corresponding physical channel. For example, in the disclosure, transmitting (or receiving) a PDCCH may mean transmitting (or receiving) a signal (e.g, DCI) thorugh the PDCCH. For example, in the disclosure, transmitting (or receiving) a PDSCH may mean transmitting (or receiving) a signal (e.g, downlink data) through the PDSCH. For example, in the disclosure, transmitting (or receiving) a PUCCH may mean transmitting (or receiving) a signal (e.g, UCI) through the PUCCH. For example, in the disclosure, transmitting (or receiving) a PUSCH may mean transmitting (or receiving) a signal (e.g, uplink data) through the PUSCH.

Hereinafter, in the disclosure, the above examples will be described through multiple embodiments, but these are not independent and one or more embodiments may be applied simultaneously or in combination.

In a first embodiment, PUSCH repetitive transmission method considering multiple TRPs is provided.

The first embodiment of the disclosure describes a method for L1 signaling indication and higher layer signaling configuration for PUSCH repetitive transmission considering multiple TRPs. PUSCH repetitive transmission considering multiple TRPs may be operated through single or multiple DCI-based indications, which will be described in (1-1) embodiment and (1-2) embodiment, respectively.

In addition, a UE may support PUSCH repetitive transmission through either single or multiple DCI-based indications based on configuration of a base station, or may support both methods by distinguishing between the two methods through L1 signaling and use the method indicated by L1 signaling. The corresponding details will be described in the (1-3) embodiment.

In addition, in the (1-4) embodiment of the disclosure, a method of configuring an SRS resource set for PUSCH repetitive transmission considering single or multiple DCI-based multiple TRPs will be described.

In one embodiment of (1-1), a PUSCH repetitive transmission method considering multiple TRPs based on single DCI is provided.

As an embodiment of the disclosure, in the (1-1) embodiment, a PUSCH repetitive transmission method considering multiple TRPs based on single DCI will be described. The UE may report, through UE capability reporting, that a PUSCH repetitive transmission method considering multiple TRPs based on single DCI is possible. The base station may configure a PUSCH repetitive transmission scheme to be used, for the UE having reported the corresponding UE capability (e.g., the UE capability to support PUSCH repetitive transmission considering single DCI-based multiple TRPs), via higher layer signaling. In this case, the higher layer signaling may be configured by selecting one of PUSCH repetitive transmission type A and PUSCH repetitive transmission type B.

In Rel-15/16, in a case of the PUSCH repetitive transmission method considering a single TRP, both the codebook and non-codebook-based transmission methods have been performed based on single DCI. When transmitting a codebook-based PUSCH, the UE may use the SRI or TPMI indicated by one DCI to apply the same value to each PUSCH repetitive transmission. In addition, the UE may use the SRI indicated by one DCI when transmitting the non-codebook-based PUSCH to apply the same value to each PUSCH repetitive transmission. For example, if codebook-based PUSCH transmission and PUSCH repetitive transmission scheme A are configured by higher layer signaling, and SRI index 0, TPMI index 0, and a time resource allocation index in which the number of PUSCH repetitive transmissions are configured to be 4 are indicated through DCI, the UE applies both SRI index 0 and TPMI index 0 to each of the 4 PUSCH repetitive transmissions. Here, SRI may be associated with a transmission beam, and TPMI may be associated with a transmission precoder. Unlike the PUSCH repetitive transmission method considering a single TRP, the PUSCH repetitive transmission method considering multiple TRPs may need to apply a transmission beam and a transmission precoder differently with regard to transmission to each TRP. Therefore, the UE may receive multiple SRIs or TPMIs through DCI and apply the received SRIs or TPMIs to each PUSCH repetitive transmission to perform PUSCH repetitive transmission considering multiple TRPs.

In a case of indicating a PUSCH repetitive transmission method considering multiple TRPs based on single DCI to the UE, methods for indicating multiple SRIs or TPMIs when the PUSCH transmission method is based on a codebook or a non-codebook may be considered as follows.

In one embodiment, transmission of single DCI having multiple SRI or TPMI fields is provided.

In order to support the PUSCH repetitive transmission method considering multiple TRPs based on single DCI, the base station may transmit DCI having multiple SRI or TPMI fields to the UE. The DCI may be a new format (e.g., DCI format 0_3) or an existing format (e.g., DCI format 0_1 and 0_2), but may correspond to a case in which additional higher layer signaling (e.g., signaling via which whether multiple SRI or TPMI fields are supportable can be determined) is configured. For example, when codebook-based PUSCH transmission is configured by higher layer signaling, the UE may receive new format DCI (e.g., DCI format 0_3) having two SRI fields and two TPMI fields to perform PUSCH repetitive transmission considering multiple TRPs. For another example, in a case of non-codebook-based PUSCH transmission, the UE is configured to be able to support multiple SRI fields via higher layer signaling, and may receive DCI of an existing format having two SRI fields (e.g., DCI format 0_1 and 0_2). In a case of indicating multiple SRS resources using multiple SRI fields, since transmission power adjustment parameters of the SRS resource are configured for each SRS resource set, each SRS resource may exist in a different SRS resource set in order to configure different transmission power adjustment parameters according to each TRP. Therefore, there may be two or more SRS resource sets in which usage, which is higher layer signaling, is configured based on codebook or non-codebook.

Figure 17:
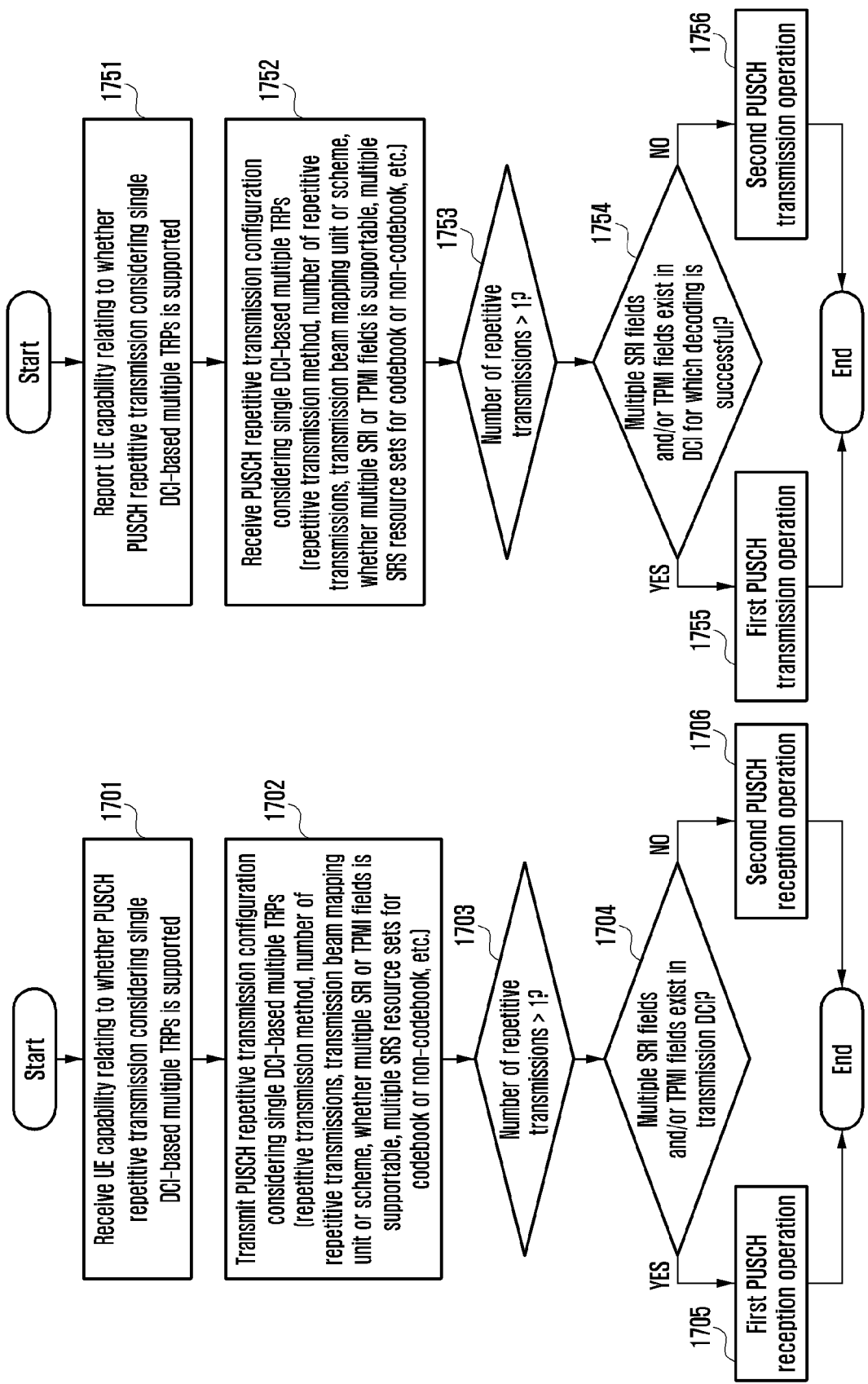
FIG. 17 illustrates operations of a base station and a UE for PUSCH repetitive transmission in consideration of single DCI transmission-based multiple TRPs in which multiple SRI or TPMI fields exist according to an embodiment of the disclosure.

FIG. 17 illustrates operations of a base station and a UE for PUSCH repetitive transmission considering single DCI transmission-based multiple TRPs in which multiple SRI or TPMI fields exist according to an embodiment of the disclosure.

The UE performs a UE capability report relating to whether PUSCH repetitive transmission considering single DCI-based multiple TRPs is supported (operation 1751), and the base station that has received the corresponding UE capability report (operation 1701) transmits configuration information of the PUSCH repetitive transmission considering single DCI-based multiple TRPs to the UE (operation 1702). In this case, the transmitted configuration information may include a repetitive transmission method, the number of repetitive transmissions, a transmission beam mapping unit or method, whether multiple SRI or TPMI fields can be supported, multiple SRS resource sets for codebook or non-codebook, and the like. Upon receiving the configuration information (operation 1752), if 2 repetitive transmissions or more occur, if in a case of codebook-based PUSCH transmission, multiple SRI fields and TPMI fields exist in DCI through which reception is successful, or if in a case of non-codebook-based PUSCH transmission, multiple SRI fields exist in DCI through which reception is successful (operation 1754), the UE performs a first PUSCH transmission operation (operation 1755). Otherwise, the UE performs a second PUSCH transmission operation (operation 1756). The first PUSCH transmission operation is an operation of repeatedly transmitting the PUSCH using a single SRI and TPMI field in a case of codebook-based PUSCH transmission and repeatedly transmitting the PUSCH using a single SRI field in a case of non-codebook-based PUSCH transmission. The PUSCH is repeatedly transmitted by applying one transmission beam and/or one transmission precoder. The second PUSCH transmission operation is an operation of repeatedly transmitting a PUSCH using multiple SRI and TPMI fields in a case of codebook-based PUSCH transmission and repeatedly transmitting a PUSCH using multiple SRI fields in a case of non-codebook-based PUSCH transmission. The PUSCH is repeatedly transmitted by applying multiple transmission beams and/or multiple transmission precoders. A method of mapping multiple transmission beams will be described in detail in the second embodiment.

In one embodiment, a DCI transmission to which enhanced SRI and TPMI fields are applied is provided.

A UE may receive a MAC-CE for supporting enhanced SRI or TPMI fields from a base station in order to support a PUSCH repetitive transmission method considering multiple TRPs based on single DCI. The corresponding MAC-CE may include information for changing the interpretation of a codepoint of a DCI field so as to indicate multiple transmission beams with regard to a specific codepoint of the SRI field in the DCI or to indicate multiple transmission precoders with regard to a specific codepoint of the TPMI field. The following two methods may be considered to indicate multiple transmission beams:

MAC-CE reception that activates a specific codepoint of the SRI field to indicate one SRS resource to which multiple pieces of SRS spatial relation info are connected (or, associated); and/or MAC-CE reception that activates a specific codepoint of the SRI field to indicate multiple SRS resources to which one pieces of SRS spatial relation info is connected (or, associated).

In a case of indicating multiple SRS resources using enhanced SRI fields, since transmission power adjustment parameters of the SRS resource are configured according to each SRS resource set, each SRS resource may exist in a different SRS resource set in order to configure different transmission power adjustment parameters according to each TRP. Therefore, there may be two or more SRS resource sets in which usage, which is higher layer signaling, is configured based on codebook or non-codebook.

Figure 18:
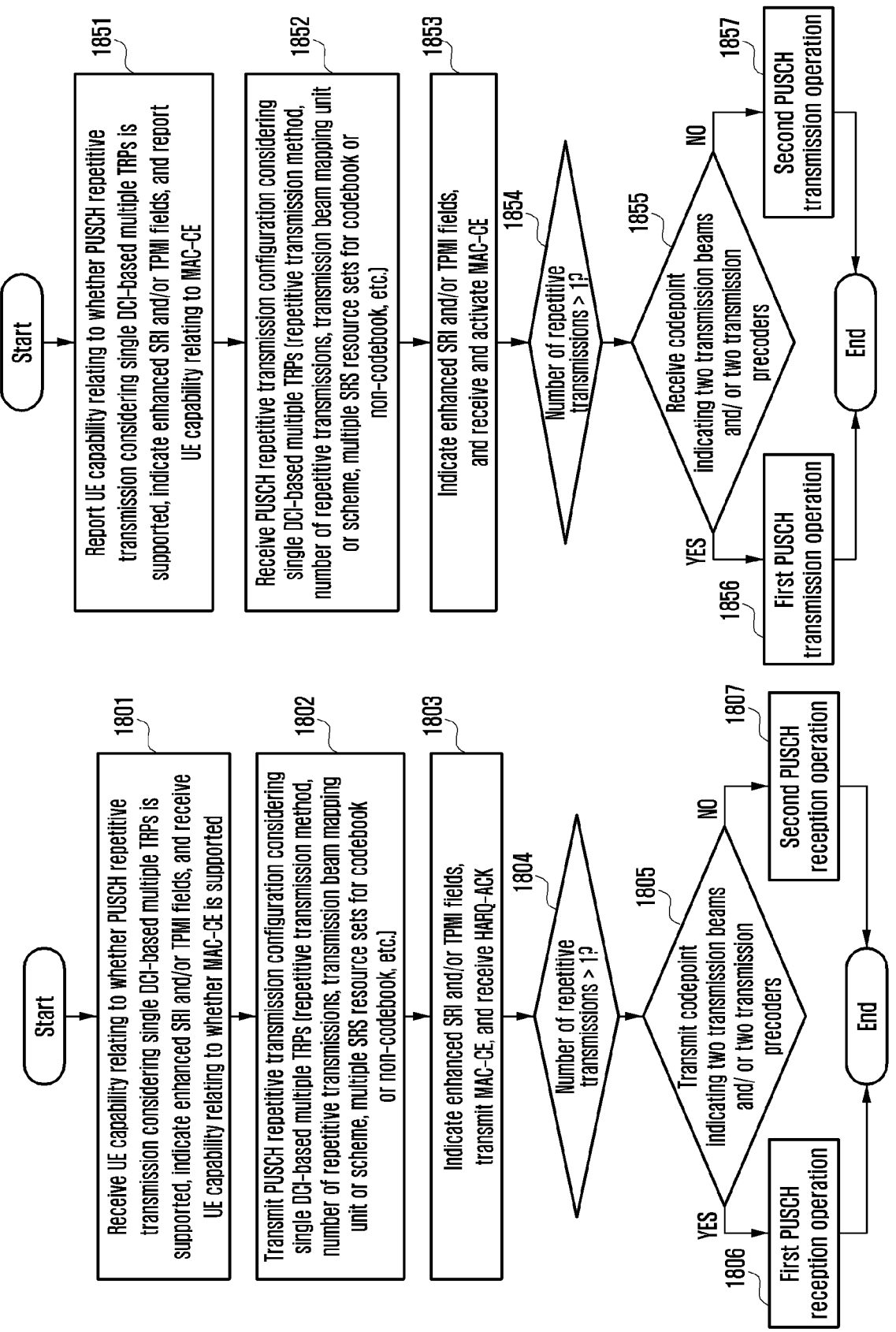
FIG. 18 illustrates operations of a base station and a UE for PUSCH repetitive transmission in consideration of single DCI transmission-based multiple TRPs using enhanced SRI and TPMI fields according to an embodiment of the disclosure.

FIG. 18 illustrates operations of a base station and a UE for PUSCH repetitive transmission considering single DCI transmission-based multiple TRPs using enhanced SRI or TPMI fields according to an embodiment of the disclosure.

The UE performs a UE capability report relating to whether PUSCH repetitive transmission considering single DCI-based multiple TRPs is supported and a UE capability report as to whether MAC-CE activation for enhanced SRI field or TPMI field indication is possible (operation 1851), and the base station that has received the corresponding UE capability report (operation 1801) transmits configuration information of the PUSCH repetitive transmission considering single DCI-based multiple TRPs to the UE (operation 1802).

In this case, the transmitted configuration information may include a repetitive transmission method, the number of repetitive transmissions, a transmission beam mapping unit or method, multiple SRS resource sets for codebook or non-codebook, and the like. Upon receiving the configuration (operation 1852), the UE receives an MAC-CE for activating the enhanced SRI field or the enhanced TPMI field indication (operation 1853), and transmits HARQ-ACK to the base station after 3 ms following reception (operation 1803). If 2 repetitive transmissions or more occur (operation 1854), if in a case of codebook-based PUSCH transmission, enhanced SRI field and TPMI field exist in DCI through which reception is successful, or if in a case of non-codebook-based PUSCH transmission, enhanced SRI fields exist in DCI through which reception is successful (operation 1855), the UE performs a first PUSCH transmission operation (operation 1856).

Otherwise, the UE performs a second PUSCH transmission operation (operation 1857). The first PUSCH transmission operation is an operation in which all codepoints of the SRI field and the TPMI field receive DCI indicating a single SRI and a single TPMI indication and perform repetitive transmission of the PUSCH. The PUSCH is repeatedly transmitted by applying one transmission beam and/or one transmission precoder. The second PUSCH transmission operation is an operation of repeatedly transmitting a PUSCH by using codepoints of SRI and TPMI fields indicating multiple SRI and TPMIs in a case of codebook-based PUSCH transmission and using codepoints of SRI fields indicating multiple SRIs in a case of non-codebook-based PUSCH transmission. The PUSCH is repeatedly transmitted by applying multiple transmission beams and/or multiple transmission precoders. A method of mapping multiple transmission beams will be described in detail in the second embodiment.

In one embodiment of (1-2), a PUSCH repetitive transmission method considering multiple TRPs based on multiple DCI is provided.

According to an embodiment of the disclosure, in the (1-2) embodiment, a PUSCH repetitive transmission method considering multiple TRPs based on multiple DCI will be described. As described above, since all PUSCH repetitive transmission methods in Rel-15/16 consider a single TRP, it is possible that the transmission beam, transmission precoder, resource allocation, and power adjustment parameters use the same value for each repetitive transmission. However, in a case of PUSCH repetitive transmission considering multiple TRPs, PUSCH transmission-related parameters, which are configured by higher layer signaling or indicated by DCI in connection with each PUSCH repetitive transmission to multiple TRPs, may be applied with different parameters for each TRP.

For example, when multiple TRPs exist in different directions from the UE, since the transmission beam or the transmission precoder may be different, transmission beams or transmission precoders for TRPs need to be configured or indicated, respectively. As another example, when multiple TRPs exist at different distances from the UE, independent power adjustment schemes between the multiple TRPs and the UE may be required, and accordingly different time/frequency resource allocation may occur. For example, a relatively small number of RBs and a large number of symbols may be allocated to a TRP that exists at a relatively long distance compared to a specific TRP in order to increase power per RE. Therefore, in order to transmit different pieces of information to the UE through single DCI, the bit length of the corresponding DCI may be very large, and thus it may be more efficient to indicate the UE to perform PUSCH repetitive transmission through multiple pieces of DCI.

The UE may report, through UE capability reporting, that a PUSCH repetitive transmission method considering multiple TRPs based on multiple DCI is possible. The base station may provide notification that the UE performs PUSCH repetitive transmission considering multiple TRPs through multiple DCI to the UE, which has reported the corresponding UE capability (e.g., the UE capability to support PUSCH repetitive transmission considering multiple DCI-based multiple TRPs), by using configuration via higher layer signaling, indication through L1 signaling, or configuration and indication through a combination of higher layer signaling and L1 signaling. The base station may use a method of configuring or indicating PUSCH repetitive transmission considering multiple TRPs based on multiple DCI as follows.

During PUSCH repetitive transmission considering multiple TRPs based on multiple pieces of DCI, the UE may expect that time/frequency resource allocation information, indicated through each DCI by considering TRPs located at different distances from the UE, are different from each other. The UE may report whether different time/frequency resource allocation is possible to the base station, using the UE capability. The base station may configure, for the UE, as to whether different time/frequency resource allocation occurs using higher layer signaling, and the UE having received the configuration may expect different time/frequency resource allocation information to be indicated through each DCI.

In this case, the UE may be configured or indicated with PUSCH repetitive transmission considering multiple DCI-based multiple TRPs from the base station by considering higher layer signaling configuration and conditions between the plurality of DCI fields. When the transmission beam and transmission precoder information are indicated through multiple DCI, the SRI and TPMI in the first received DCI can be applied first when the transmission beam mapping method of the second embodiment below is applied, and the SRI and TPMI in the secondly received DCI can be applied secondly when the transmission beam mapping method of the second embodiment below is applied.

The base station may configure, for the UE, CORESET-PoolIndex, which is higher layer signaling, according to each CORESET, and when receiving a CORESET, the UE may know a TRP from which the corresponding CORESET is transmitted. For example, if CORESETPoolIndex is configured to be 0 in CORESET #1 and CORESETPoolIndex is configured to be 1 in CORESET #2, the UE may know that CORESET #1 is transmitted from TRP #0 and CORESET #2 is transmitted from TRP #1. In addition, DCI, which is transmitted in each CORESET for which the CORESETPoolIndex value is configured to be 0 and 1, indicating a repeated PUSCH may be implicitly indicated by a condition between specific fields in multiple pieces of transmitted DCI. For example, when the HARQ process number field values in multiple pieces of DCI transmitted by the base station to the UE are the same and the NDI field values are also the same, the UE may implicitly regard each of the multiple pieces of DCI as scheduling repeated PUSCH considering multiple TRPs. On the other hand, when the HARQ process number field values are the same and the NDI field values are also the same, there may be restrictions on multiple DCI receptions. For example, the maximum interval between the multiple DCI receptions may be defined within the number of one or more specific slots or within the number of one or more specific symbols. In this case, the UE may perform PUSCH transmission based on the calculated (or identified) minimum transport block size based on time/frequency resource allocation information indicated differently in multiple pieces of DCI.

In one embodiment of (1-3), a configured grant PUSCH repetitive transmission method considering multiple TRPs is provide.

As an embodiment of the disclosure, the (1-3) embodiment describes a configured grant PUSCH repetitive transmission method considering multiple TRPs. The UE may report whether or not to perform configured grant PUSCH repetitive transmission considering multiple TRPs to the base station with UE capability. The base station may configure, for the UE, configured grant PUSCH repetitive transmission considering multiple TRPs by higher layer signaling, may indicate the same by L1 signaling, or may configure and indicate the same by a combination of higher layer signaling or L1 signaling.

In one embodiment (Method 1), an activation of single DCI-based single configured grant configuration is provided.

Method 1 is a method of providing, to a UE, an indication of multiple SRIs or TPMIs based on the single DCI, and activating a single configured grant configuration together with the indication. A method of indicating multiple SRIs or TPMIs using single DCI may follow the method of the (1-1) embodiment, and if there is only one configured grant configuration for the UE, all bits of the HARQ process number field and the redundancy version field in the DCI may be indicated as 0. If there are multiple configured grant configurations in the UE and one of configurations is activated using the corresponding DCI, the HARQ process number field in the corresponding DCI may indicate the index of the configured grant configuration, and all bits of the redundancy version field are indicated by 0. The UE may map a transmission beam and a transmission precoder to each of the activated configured grant PUSCH repetitive transmissions by using multiple SRIs or TPMIs indicated by single DCI and according to a transmission beam mapping method in the second embodiment below.

In one embodiment (Method 2), an Activation of multiple DCI-based single configured grant configuration is provided.

Method 2 is a method of of providing, to the UE, an indication of each SRI or TPMI using each DCI based on the multiple DCI, and activating a single configured grant configuration together with the indication. A method of indicating each SRI or TPMI using each DCI based on the multiple DCI may follow the method of the (1-2) embodiment, and if there is only one configured grant configuration for the UE, all bits of the HARQ process number fields and the redundancy version field in the DCI may be indicated as 0. If there are multiple configured grant configurations in the UE and one of the configurations is activated using the corresponding multiple DCI, all the HARQ process number fields in the corresponding DCI may indicate the index of the same configured grant configuration, and all the bits of the redundancy version field in the corresponding multiple DCI may be indicated by 0.

According to conditions of the DCI field during PUSCH repetitive transmission based on multiple DCI, the NDI field in addition to the HARQ process number field may also have the same value. The UE may map a transmission beam and a transmission precoder to each of the activated configured grant PUSCH repetitive transmissions by using multiple SRIs or TPMIs indicated by multiple DCI and according to a transmission beam mapping method below. For example, if information related to the transmission beam and the transmission precoder, indicated by the first received DCI, are SRI #1 and TPMI #1, information related to the transmission beam and the transmission precoder, indicated by the secondly received DCI, is SRI #2 and TPMI #2, and a transmission beam mapping scheme configured by higher layer signaling is cyclical, the UE may perform PUSCH transmission by applying SRI #1 and TPMI #1 to odd-numbered transmissions (1, 3, 5, . . . ) of the activated configured grant PUSCH repetitive transmission, and may perform PUSCH transmission by applying SRI #2 and TPMI #2 to even-numbered transmissions (2, 4, 6, . . . ) of the activated configured grant PUSCH repetitive transmission.

In one embodiment (Method 3), an activation of multiple DCI-based multiple configured grant configurations is provided.

Method 3 is a method of of providing, to the UE, an indication of each SRI or TPMI using each DCI based on the multiple DCI, and activating multiple configured grant configurations together with the indication. A method of indicating each SRI or TPMI using each DCI based on the multiple DCI may follow the method of the (1-2) embodiment, and according to the method, there is multiple configured grant configurations for the UE, and the index of each configured grant configuration may be indicated through the HARQ process number field in each DCI. In addition, all the bits of all redundancy version fields in the corresponding multiple DCI may be indicated as 0.

According to conditions of the DCI field during multiple DCI-based PUSCH repetitive transmission, the NDI field in addition to the HARQ process number field may also have the same value. The UE may receive MAC-CE signaling indicating (command) a connection between multiple configured grant configurations activated by multiple DCI. The UE may receive multiple DCI from the base station after 3 ms following performance of HARQ-ACK transmission for MAC-CE signaling, and if the configured grant configuration index indicated by each DCI matches the index of each of the configured grant configurations, connection of which is indicated (commanded) through the MAC-CE signaling, the UE may perform PUSCH repetitive transmission considering multiple TRPs based on the indicated configured grant configurations.

Here, some configurations having the same value may be shared among multiple connected grant configurations. For example, repK, which is higher layer signaling denoting the number of repetitive transmissions, repK-RV, which is higher layer signaling denoting the order of redundancy version during repetitive transmission, and periodicity, which is higher layer signaling denoting the period of repetitive transmission, may be configured to have the same value within the connected configured grant configuration.

In one embodiment of (1-4), an SRS resource set configuration method for PUSCH repetitive transmission considering multiple TRPs is provided.

As an embodiment of the disclosure, in the (1-4) embodiment, a method of configuring an SRS resource set for PUSCH repetitive transmission considering multiple TRPs will be described. Since the power adjustment parameters of the SRS (e.g., alpha, p0, pathlossReferenceRS, srs-PowerControlAjdustmentStates, etc., which can be configured by higher layer signaling) may differ for each SRS resource set, the number of SRS resource sets is increased to two or more for the purpose of different power adjustment of the SRS resource set for each TRP during PUSCH repetitive transmission considering multiple TRPs, and different SRS resource sets can be used for the purpose of supporting different TRPs. The SRS resource set configuration method considered in this embodiment can be applied to the (1-1) to (1-3) embodiments.

During PUSCH repetitive transmission considering single DCI-based multiple TRPs, multiple SRIs indicated by single DCI may be selected from among SRS resources existing in different SRS resource sets. For example, if two SRIs are indicated by single DCI, the first SRI may be selected from SRS resource set #1, and the second SRI may be selected from SRS resource set #2.

During PUSCH repetitive transmission considering multiple DCI-based multiple TRPs, SRIs indicated by two DCI, respectively, may be selected from among SRS resources existing in different SRS resource sets, and each SRS resource set may be explicitly or implicitly connected (or, corresponded) to higher layer signaling (e.g., CORESET-PoolIndex) denoting each TRP. As an explicit connection method, the CORESETPoolIndex value may be configured in the configuration of the SRS resource set configured for higher layer to notify the UE of the semi-static connection state between the CORESET and the SRS resource set.

As another example, as a more dynamic explicit connection method, MAC-CE that activates the connection between a specific CORESET (including all cases where the value of CORESETPoolIndex is configured to be 0 or 1 or not) and the SRS resource set can be used. After receiving the MAC-CE that activates the connection between the specific CORESET (including all cases where the value of CORESETPoolIndex is configured to be 0 or 1 or not) and the SRS resource set, and after 3 ms following transmission of the HARQ-ACK, the UE may regard that the connection between the CORESET and the SRS resource set is activated. The implicit method is to assume an implicit connection state using a specific criterion between the CORESETPoolIndex and the index of the SRS resource set. For example, if it is assumed that the UE has received two sets of SRS resource set #0 and #1, the UE assumes that CORESETs for which CORESETPoolIndex is not configured or configured to be 0 are connected to SRS resource set #0, and CORESETs for which CORESETPoolIndex is configured to be 1 are connected to SRS resource set #1.

With regard to the above single or multiple DCI-based methods, the UE, which has been explicitly or implicitly configured or indicated to perform connection between different SRS resource sets and each TRP, may expect that the value of srs-PowerControlAdjustmentStates configured by higher layer signaling in each SRS resource set is configured to be sameAsFci2, and may not expect to be configured to be separateClosedLoop. In addition, the UE may expect that the usage configured in each SRS resource set via higher layer signaling is configured equally for codebook or noncodebook.

In one embodiment of (1-5), a dynamic switching method for determining codebook-based PUSCH transmission considering single TRP or codebook-based PUSCH transmission considering multiple TRPs is provided.

As an embodiment of the disclosure, (1-5) embodiment describes a dynamic switching method for determining codebook-based PUSCH transmission considering single TRP or codebook-based PUSCH transmission considering multiple TRPs.

According to the (1-1) and (1-4) embodiments, a base station may receive a UE capability report from a UE capable of performing codebook-based PUSCH repetitive transmission in consideration of single DCI-based multiple TRPs, and may confiugure, for the UE, higher layer signaling for performing PUSCH repetitive transmission through multiple TRPs. Here, during PUSCH repetitive transmission considering single DCI-based multiple TRPs, as in the (1-4) embodiment, the base station may transmit, to the UE, single DCI including multiple SRI fields to indicate SRS resources existing in different SRS resource sets. In this case, each of the plurality of SRI fields may be interpreted in the same method as in NR Release 15/16. More specifically, the first SRI field may select an SRS resource from the first SRS resource set, and the second SRI field may select an SRS resource from the second SRS resource set. Similarly to the plurality of SRI fields, in order to perform repetitive transmission of the PUSCH by considering multiple TRPs, the base station may transmit single DCI including multiple TPMI fields to the UE so as to select a TPMI corresponding to the SRS resource indicated by each SRI field. Here, the plurality of TPMI fields may be indicated through the same DCI as the DCI including the plurality of SRI fields described above.

On the other hand, multiple TPMIs to be used when transmitting a PUSCH to each TRP may be selected through the following methods using multiple TPMI fields:

[Method 1] Each TPMI field may be interpreted in the same method as in NR Release 15/16. For example, a first TPMI field may indicate the TPMI index and layer information for an SRS resource indicated by the first SRI field, and a second TPMI field may indicate the TPMI index and layer information for an SRS resource indicated by the second SRI field; and/or

[Method 2] The first TPMI field may indicate the TPMI index and layer information for the SRS resource indicated by the first SRI field in the same method as in NR Release 15/16. In contrast, since the second TPMI field selects the TPMI index for the same layer as the layer indicated by the first TPMI field, layer information may not be indicated, and TPMI index information for the SRS resource indicated by the second SRI field may be indicated.

With regard to both method 1 and method 2, in a case of codebook-based PUSCH repetitive transmissiont, the number of layers indicated by the two TPMI fields (the first TPMI field and the second TPMI field) may be the same, and in a case of non-codebook-based PUSCH repetitive transmission, the number of layers indicated by the two SRI fields (the first SRI field and the second SRI field) may be the same.

Meanwhile, when multiple TPMIs are selected through method 2, the bit length of the second TPMI field may be smaller than that of the first TPMI field. This is because the second TPMI field indicates a value (index) of one of the TPMI index candidates identical to the layer indicated by the first TPMI field, and may not indicate layer information accoridng thereto.

The UE may support a dynamic switching method of receiving single DCI including multiple SRI fields and multiple TPMI fields and determining PUSCH repetitive transmission considering multiple TRPs or PUSCH repetitive transmission considering a single TRP based on the received single DCI. The UE may support dynamic switching by using a reserved value that does not have any meaning among values that multiple TPMI fields or SRI fields included in the received DCI may have. For example, if the bit length of the SRI field is 2 bits, a total of 4 cases may be expressed, and each expressible case may be defined as a codepoint. In addition, if 3 codepoints among 4 codepoints have a meaning to indicate an SRI and the remaining 1 codepoint has no meaning, this codepoint is referred to as a codepoint which indicates a reserved value (in the following description, a codepoint which indicates a reserved value can be expressed as being configured as reserved). It will be described in more detail through the details to be described later.

In order to describe a dynamic switching method that can be supported by multiple TPMI fields through a reserved value as a specific example, a case in which the number of PUSCH antenna ports is 4 is assumed. In addition, it is assumed that the first TPMI field is configured by 6 bits, and the higher layer parameter codebookSubset is configured as fullyAndPartialAndNonCoherent and is indicated in the same method as in NR Release 15/16. In this case, in the first TPMI field, indices 0 to 61 may be configured to indicate valid TPMI index and layer information, and indices 62 to 63 may be configured as being reserved. If the second TPMI field includes only TPMI index information excluding layer information as in method 2, the second TPMI field may indicate only the TPMI index of a case in which the layer for PUSCH transmission has one value (e.g., one value among 1 to 4) according to the first TPMI field. In this case, the number of bits of the second TPMI field may be configured based on the number of bits capable of expressing the layer having the largest number of candidates among TPMI index candidates that can be configured for each layer. For example, according to an example in which candidates 0 to 27 in layer 1, candidates 0 to 21 in layer 2, candidates 0 to 6 in layer 3, and candidates 0 to 4 in layer 4, layer 1 has the largest number of candidates. Therefore, the number of bits of the second TPMI field may be configured to be 5 according to the number of TPMI index candidates of layer 1. When describing the second TPMI field configuration in detail, if the first TPMI field indicates layer 1 and a corresponding TPMI index, the UE may interpret the second TPMI field as a codepoint which indicates one value among the TPMI indices 0 to 27 for the layer 1 and a codepoint which indicates a reserved value.

For example, if the first TPMI field indicates layer 2 and a corresponding TPMI index, the UE may interpret the second TPMI field as a codepoint which indicates one value among the TPMI indices 0 to 21 for the layer 2 and a codepoint which indicates a reserved value. In addition, for example, when the first TPMI field indicates layer 3 or layer 4 and a corresponding TPMI index, the UE may interpret the second TPMI field in a similar method described above. In this case, when two or more codepoints indicating a reserved value, in addition to a codepoint which indicates a TPMI index, exist in the second TPMI field, codepoints indicating the two reserved values may be used to indicate dynamic switching. That is, among the codepoints of the second TPMI field configured by 5 bits, the second to last codepoint corresponding to the codepoint which indicates the reserved value (i.e., the 31st codepoint in the example) is used to indicate PUSCH repetitive transmission considering a single TRP using the first TRP. In addition, the last codepoint (i.e., the 32nd codepoint in the example) may be used to indicate PUSCH repetitive transmission considering a single TRP using the second TRP. Here, the UE may receive layer information and TPMI index information for PUSCH repetitive transmission considering a single TRP using the first TPMI field. On the other hand, the above-described assumptions are for convenience of explanation, and the disclosure is not limited thereto.

For convenience of explanation, if the above specific example for two TRPs is generalized and described, the UE may receive single DCI including two SRI fields and two TPMI fields, and may perform dynamic switching according to the codepoint indicated by the second TPMI field. If the codepoint of the second TPMI field indicates a TPMI index for a layer indicated by the first TPMI field, the UE may perform PUSCH repetitive transmission considering multiple TRPs. If the second TPMI field indicates the second to last codepoint corresponding to the codepoint which indicates the reserved value, the UE may perform PUSCH repetitive transmission considering a single TRP with respect to TRP 1, and may identify layer information and TPMI index information for codebook-based PUSCH transmission from the first TPMI field. If the second TPMI field indicates the last codepoint corresponding to the codepoint which indicates the reserved value, the UE may perform PUSCH repetitive transmission considering a single TRP with resepct to TRP 2, and may identify layer information and TPMI index information for codebook-based PUSCH transmission from the first TPMI field.

Meanwhile, although the above-described example uses the last two reserved codepoints of the second TPMI field to indicate dynamic switching, this embodiment is not limited thereto. That is, dynamic switching can be indicated using codepoints indicating two different reserved values of the second TPMI field, and PUSCH repetitive transmission considering a single TRP with respect to TRP 1 or PUSCH repetitive transmission considering a single TRP with respect to TRP 2 may be mapped to a codepoint which indicates a reserved value and be indicated.

In addition, although the above-described example describes a case in which the second TPMI field is determined using method 2, even in a case in which the second TPMI field is determined to be the same as that of NR Release 15/16 as in method 1, dynamic switching can be supported using the reserved codepoint of the TPMI in the same manner as in the above-described example.

For example, if the number of codepoints indicating the reserved value of the second TPMI field is smaller than 2, the number of bits of the second TPMI field is increased by 1, and the second codepoint from the last and the last codepoint are used to support dynamic switching based on the increased number of bits.

When two TPMI fields are determined as in method 1, a method for supporting dynamic switching may be additionally considered depending on whether each TPMI field is indicated by a codepoint which indicates a reserved value. That is, if the first TPMI field is indicated by a codepoint which indicates a reserved value, the UE may perform PUSCH repetitive transmission considering a single TRP with resect to TRP 2, and if the second TPMI field is indicated by a codepoint which indicates a reserved value, the UE may perform PUSCH repetitive transmission considering a single TRP with respect to TRP 1. If both TPMI fields indicate a codepoint for a TPMI rather than a codepoint which indicates a reserved value, the UE may perform PUSCH repetitive transmission considering multiple TRPs. If there is no codepoint having a reserved value, the number of bits of the TPMI field is increased by 1, and the last codepoint can be used for supporting dynamic switching based on the increased number of bits.

On the other hand, according to another method of supporting dynamic two SRI fields indicate dynamic switching, and the UE identifies, from two TPMI fields, layer information and TPMI index information for PUSCH repetitive transmission considering multiple TRPs or single TRPs. If one or more codepoints indicating a reserved value exist in each SRI field, dynamic switching may be supported depending on whether the corresponding SRI field indicates a codepoint which indicates a reserved value. If the first SRI field indicates a codepoint which indicates a reserved value and the second SRI field indicates an SRS resource of the second SRS resource set, the UE may perform PUSCH repetitive transmission considering a single TRP with respect to TRP 2.

In this case, the UE may identify layer information and TPMI index information from the first TPMI field in order to perform PUSCH repetitive transmission considering a single TRP with respect to TRP 2. If the second SRI field indicates a codepoint which indicates a reserved value, and the first SRI field indicates an SRS resource of the first SRS resource set, the UE may perform PUSCH repetitive transmission considering a single TRP with respect to TRP 1. In this case, the UE may identify layer information and TPMI index information from the first TPMI field in order to perform PUSCH repetitive transmission considering a single TRP with respect to TRP 1. If both SRI fields indicate an SRS resource of each SRS resource set rather than a codepoint which indicates a reserved value, the UE may perform PUSCH repetitive transmission considering multiple TRPs.

Here, the UE may identifty the layer information and TPMI index information from the first TPMI field in order to perform PUSCH repetitive transmission for TRP 1, and may identify TPMI index information from the second TPMI field in ordert to perform PUSCH repetitive transmission for TRP 2 information. Here, when performing PUSCH transmisison for TRP 1 and TRP 2, the same layer may be configured. If there is no codepoint which indicates a reserved value in both SRI fields, the number of bits in each SRI field is increased by 1, and the last codepoint among the codepoints indicating the reserved value based on the increased number of bits may be used for dynamic switching support.

In one embodiment of (1-6), a dynamic switching method for determining PUSCH transmission considering non-codebook-based single TRP or PUSCH transmission considering multiple TRPs is provided.

As an embodiment of the disclosure, (1-6) embodiment describes a dynamic switching method for determining PUSCH transmission considering non-codebook-based single TRP or PUSCH transmission considering multiple TRPs.

According to the (1-1) and (1-4) embodiments, a base station may receive a UE capability report from a UE capable of performing non-codebook-based PUSCH repetitive transmission in consideration of single DCI-based multiple TRPs, and may confiugure, for the UE, higher layer signaling for performing PUSCH repetitive transmission through multiple TRPs. Here, during PUSCH repetitive transmission considering single DCI-based multiple TRPs, as in the (1-4) embodiment, the base station may transmit, to the UE, single DCI including multiple SRI fields to indicate SRS resources existing in different SRS resource sets. Meanwhile, the multiple SRI fields may be selected through the following methods:

[Method 1] Each SRI field may be selected in the same method as in NR Release 15/16. For example, the first SRI field may indicate an SRS resource for PUSCH transmission in the first SRS resource set, and the second SRI field may indicate an SRS resource for PUSCH transmission in the second SRS resource set; and/or

[Method 2] The first SRI field may indicate SRS resource(s) for PUSCH transmission in the first SRS resource set in the same method as in NR Release 15/16. The second SRI field may indicate SRS resource(s) for PUSCH transmission in the second SRS resource set for the same layer as the layer indicated by the first SRI field.

With regard to both method 1 and method 2, in a case of codebook-based PUSCH repetitive transmissiont, the number of layers indicated by the two TPMI fields (the first TPMI field and the second TPMI field) may be the same, and in a case of non-codebook-based PUSCH repetitive transmission, the number of layers indicated by the two SRI fields (the first SRI field and the second SRI field) may be the same.

When multiple SRIs are selected through method 2, the bit length of the second SRI field may be smaller than that of the first SRI field. This is because the second SRI is determined among SRI candidates for the same layer as the layer determined as the first SRI field among SRI candidates for all supportable layers.

The UE may support a dynamic switching method of receiving single DCI including multiple SRIs and determining PUSCH repetitive transmission considering multiple TRPs or PUSCH repetitive transmission considering a single TRP based on the received single DCI. The UE may support dynamic switching by using a codepoint which indicates reserved values of multiple SRI fields included in the received DCI.

In order to describe a dynamic switching method that can be supported through codepoints indicating reserved values of multiple SRI fields as a specific example, it is assumed that the maximum number of PUSCH antenna ports is 4 and the number of SRS resources in each SRS resource set is 4. In addition, it is assumed that the first SRI field is configured by 4 bits and is indicated in the same method as in NR Release 15/16. In this case, in the first SRI region, indices 0 to 14 may be configured to indicate a layer according to an SRS resource for PUSCH transmission and a selected SRS resource, and index 15 may be configured as a codepoint which indicates a reserved value. If the second SRI field selects the same number of SRS resources as the number of layers indicated by the first SRI, as in method 2, the second SRI field may indicate SRS resource selection candidates of a case in which the layer for PUSCH transmission has one value (e.g., one value among 1 to 4) according to the first SRI field. Here, the number of bits of the second SRI field may be configured based on a layer having the largest number of candidates among the number of SRS resource selection candidates for each layer.

For example, the value of the SRI field indicating the SRS resource selection candidates for layer 1 is configured to be 0 to 3 and thus there are a total of four candidates, and the value of the SRI field indicating the SRS resource selection candidates for layer 2 is configured to be 4 to 9 and thus there are a total of 6 candidates, the value of the SRI field indicating the SRS resource selection candidates for layer 3 is configured to be 10 to 13 and thus there are a total of 4 candidates, and the value of the SRI field indicating the SRS resource selection candidates for layer 4 are configured to be 14 and thus there are a total of 1 candidate. In this case, since the number of candidates for layer 2 has the largest value of a total of 6, the number of bits of the second SRI field may be configured to be 3. When describing the second SRI field configuration in detail, if the layer for PUSCH transmission is indicated as layer 1 by the first SRI field, the UE may interpret the second SRI field as a codepoint which indicates one value among SRI candidates 0 to 3 for the layer 1 or a codepoint having the other values as a reserved value.

For example, if the layer for PUSCH transmission is indicated as layer 2 by the first SRI field, the UE may interpret the second SRI field as a codepoint which indicates one value among SRI candidates 0 to 5 for the layer 2 or a codepoint having the other values as a reserved value. In addition, for example, when the first SRI field indicates an SRI value when the layer for PUSCH transmission is layer 3 or layer 4, the UE may interpret the second SRI field in a similar manner. In this case, if two or more codepoints indicating a reserved value, in addition to a codepoint which indicates an SRI value according to a layer, exist in the second SRI field, the codepoints indicating the two reserved values may be used to indicate dynamic switching. That is, among the codepoints of the second SRI field configured by 3 bits, the second to last codepoint corresponding to the codepoint which indicates the reserved value (i.e., the 7th codepoint in the example) is used to indicate PUSCH repetitive transmission considering a single TRP using the first TRP.

In addition, the last codepoint (i.e., the 8th codepoint in the example) may be used to indicate PUSCH repetitive transmission considering a single TRP using the second TRP. Here, the UE may receive SRI for PUSCH repetitive transmission considering a single TRP, using the first SRI field. Meanwhile, the above-described assumptions are for convenience of explanation, and the disclosure is not limited thereto.

For convenience of explanation, if the above specific example for two TRPs is generalized and described, the UE may receive single DCI including two SRI fields, and may perform dynamic switching according to the codepoint indicated by the second SRI field. If the codepoint of the second SRI field indicates the SRI value for a layer indicated by the first SRI field, the UE may perform PUSCH repetitive transmission considering multiple TRPs. If the second SRI field indicates the second to last codepoint corresponding to the codepoint which indicates the reserved value, the UE may perform PUSCH repetitive transmission considering a single TRP with respect to TRP 1, and may identify SRI for non-codebook-based PUSCH transmission from the first SRI field. If the second SRI field indicates the last codepoint corresponding to the codepoint which indicates the reserved value, the UE may perform PUSCH repetitive transmission considering a single TRP with resepct to TRP 2, and may identify SRI for non-codebook-based PUSCH transmission from the first SRI field.

Meanwhile, although the above-described example uses the last two reserved codepoints of the second SRI field to indicate dynamic switching, this embodiment is not limited thereto. That is, dynamic switching can be indicated using codepoints indicating two different reserved values of the second SRI field, and PUSCH repetitive transmission considering a single TRP with respect to TRP 1 or PUSCH repetitive transmission considering a single TRP with respect to TRP 2 may be mapped to a codepoint which indicates a reserved value and be indicated.

In addition, although the above-described example describes a case in which the second SRI field is determined using method 2, even in a case in which the second SRI field is determined to be the same as that of NR Release 15/16 as in method 1, dynamic switching can be supported using a codepoint which indicates the reserved value of the SRI field in the same manner as in the above-described example.

For example, if the number of codepoints indicating the reserved value of the second SRI field is smaller than 2, the number of bits of the second SRI field is increased by 1, and the second codepoint from the last and the last codepoint are used to support dynamic switching based on the increased number of bits.

When two SRI fields are determined as in method 1, a method for supporting dynamic switching may be additionally considered depending on whether each SRI field is indicated by a codepoint which indicates a reserved value. That is, if the first SRI field is indicated by a codepoint which indicates a reserved value, the UE may perform PUSCH repetitive transmission considering a single TRP with resect to TRP 2, and if the second SRI field is indicated by a codepoint which indicates a reserved value, the UE may perform PUSCH repetitive transmission considering a single TRP with respect to TRP 1. If both SRI fields indicate a codepoint for indicating SRI rather than a codepoint which indicates a reserved value, the UE may perform PUSCH repetitive transmission considering multiple TRPs. If there is no codepoint having a reserved value, the number of bits of the SRI field is increased by 1, and the last codepoint can be used for supporting dynamic switching based on the increased number of bits.

In one embodiment of (1-7), a dynamic switching method between single and multiple TRP-based PUSCH transmissions using new DCI field is provided.

(1-7) embodiment of the disclosure describes a method of supporting dynamic switching between single and multiple TRP-based PUSCH transmissions using a new DCI field.

According to the above-described (1-5) to (1-6) embodiments, dynamic switching between single and multiple TRP-based PUSCH transmissions may be performed through multiple SRI fields or multiple TP1VII fields indicated when performing support in consideration of multi-TRP rather than a separate additional new field in DCI. Meanwhile, accroding to this method, a case in which operation only with the SRI field or the TPMI field is impossible may occur, depending on whether the number of reserved codepoints of SRI or TPMI exists as many as the number of codepoints required to indicate dynamic switching between single and multiple TRP-based PUSCH transmissions may exist, or it may be required to increase the bitwidth of the SRI field or the TPMI field in order to secure the additional number of reserved codepoints.

Accordingly, an additional new DCI field may be used to support dynamic switching between single and multiple TRP-based PUSCH transmissions independently of the number of reserved codepoints in the SRI field or the TPMI field. An additional new DCI field for supporting dynamic switching between single and multiple TRP-based PUSCH transmissions may be considered to have a bitwidth of 1 bit or 2 bits. Meanwhile, in this embodiment, the bitwidth of the new DCI field may be 1 bit, 2 bits, or more. Hereinafter, a case in which the bitwidth of the new DCI field is 1 bit or 2 bits will be described as an example.

In one embodiement, [Method 1-7-1] Case in which bitwidth of the new DCI field is fixed at 2 bits and used is provided.

If an additional new DCI field of 2 bits is used, up to 4 codepoints may be used for dynamic switching between single and multiple TRP-based PUSCH transmissions. For example, the first codepoint "00" for the additional new DCI field may be used to indicate PUSCH repetitive transmission considering multiple TRPs. Here, in a case of codebook-based PUSCH repetitive transmission, during transmission to each TRP, the first SRI and the first TPMI fields corresponding to the first TRP may be first used for transmission, and then the second SRI and the second TPMI fields corresponding to the second TRP 2 may be used for transmission.

Alternatively, in a case of non-codebook-based PUSCH repetitive transmission, during transmission to each TRP, the first SRI field corresponding to the first TRP may be first used for transmission, and then the second SRI field corresponding to the second TRP 2 may be used for transmission. That is, when each TRP is mapped with regard to each PUSCH repetitive transmission during codebook-based or non-codebook-based PUSCH repetitive transmission, the mapping may be performed in a sequence of the first TRP and the second TRP (this may be referred to as "beam mapping sequence for multiple TRPs" when describing the corresponding contents later). The second codepoint "01" for the additional new DCI field may be used to indicate PUSCH repetitive transmission in consideration of a single TRP using the first TRP. The third codepoint "10" for the additional new DCI field may be used to indicate PUSCH repetitive transmission in consideration of a single TRP using the second TRP. The fourth codepoint "11" for the additional new DCI field may be configured as a reserved codepoint, or if the base station receives, from the UE, a UE capability report supporting a change in the beam mapping sequence for multiple TRPs, and higher layer signaling (e.g., higher layer configuration for changing the beam mapping sequence for TRP) corresponding thereto is configured, the fourth codepoint "11" may be used to indicate PUSCH repetitive transmission considering multiple TRPs to which beam mapping sequence for multiple TRPs different from that of the first codepoint described above is applied.

In addition, regardless of the above-described UE capability report and the configuration of higher layer signaling corresponding thereto, the fourth codepoint "11" may be used to indicate PUSCH repetitive transmission considering multiple TRPs to which beam mapping sequence for multiple TRPs different from that of the first codepoint is applied. Here, changing the beam mapping sequence for multiple TRPs may be understood as performing transmission in the sequence of the second TRP and the first TRP, which is opposite to the sequence in which transmission is performed in the sequence of the first TRP and the second TRP when the first codepoint is used. In relation with PUSCH repetitive transmission considering a single TRP among the descriptions of the above four codepoints, if a codepoint which indicates first TRP-based PUSCH repetitive transmission is indicated to the UE through an additional new DCI field from the base station, the UE may perform, in a case of codebook-based PUSCH repetitive transmission, the first TRP-based PUSCH repetitive transmission using the first SRI field and the first TPMI field, and may perform, in a case of non-codebook-based PUSCH repetitive transmission, the first TRP-based PUSCH repetitive transmission using the first SRI field.

Here, the first SRI field is connected to (or, assocaited with) the first SRS resource set, and may be used to indicate the SRS resource in the corresponding SRS resource set. In addition, if a codepoint which indicates second TRP-based PUSCH repetitive transmission is indicated to the UE through an additional new DCI field from the base station, the UE may perform, in a case of codebook-based PUSCH repetitive transmission, the second TRP-based PUSCH repetitive transmission using the first SRI field and the first TPMI field, and may perform, in a case of non-codebook-based PUSCH repetitive transmission, the second TRP-based PUSCH repetitive transmission using the first SRI field. Here, the first SRI field is connected to (or, associated with) the second SRS resource set, and may be used to indicate the SRS resource in the corresponding SRS resource set.

In the above-described single TRP (first or second TRP)-based PUSCH repetitive transmission method, when either the first TRP or the second TRP is selected according to the codepoint indicated by the additional new DCI field, in a case of codebook-based PUSCH repetitive transmission, the first SRI field and the first TPMI field among the two SRI fields and the two TPMI fields are used, in a case of the non-codebook-based PUSCH repeated transmission, the first SRI field among the two SRI fields is used, and the second fields (the second SRI field and the second TPMI field) may be considered as not being used.

On the other hand, in a single TRP-based PUSCH repetitive transmission method to be described immediately later, unlike the above method, if the first TRP-based PUSCH repetitive transmission method (that is, when the first TRP is selected or the first TRP-based PUSCH repetitive transmission is indicated according to a codepoint), the first field (the first SRI field or the first TPMI field) may be used, and if the second TRP-based PUSCH repetitive transmission method (that is, when the second TRP is selected or the second TRP-based PUSCH repetitive transmission is indicated according to a codepoint), the second field (the second SRI field or the second TPMI field) may be used.

As another example of PUSCH repetitive transmission in consideration of a single TRP among the descriptions of the above four codepoints, if a codepoint which indicates first TRP-based PUSCH repetitive transmission is indicated to the UE through an additional new DCI field from the base station, the UE may perform, in a case of codebook-based PUSCH repetitive transmission, the first TRP-based PUSCH repetitive transmission using the first SRI field and the first TPMI field, and may perform, in a case of non-codebook-based PUSCH repetitive transmission, the first TRP-based PUSCH repetitive transmission using the first SRI field. Here, the first SRI field is connected to (or, associated with) the first SRS resource set, and may be used to indicate the SRS resource in the corresponding SRS resource set.

In addition, if a codepoint which indicates second TRP-based PUSCH repetitive transmission is indicated to the UE through an additional new DCI field from the base station, the UE may perform, in a case of codebook-based PUSCH repetitive transmission, the second TRP-based PUSCH repetitive transmission using the second SRI field and the second TPMI field, and may perform, in a case of non-codebook-based PUSCH repetitive transmission, the second TRP-based PUSCH repetitive transmission using the second SRI field. Here, the second SRI field is connected to (or, associated with) the second SRS resource set, and may be used to indicate the SRS resource in the corresponding SRS resource set.

The above example shows an example of PUSCH repetitive transmission considering multiple TRPs according to four codepoints or PUSCH repetitive transmission considering a single TRP, and each codepoint and an operation corresponding to the corresponding codepoint may be different from the example (e.g., codepoint "11" may be used to indicate PUSCH repetitive transmission considering multiple TRPs, codepoint "10" may be used to indicate PUSCH repetitive transmission considering multiple TRPs applying a beam mapping sequence for multiple TRPs different from that of codepoint "11," and codepoint "00" may be used to indicate PUSCH repetitive transmission considering a single TRP using the first TRP).

In one embodiment, [Method 1-7-2] Case in which bit-width of the new DCI field is fixed at 1 bit and used is provided.

The example described through method 1-7-1 describes a case in which 2 bits are always used as the bitwidth of the additional new DCI field. Meanwhile, in order to reduce DCI overhead, the bit length of the additional new DCI field is fixed at 1 bit, and dynamic switching between single and multiple TRP-based PUSCH transmissions can be supported by additionally using two SRI fields or two TPMI fields together. As an example, the additional new DCI field may be used to indicate whether or not PUSCH transmission considering single TRP or PUSCH transmission considering multiple TRPs occurs. For example, if the new DCI field is indicated as "0," the UE may perform PUSCH transmission considering a single TRP.

In addition, among two SRI fields or (if available) two TPMI fields, the second field (the second SRI field or the second TPMI field) may be used to indicate TRP, and the first SRI field or the first TPMI field may be used as information for PUSCH transmission. That is, the second SRI field or the second TPMI field indicates one SRS resource set, which is configured to be used for PUSCH transmission, among two SRS resource used for "codebook" or "nonCodebook," and the first SRI field or the first TPMI field may indicate the SRS resource, TPMI index, and layer information for the SRS resource set indicated by the second SRI field or the second TPMI field. Since the second SRI field and the second TPMI field are not used during PUSCH transmission considering a single TRP, the second SRI field or the second TPMI field may be reused for selection of a TRP.

For example, when an additional new DCI field for dynamic switching between single and multiple TRP-based PUSCH transmission is configured to be "0" to perform PUSCH transmission considering a single TRP, the first codepoint of the second SRI field may be understood as performing PUSCH transmission based on the first TRP, that is, the first SRS resource set (used for "codebook" or "nonCodebook"). Alternatively, the second codepoint of the second SRI field may be understood as performing PUSCH transmission based on the second TRP, that is, the second SRS resource set (used for "codebook" or "nonCodebook"). Meanwhile, this is only an example to explain the embodiment, and the embodiment is not limited thereto.

Alternatively, if the additional new DCI field is indicated as "1," the UE may perform PUSCH transmission considering multiple TRPs. In this case, both SRI fields (the first SRI field and the second SRI field) or the two TPMI fields (the first TPMI field and the second TPMI field) may be used as information for PUSCH transmission considering multiple TRPs. For example, PUSCH transmission may be performed using the first SRI field and the first TPMI field corresponding to the first TRP, and PUSCH transmission may be performed using the second SRI field and the second TPMI field corresponding to the second TRP. Meanwhile, this is only an example to explain the embodiment, and the embodiment is not limited thereto.

In one embodiment, [Method 1-7-3] Case in which the bitwidth of a new DCI field is determined to be either 1 bit or 2 bits according to higher layer signaling and used is provided.

As another method of performing dynamic switching between single and multiple TRP-based PUSCH transmissions using the additional new DCI field, the bitwidth of the additional new DCI field may be determined according to the conditions of higher layer signaling. The above-described dynamic switching method between single or multiple TRP-based PUSCH transmissions using an additional new DCI field of 1-bit length may be used when the second SRI field or the second TPMI field exists. That is, if the second SRI field or the second TPMI field does not exist, the above-described dynamic method may not be used. Meanwhile, whether the second SRI field or the second TPMI field does not exist may be determined based on higher layer configuration. For example, if non-codebook-based PUSCH transmission is performed and the number of SRS resources included in the second SRS resource set is configured to be 1, the second SRI field may not exist.

As another example, if a codebook-based PUSCH transmission is performed, the number of SRS resources included in the second SRS resource set is configured to be 1, and the number of antenna ports set in the corresponding SRS resource is configured to be 1, both the second SRI field and the second TPMI field may not exist. According to these rules, the base station may determine whether the second SRI field or the second TPMI field exists according to the higher layer configuration configured in the UE, and the base station may configure, based on the determination, the bitwidth of the additional new DCI field for dynamic switching between single and multiple TRP-based PUSCH transmissions to be 1 bit or 2 bits. If the second SRI field or the second TPMI field exists according to the higher layer configuration of the base station, the base station may configure the bitwidth of the additional new DCI field for dynamic switching between single and multiple TRP-based PUSCH transmissions to be 1 bit. If the second SRI field or the second TPMI field does not exist according to the higher layer configuration of the base station, the base station may configure the bitwidth of the additional new DCI field for dynamic switching between single and multiple TRP-based PUSCH transmissions to be 2 bits.

Through the (1-7) embodiment, [Method 1-7-1] to [Method 1-7-3] for performing dynamic switching between single and multiple TRP-based PUSCH transmissions using an additional new DCI field may be described as a series of operations below. Meanwhile, the following operations may be performed sequentially or simultaneously, and some of operations may be omitted.

1) The UE may report UE capability for operation considering multiple TRPs to the base station. Here, the reported UE capability may include whether at least one of [Method 1-7-1] to [Method 1-7-3] is supported, information related to multi-TRP transmission mapping sequence when reporting whether [Method 1-7-1] is supported, and the like.

2) The base station may perform dynamic switching for PUSCH repetitive transmission considering single or multiple TRPs by configuring one of [Method 1-7-1] to [Method 1-7-3] according to higher layer signaling and using according to the reported UE capability, or based on one of [Method 1-7-1] to [Method 1-7-3] without specific higher layer signaling according to a predetermined standard method between the UE and the base station regardless of the UE capability, A. When one of [Method 1-7-1] to [Method 1-7-3] is configured and used according to higher layer signaling, the UE may perform dynamic switching for PUSCH repetitive transmission in consideration of single or multiple TRPs based on one of [Method 1-7-1] to [Method 1-7-3].

B. When using a predetermined standard method between the UE and the base station, the UE may perform dynamic switching for PUSCH repetitive transmission in consideration of single or multiple TRPs based on one determined according to the predetermined method among [Method 1-7-1] to [Method 1-7-3].

In a second embodiment, a frequency hopping and transmission beam mapping method during PUSCH repetitive transmission considering multiple TRPs is provided.

The second embodiment of the disclosure describes a method of frequency hopping and transmission beam mapping for each PUSCH during PUSCH repetitive transmission considering multiple TRPs. Here, the transmission beam may be an indicator that collectively refers to an SRS resource connected to one SRS spatial relation info, an SRS spatial relation, and TPMI. The frequency hopping method and the transmission beam mapping method may be configured by higher layer signaling independently or dependently to each other, indicated by L1 signaling, or may operate as a combination of higher layer signaling configuration and L1 signaling. The independently performing of the frequency hopping method and the transmission beam mapping method with each other denotes that the two methods are configured with independent signaling (e.g., configured by higher layer signaling, indicated by L1 signaling, a comnbination of higher layer signaling configuration and L1 signaling indication). However, not all cases of frequency hopping methods and all cases of transmit beam mapping methods are possible combinations. For example, when there are 3 frequency hopping methods and 4 transmission beam mapping methods, not all 12 combinations are supported, but only 10 combinations may be supported. Details thereof will be described through the following detailed examples.

In one embodiment of (2-1), a transmission beam mapping method during PUSCH repetitive transmission considering multiple TRPs is provided.

In the (2-1) embodiment, a transmission beam mapping method during PUSCH repetitive transmission considering multiple TRPs will be described. When multiple transmission beams from the base station are configured by higher layer signaling, indicated by L1 signaling, or transmitted using a combination of higher layer configuration and L1 signaling indication, the UE may determine a transmission beam mappling method to be performed during PUSCH repetitive transmission considering multiple TRPs. The information on the plurality of transmission beams may include an SRI to which multiple pieces of SRS spatial relation info are connected or an SRI connected to one SRS spatial relation info.

The base station may configure, by higher layer signaling, information on a transmission beam, which will be mapped to each PUSCH repetitive transmission, and on a mapping method thereof, among multiple pieces of transmission beam information received by the UE, that is, a transmission beam mapping unit, or may indicate the same by L1 signaling, or may transmit the same as a combination of higher layer signaling configuration and L1 signaling indication. In addition, in a case of PUSCH repetitive transmission considering multiple TRP, the total number of PUSCH repetitive transmissions may be configured by higher layer signaling, indicated by L1 signaling, or transmitted as a combination of higher layer signaling configuration and L1 signaling indication.

The following candidates may be available for the transmission beam mapping unit:

Each slot and subslot or multiple slots and subslots;
Each repetitive transmission (nominal or actual) or multiple repetitive transmissions (nominal or actual);
Each symbol or multiple symbols; and/or
1/N of the total number of repetitive transmissions.

If the unit of transmission beam mapping is a slot, the same transmission beam is applied to all PUSCH repetitive transmissions (nominal or actual) in the slot, and the transmission beam change is performed in units of slots. For example, if the total number of PUSCH repetitive transmissions is 4, the number of transmission beams is 2, the transmission beam mapping unit is a slot, and there are two PUSCH repetitive transmissions in each slot, the first transmission beam may be applied to the first and the second PUSCH repetitive transmission transmitted in the first slot, and the second transmission beam may be applied to the third and the fourth PUSCH repetitive transmission transmitted in the second slot. As another example, if the total number of repetitive transmissions is 4, the number of transmission beams is 2, the transmission beam mapping unit is 2 slots, and one PUSCH repetitive transmission is performed in each slot, the first transmission beam may be applied to the first and the second PUSCH repetitive transmission transmitted in the first slot and the second slot respectively, and the second transmission beam may be applied to the third and the fourth PUSCH repetitive transmission transmitted in the third slot and the fourth slot respectively.

If the unit of transmission beam mapping is 1/N of the total number of PUSCH repetitive transmissions, N may be a divisor of the total number of repetitive transmissions, or a natural number equal to or smaller than the total number of repetitive transmissions while being 2 or more. For example, when the total number of PUSCH repetitive transmissions is 6, the number of transmission beams is 2, and the transmission beam mapping unit is 1/2 (N=2) of the total number of repetitions, the UE may apply the first transmission beam to the first to the thrid PUSCH repetitive transmissions, and may apply the second transmission beam to the fourth to the sixth PUSCH repetitive transmissions.

In addition, if a fixed transmission beam mapping unit is used among the above transmission beam mapping units, or a transmission beam mapping unit, which is configured by higher layer signaling, indicated by L1 signaling, or transmitted as a combination of higher layer signaling configuration and L1 signaling indication from the base station by the UE, the base station may transfer the transmission beam mapping method, which corresponds to one of cyclical and sequential, to the UE by higher layer signaling configuration, L1 signaling indication, or as a combination of higher layer signaling configuration and L1 signaling indication.

For example, when the total number of PUSCH repetitive transmissions is 6, the number of transmission beams is 2, the transmission beam mapping unit is each repetitive transmission (nominal or actual), and the transmission beam mapping method is cyclical, the UE may apply the first transmission beam to odd-numbered PUSCH repetitive transmission, and may apply the second transmission beam to even-numbered PUSCH repetitive transmission. In addition, when the transmission beam mapping method is sequential, the number of transmission beam mapping units to which the same transmission beam is applied may be 2 or a divisor of the total number of repetitive transmissions, and the corresponding information may be predetermined (e.g., fixed to two and used without specific signaling), may be configured by higher layer signaling, may be indicated by L1 signaling, or may be transmitted as a combination of higher layer signaling configuration and L1 signaling indication. In the above example, if the transmission beam mapping method is sequential and the number of transmission beam mapping units to which the same transmission beam is applied is 2, the UE may apply the first transmission beam to the first and second PUSCH repetitive transmissions, may apply the second transmission beam to the third and fourth PUSCH repetitive transmissions, and may apply the first transmission beam to the fifth and sixth PUSCH repetitive transmissions.

In one embodiment of (2-2), an independent frequency hopping and transmission beam mapping method is provided.

In the (2-2) embodiment, a method for independently performing a frequency hopping method and a transmission beam mapping method during PUSCH repetitive transmission considering multiple TRPs will be described. Similarly to the transfer procedure of the transmission beam mapping unit from the base station, the frequency hopping method is configured from the base station to the UE by higher layer signaling, indicated by L1 signaling, or transmitted as a combination of higher layer signaling configuration and L1 signaling indication. In addition, the UE may receive from the base station the frequency hopping method independently of the transfer process for the transmission beam mapping unit from the base station. In a case of a frequency hopping unit, the following candidates may be possible:

Between slots or multiple slots;
In-slot frequency hopping method;
Frequency hopping method between repetitive transmissions or between multiple repetitive transmissions; and/or
Frequency hopping method within repetitive transmission.

The UE may independently apply the frequency hopping method and transmission beam mapping unit, which are configured by higher layer signaling, indicated by L1 signaling, or transmitted as a combination of higher layer signaling configuration and L1 signaling indication.

Figure 19:
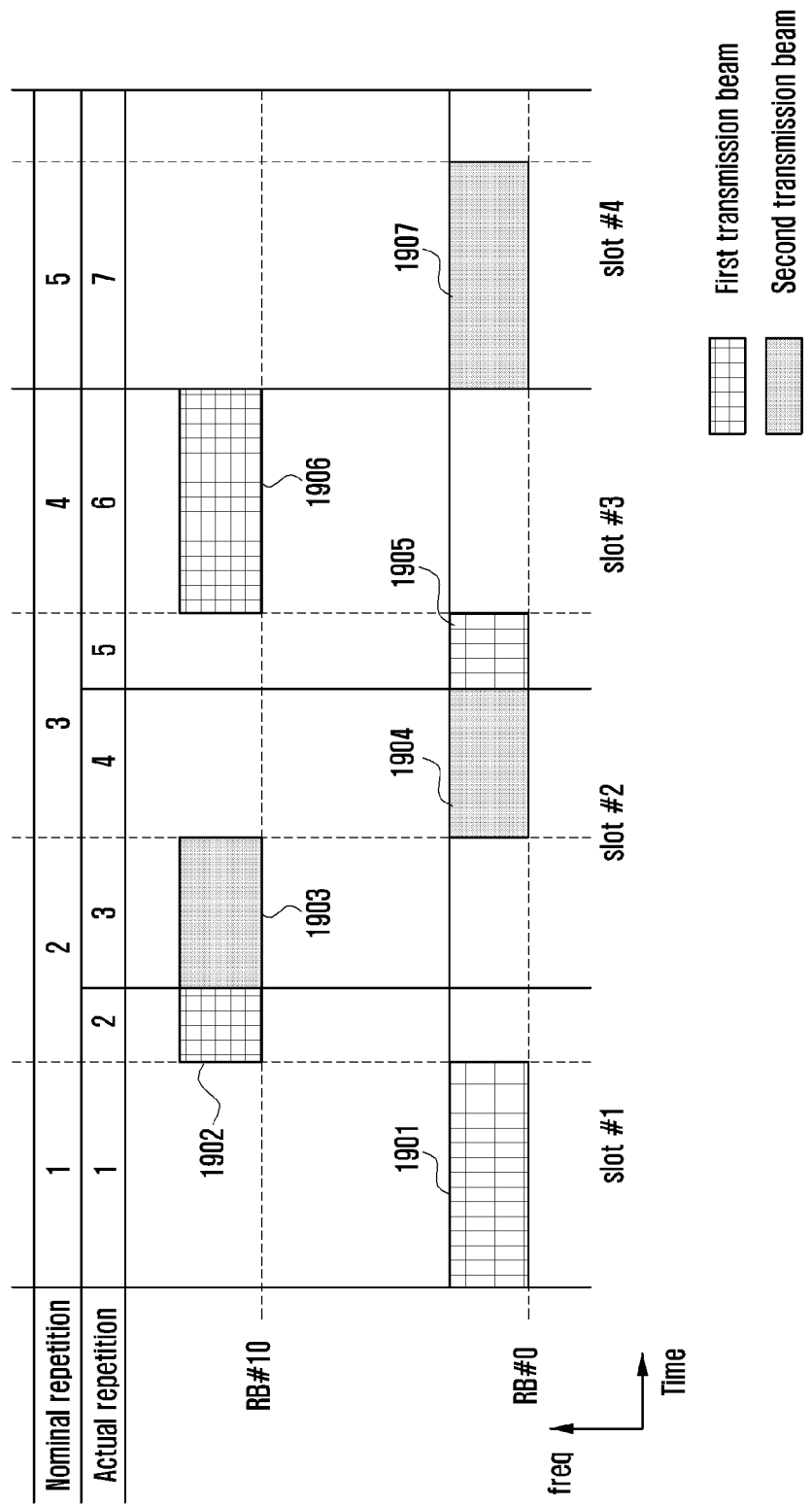
FIG. 19 illustrates a method of independently determining frequency hopping and transmission beam mapping during PUSCH repetitive transmission considering multiple TRPs according to an embodiment of the disclosure.

FIG. 19 illustrates a method of independently determining frequency hopping and transmission beam mapping during PUSCH repetitive transmission considering multiple TRPs according to an embodiment of the disclosure.

For example, if the PUSCH repetitive transmission method is PUSCH repetitive transmission type B, the total number of PUSCH repetitive transmissions (e.g., the number of nominal repetitions) is 5, the symbol length of the nominal repetition is 10, and the frequency hopping method between nominal repetitions is used as the frequency hopping method, the transmission beam mapping unit is a slot, the number of PUSCH repetitive transmissions in the slot is 1, the starting RB position is RB #0, and the RB offset due to frequency hopping is RB #10, the UE applies the first transmission beam in the first slot 1901 or 1902 and the third slot 1905 or 1906, and applies the second transmission beam in the second slot 1903 or 1904 and the fourth slot 1907. The UE transmits the first actual repetition 1901 in RB #0 in slot #1, and transmits the second actual repetition 1902 in RB #10 in slot #1. The UE transmits the third actual repetition 1903 in RB #10 in slot #2, and transmits the fourth actual repetition 1904 in RB #0 in slot #2. The UE transmits the fifth actual repetition 1905 in RB #0 in slot #3, and transmits the sixth actual repetition 1906 in RB #10 in slot #3. The UE transmits the seventh actual repetition 1907 in RB #0 in slot #4.

In addition, when the combination of a specific frequency hopping method and a transmission beam mapping unit is configured by higher layer signaling, is indicated by L1 signaling, or is transmitted as a combination of higher layer signaling configuration and L1 signaling indication, the base station and the UE may insert one or multiple symbol gaps between respective repetitive transmissions or between frequency hops in frequency hopping, in addition to transmission power change due to different transmission beam application, or may drop one or multiple transmission symbols.

In addition, the base station and the UE may not support the combination of the specific frequency hopping method and the transmission beam mapping unit as described above. For example, if frequency hopping does not occur or only one transmission beam mapping occurs when a combination of a specific frequency hopping method and a transmission beam mapping unit is used, the corresponding combination may not be supported. For example, if the total number of PUSCH repetitive transmissions is 2, the frequency hopping unit is a slot, the transmission beam mapping is performed in units of PUSCH repetitive transmission, and the number of PUSCH repetitive transmissions in the slot is 2, the UE maps the first transmission beam with regard to the first PUSCH repetitive transmission in the first slot, maps the second transmission beam with regard to the second PUSCH repetition transmission, and may not perform frequency hopping. The UE may not expect such a combination to be configured from the base station by higher layer signaling, to be indicated by L1 signaling, or to be transmitted as a combination of higher layer signaling configuration and L1 signaling indication.

In one embodiment of (2-3), a dependent frequency hopping and transmission beam mapping method is provided.

In the (2-3) embodiment, a method for performing a frequency hopping method and a transmission beam mapping method in a dependent manner with each other during PUSCH repetitive transmission considering multiple TRPs will be described. Determining the frequency hopping method and the transmission beam mapping method in a dependent manner with each other is to maximize frequency diversity and spatial diversity with regard to PUSCH repetitive transmission considering multiple TRPs.

For example, the frequency hopping unit may be larger than the transmission beam mapping unit. That is, the UE may perform PUSCH transmission by applying different transmission beams at the same frequency position, and may perform frequency hopping to another frequency position and thus perform PUSCH transmission at the corresponding position by applying different transmission beams. As another example, the frequency hopping unit may be smaller than the transmission beam mapping unit. That is, the UE may perform PUSCH transmission at different frequency positions by applying the same transmission beam, and may perform PUSCH transmission at different frequency positions by applying different transmission beams. As described above, the following three methods may be considered for the method of having the dependency between the frequency hopping unit and the transmission beam mapping unit.

In one embodiment of [Method 1], independent configurations of frequency hopping and transmission beam mapping units is used.

The UE may perform dependent frequency hopping and transmission beam mapping by using the frequency hopping method and each transmission method of the transmission beam mapping unit. Each transmission method may be the same as above, but additional restrictions may exist.

As an example, when the UE receives, from the base station, configuration of the frequency hopping method and the transmission beam mapping method by higher layer signaling, receives indication thereof by L1 signaling, or receives configuration and indication thereof by a combination of higher layer signaling and L1 signaling, the frequency hopping unit may be expected to be smaller than the transmission beam mapping unit. For example, when the UE receives configuration of the frequency hopping method in slot units by higher layer signaling, receives indication thereof by L1 signaling, or receives configuration and indication thereof by a combination of higher layer signaling and L1 signaling, it is not expected that the UE receives configuration of the transmission beam mapping unit, the unit of which is larger than a slot, by higher layer signaling, receives indication thereof by L1 signaling, or recevies configuration and indication by a combination of higher layer signaling and L1.

As another example, when the UE receives, from the base station, configuration of the frequency hopping method and the transmission beam mapping method by higher layer signaling, receives indication thereof by L1 signaling, or receives configuration and indication thereof by a combination of higher layer signaling and L1 signaling, it may be expected that frequency hopping unit is larger than the transmission beam mapping unit. For example, when the UE recevies configuration of the frequency hopping method in units of slots by higher layer signaling, or receives indication thereof by L1 signaling, or receives configuration and indication thereof by a combination of higher layer signaling and L1 signaling, the UE may not expect that the transmission beam mapping unit, the unit of which is smaller than a slot, is configured with higher layer signaling, indicated by L1 signaling, or configured and indicated by a combination of higher layer signaling and L1.

In one embodiment of [Method 2], a transmission beam mapping unit configuration based on frequency hopping unit configuration is provided.

The UE may support a transmission beam mapping unit according to the frequency hopping method, which is configured and indicated by higher layer signaling, L1 signaling, or a combination of higher layer signaling and L1 signaling from the base station. That is, the UE may receive configuration and indication of a transmission beam mapping unit as a multiple of the configured or indicated frequency hopping unit. For example, if the UE receives configuration or indication of the frequency hopping method of a slot unit from the base station, the UE may be configured or indicated with a transmission beam mapping unit in one slot or multiple slots.

Figure 20:
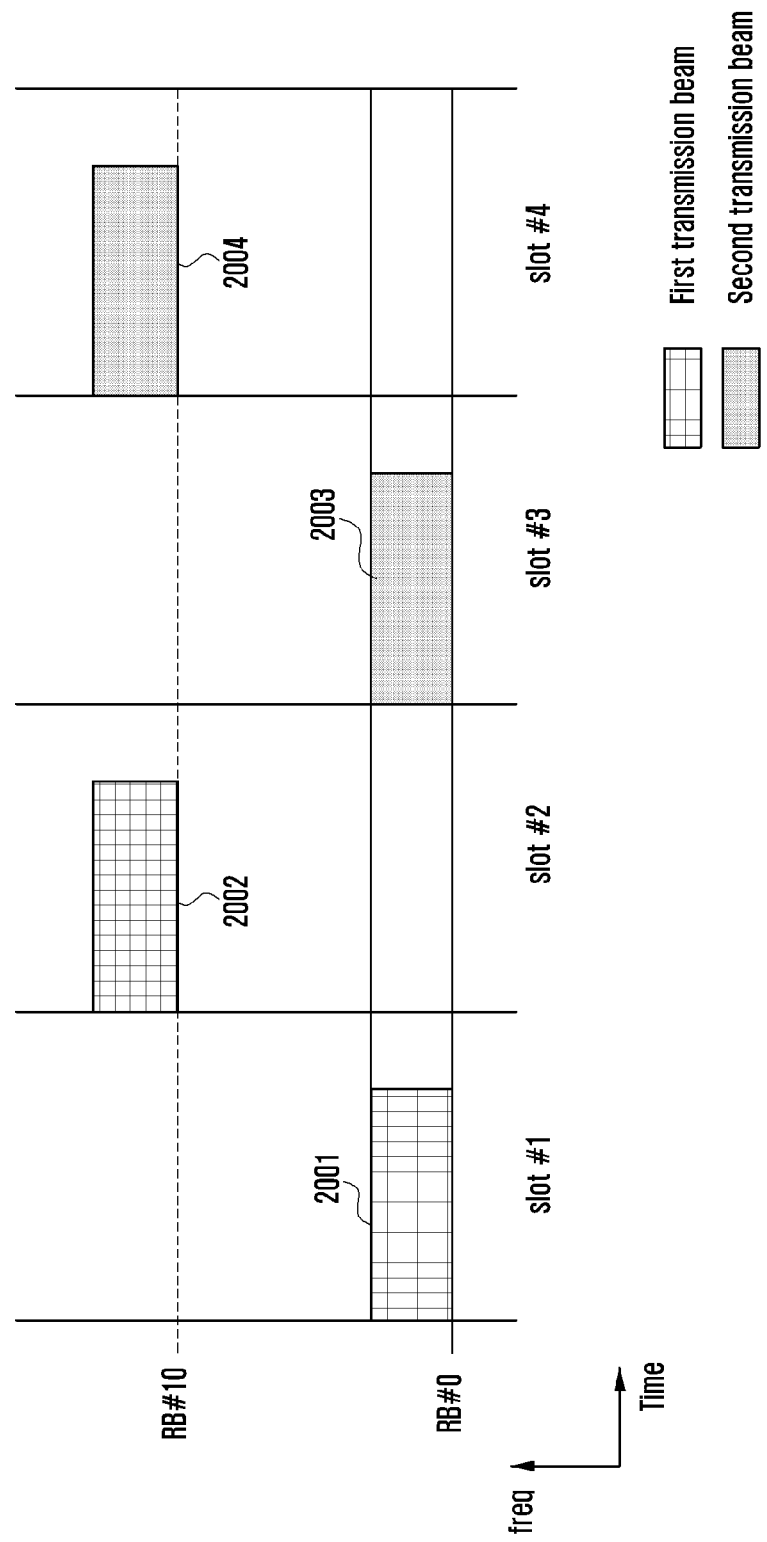
FIG. 20 illustrates transmission beam mapping unit configuration based on frequency hopping unit configuration according to an embodiment of the disclosure.

FIG. 20 illustrates transmission beam mapping unit configuration based on frequency hopping unit configuration according to an embodiment of the disclosure. When assuming that the number of PUSCH repetitive transmissions is 4, a frequency hopping method is performed in units of slots, the transmission beam mapping unit is configured or indicated with 2 and thus transmission beam mapping is performed in units of 2 slots, the number of PUSCH repetitive transmissions in the slot is 1, the starting RB position is RB #0, and the frequency hopping RB offset is 10 RB, the UE performs PUSCH transmission by applying the first transmission beam in RB #0 with regard to the first PUSCH repetitive transmission in the first slot (indicated by reference numeral 2001), performs PUSCH transmission by applying the first transmission beam in RB #10 with regard to the second PUSCH repetitive transmission in the second slot (indicated by reference numeral 2002), performs PUSCH transmission by applying the second transmission beam in RB #0 with regard to the third PUSCH repetitive transmission in the third slot (indicated by reference numeral 2003), and performs PUSCH transmission by applying the second transmission beam in RB #10 with regard to the fourth PUSCH repetitive transmission in the fourth slot (indicated by reference numeral 2004).

In addition, the UE may be configured or indicated with a lower transmission beam mapping unit than the configured or indicated frequency hopping unit. The base station may apply the following two methods to configure or indicate the transmission beam mapping unit to be lower than the frequency hopping unit.

In one embodiment of [Method 3], a definition of a set of available frequency hopping units and selection of a transmission beam mapping unit from the corresponding set is provided.

The UE may pre-define a set including available frequency hopping units. The corresponding set may be defined in the following order:
Unit 1: Within actual PUSCH repetitive transmission;
Unit 2: Actual PUSCH repetitive transmission;
Unit 3: Within nominal PUSCH repetitive transmission;
Unit 4: Nominal PUSCH repetitive transmission; and
Unit 5: Slot.

The UE may be configured or indicated by higher layer signaling, L1 signaling, or a combination of higher layer signaling and L1 signaling from the base station how many units lower than the frequency hopping unit in the set the transmission beam mapping unit uses. For example, if the UE receives, from the base station, configuration and indication of the slot unit frequency hopping method of unit 5, and receives configuration and indication of use of the transmission beam mapping unit, the unit of which is one level lower than the frequency hopping unit, the UE may perfrom the transmission beam mapping in nominal PUSCH repetition transmission units, which is unit 4.

In addition, during PUSCH repetitive transmission considering multiple TRPs, in a case in which the transmission beam mapping unit, the transmission beam mapping method, and the frequency hopping method are configured by higher layer signaling, indicated by L1 signaling, or transmitted as a combination of higher layer signaling and L1 signaling, the UE may ignore the frequency hopping method in order to reduce the burden on the UE. In addition, when the transmission beam mapping unit, the transmission beam mapping method, and the frequency hopping method are configured by higher layer signaling, indicated by L1 signaling, or transmitted as a combination of higher layer signaling and L1 signaling, the UE does not expect that both the transmission beam mapping unit and the frequency hopping unit are applied in a slot (e.g., in a case in which the transmission beam mapping unit is actual repetition and the frequency hopping unit is repetitive transmission in a slot).

In a third embodiment, a PUSCH transmission beam mapping method considering slot format during PUSCH repetitive transmission considering multiple TRPs is provided.

As an embodiment of the disclosure, a PUSCH transmission beam mapping method in consideration of a slot format will be described. In the (3-1) embodiment, a method for indicating a slot format to a UE by a base station is described, and in the (3-2) embodiment, a transmission beam mapping method considering a slot format with regard to a dynamic grant-based or configured grant-based PUSCH repetitive transmission considering multiple TRPs will be described.

In one embodiment of (3-1), a slot format indication method is provided.

In the (3-1) embodiment, a method for indicating a slot format to a UE by a base station will be described. In the 5G communication system, a downlink signal transmission interval and a uplink signal transmission interval may be dynamically changed. To this end, the base station may indicate to the UE whether each of the OFDM symbols configuring one slot is a downlink symbol, an uplink symbol, or a flexible symbol through a slot format indicator (SFI). Here, the flexible symbol may not both a downlink and an uplink symbol, or may denote a symbol that can be changed to a downlink or uplink symbol according to UE-specific control information or scheduling information. Here, the flexible symbol may include a gap guard required in the process of switching from downlink to uplink.

The UE having received the slot format indicator may perform an operation of downlink signal reception from the base station in a symbol indicated by the downlink symbol, and may perform an operation of uplink signal transmission to the base station in a symbol indicated by the uplink symbol. With regard to a symbol indicated by a flexible symbol, the UE may perform at least a PDCCH monitoring operation, and through another indicator, for example, DCI, the UE may perform an operation of downlink signal reception from the base station in the flexible symbol (e.g., when DCI format 1_0 or 1_1 is received), and may perform an operation of uplink signal transmission to the base station (e.g., when DCI format 0_0 or 0_1 is received).

Figure 21:
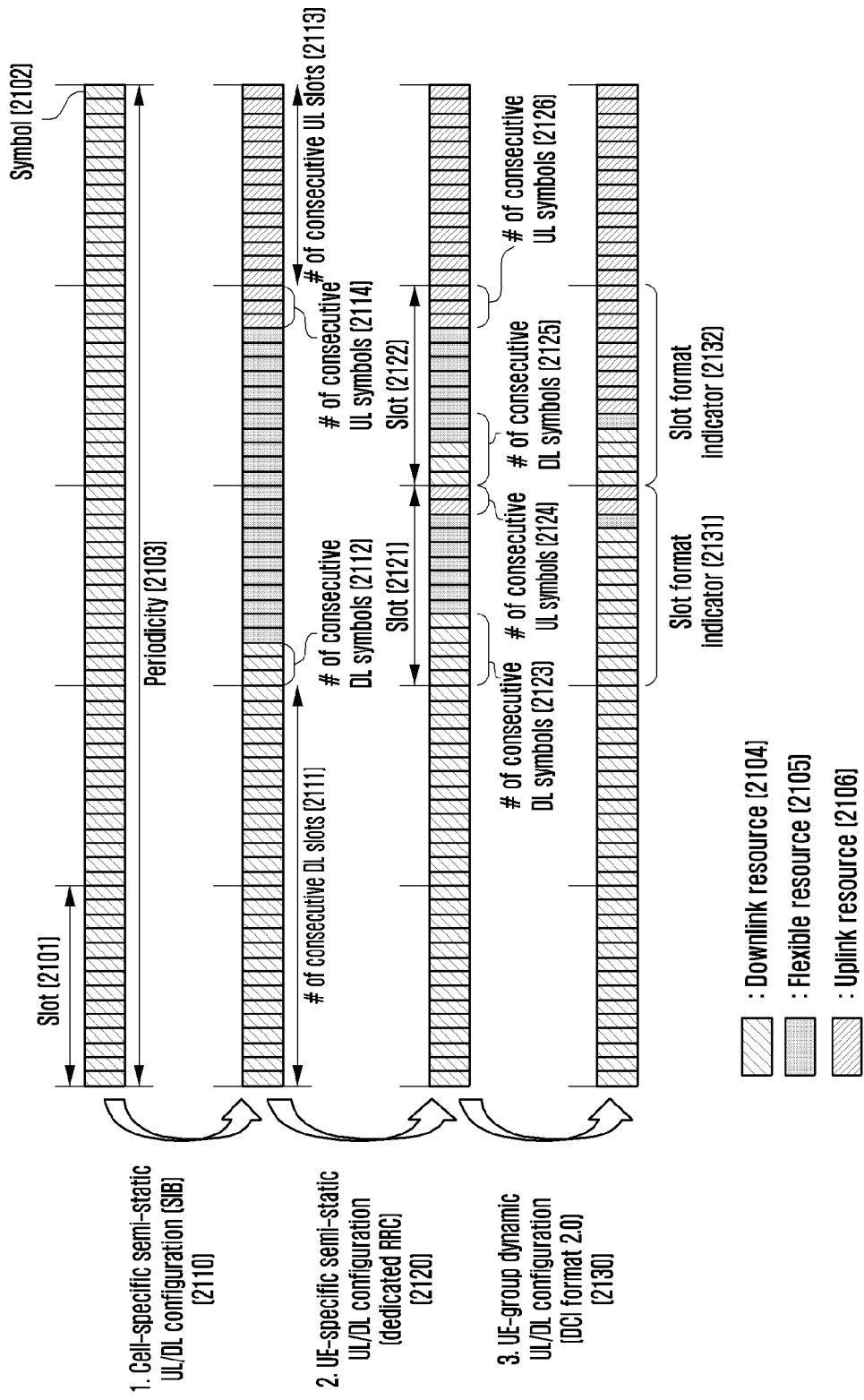
FIG. 21 illustrates an example of an uplink-downlink configuration (UL/DL configuration) in a wireless communication system according to an embodiment of the disclosure.

FIG. 21 illustrates an example of an uplink-downlink configuration (UL/DL configuration) in a wireless communication system according to an embodiment of the disclosure.

Referring to FIG. 21, three stages of uplink-downlink configuration of symbols/slots are illustrated. In the first stage, the uplink-downlink of the symbol/slot may be configured through cell-specific configuration information 2110 for configuration of the uplink-downlink in semi-static, for example, system information such as SIB. Specifically, the cell-specific uplink-downlink configuration information 2010 in the system information may include uplink-downlink pattern information and information indicating a reference subcarrier spacing. The uplink-downlink pattern information may include a transmission periodicity 2103 of each pattern, the number of consecutive full DL slots 2111 at the beginning of each DL-UL pattern, the number of consecutive DL symbols 2112 in the beginning of the slot following the last full DL slot, the number of consecutive full UL slots 2113 at the end of each DL-UL pattern, and the number of consecutive UL symbols 2114 in the end of the slot preceding the first full UL slot. In this case, the UE may determine a slot/symbol that is not indicated by uplink or downlink as a flexible slot/symbol.

In a second stage, the UE-specific configuration information 2120 transfered through UE-dedicated higher layer signaling (i.e., RRC signaling) may indicate symbols to be configured as downlink or uplink in a flexible slot or slots 2121 and 2122 including a flexible symbol. For example, the UE-specific uplink-downlink configuration information 2120 may include a slot index indicating slots 2121 and 2122 including flexible symbols, the number of consecutive DL symbols 2123 and 2125 in the beginning of the slots, the number of consecutive UL symbols 2124 and 2126 in the end of the slot, or information indicating the entire downlink or information indicating the entire uplink for each slot. Here, the symbol/slot configured as uplink or downlink through the cell-specific configuration information 2110 in the first state cannot be changed to downlink or uplink through the UE-specific higher layer signaling 2120.

Finally, in order to dynamically change the downlink signal transmission interval and the uplink signal transmission interval, the downlink control information of the downlink control channel may include a slot format indicator 2130 indicating whether each symbol, in each slot among multiple slots starting from a slot in which the UE detects the downlink control information, is a downlink symbol, an uplink symbol, or a flexible symbol. In this case, with regard to the symbol/slot configured as uplink or downlink in the first and second stages, the slot format indicator may not indicate as to downlink or uplink. The slot format of each of slots 2131 and 2132 including at least one symbol that is not configured as uplink or downlink in the first and second stages may be indicated by the corresponding downlink control information.

The slot format indicator may indicate the uplink-downlink configuration for 14 symbols in one slot as shown in Table 17-1 below. The slot format indicator may be simultaneously transmitted to multiple UEs through a UE group (or cell) common control channel. In other words, the downlink control information including the slot format indicator may be transmitted through a PDCCH that is CRC scrambled by an identifier different from the UE-specific cell-RNTI (C-RNTI), for example, an SFI-RNTI. The downlink control information may include a slot format indicator for one or more slots, that is, N slots. Here, the value of N may be an integer greater than 0, or a value configured by the UE via higher layer signaling from the base station from among a set of predefined possible values such as 1, 2, 5, 10, 20, and the like. The size of the slot format indicator may be configured by the base station to the UE via higher layer signaling.

TABLE 17-1

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | F | F | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | F | F | U | | |

TABLE 17-1-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | Reserved | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In [Table 17-1], D denotes a downlink symbol, U denotes an uplink symbol, and F denotes a flexible symbol. According to [Table 17-1], the total number of supportable slot formats for one slot is 256. The maximum size of information bits that can be used for slot format indication in the NR system is 128 bits, and the base station may configure the information bits for the UE via higher layer signaling, for example, "dci-PayloadSize."

In this case, a cell operating in a licensed or unlicensed band may configure and indicate an additional slot format as shown in [Table 17-2] by introducing one or more additional slot formats or modifying at least one of the existing slot formats. Table 17-2 shows an example of additional slot formats in which one slot includes only an uplink symbol and a flexible symbol F.

TABLE 17-2

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

In an embodiment, downlink control information used for slot format indication may indicate slot format(s) regarding multiple serving cells, and the slot format(s) for each serving cell may be distingusihed through a serving cell ID (serving cell ID). In addition, a slot format combination for one or more slots with regard to each serving cell may be indicated according to downlink control information. For example, when one slot format indicator index field in downlink control information has the size of 3 bits and indicates the slot format for one serving cell, the 3-bit slot format indicator index field may indicate one of a total of 8 slot formats (or slot format combination), and the base station may indicate the slot format indicator index field through UE group common DCI.

In an embodiment, at least one slot format indicator index field included in the downlink control information may be configured as a slot format combination indicator for multiple slots. For example, Table 17-3 shows a 3-bit slot format combination indicator configured by the slot formats of Table 17-1 and Table 17-2. Among the values of the slot format combination indicator, {0, 1, 2, 3, 4} indicates the slot format for one slot. The remaining three values {5, 6, 7} indicate the slot format for 4 slots, and the UE may apply the indicated slot format to four slots sequentially from a slot in which the downlink control information including the slot format combination indicator is detected.

TABLE 17-3

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

In an embodiment, if the UE is not configured to monitor DCI format 2_0, some symbols of a specific slot are configured as flexible symbols (F) according to the slot format configured by higher layer signaling. If the slot format of a specific slot is not configured, the UE may receive DCI, RAR UL grant, fallbackRAR UL grant, or successRAR, with regard to some symbols in the slot, and may transmit PUSCH, PUCCH, PRACH, or SRS indicated in the received information.

In an embodiment, if some symbols of a specific slot are configured as flexible symbol F based on the slot format configured by higher layer signaling, it is not expected the UE to receive an uplink transmission configuration to be transmitted in some symbols of the corresponding slot based on higher layer signaling, for example, a configured grant-based PUSCH, or PUCCH, or SRS.

In an embodiment, if the UE has received scheduling of PUSCH transmission for multiple slots in DCI format 0_1, and at least one of the symbols at a position where the PUSCH transmission occurs in one slot among the multiple slots via higher layer signaling is configured for DL, the UE does not perform PUSCH transmission in the corresponding slot.

In an embodiment, if some symbols of a specific slot are configured as flexible symbols F via higher layer signaling or the slot format is not configured for a specific slot; the UE has received DCI format 2_0 and the slot format indicator value is not 255 and indicates a flexible symbol F for some symbols of the slot; and the UE has received a DCI format, RAR UL grant, and successRAR indicating PUSCH, PUCCH, PRACH, or SRS in the corresponding flexible symbol, the UE may perform transmission for PUSCH, PUCCH, PRACH, or SRS within the corresponding flexible symbol in the corresponding slot.

In an embodiment, if some symbols of a specific slot are configured as flexible symbols F via higher layer signaling or the slot format is not configured for a specific slot; the UE has received DCI format 2_0 and the slot format indicator value is not 255 and indicates a flexible symbol F for some symbols of the slot; and the UE is configured to transmit PUCCH, PUSCH, or PRACH with regard to some symbols in the corresponding slot via higher layer signaling, the UE may transmit the preconfigured PUCCH, PUSCH, or PRACH only when an uplink symbol (UL) is indicated in DCI format 2_0 with regard to some symbols in the corresponding slot.

In one embodient of (3-2), a transmission beam mapping method considering a slot format during PUSCH repetitive transmission is provided.

As an embodiment of the disclosure, in the (3-2) embodiment, a transmission beam mapping method considering a slot format with regard to dynamic grant-based or a configured grant-based PUSCH repetitive transmission considering multiple TRPs will be described. Here, as in the (1-1) and (1-2) embodiments, the dynamic grant-based PUSCH repetitive transmission considering multiple TRPs denotes a case in which PUSCH repetitive transmission considering multiple TRPs is indicated based on DCI, and as in the (1-3) embodiment, the configured grant-based PUSCH repetitive transmission considering multiple TRPs denotes that higher layer configuration-based PUSCH repetitive transmission considering multiple TRPs is configured or activated/deactivated.

As described above, the UE may receive slot format information, which is configured by an uplink symbol (UL), a downlink symbol (DL), or a flexible symbol (F) with regard to some symbols in a specific slot or slots via higher layer signaling. In addition, as described above, if the UE is not configured to monitor DCI format 2_0, the UE may follow the slot format configured by higher layer signaling. Here, since the UE may recognize the semi-static slot format based on higher layer signaling without dynamically indicated additional information, the UE may recognize in advance a symbol in a slot in which PUSCH transmission is impossible with regard to dynamic grant-based or configured grant-based PUSCH repetitive transmission.

Therefore, when the UE is not configured to monitor DCI format 2_0, the UE may apply the transmission beam mapping to the actual transmitted PUSCH transmission with regard to the dynamic grant-based or configured grant-based PUSCH repetitive transmission considering multiple TRPs. Alternatively, even if the UE recognizes information on a semi-static slot format, the UE may apply transmission beam mapping to a PUSCH transmission position, obtained by considering both the actual transmitted PUSCH and the canceled PUSCH transmission. As mentioned above, dynamic grant-based PUSCH repetitive transmission considering multiple TRPs enables actual transmission of PUSCH in a flexible symbol (F) or an uplink symbol (UL), and configured grant-based PUSCH repetitive transmission considering multiple TRPs enables actual transmission of PUSCH in an uplink symbol (UL). Details will be described below with reference to FIG. 22.

In addition, as described above, if the UE is configured to monitor for DCI format 2_0, the UE may receive a slot format indicator in DCI format 2_0 and thus may receive some symbols in a specific slot or slots using uplink symbol (UL), a downlink symbol (DL), or a flexible symbol (F). Here, due to the slot format information that is dynamically indicated through DCI format 2_0 in addition to the semi-statically configured information, the UE may have a difficulty in recognizing information relating to which symbol of which slot the PUSCH transmission is impossible with regard to a dynamic grant-based or a configured grant-based PUSCH repetitive transmission.

Therefore, when the UE is configured to monitor DCI format 2_0, the UE may apply transmission beam mapping, with regard to dynamic grant-based or a configured grant-based PUSCH repetitive transmission considering multiple TRPs, to a PUSCH transmission position obtained by considering both the actual transmitted PUSCH and the canceled PUSCH transmission. Alternatively, the UE may perform transmission beam mapping to only for actual PUSCH transmission in consideration of a dynamic slot format. As mentioned above, dynamic grant-based PUSCH repetitive transmission considering multiple TRPs enables actual transmission of PUSCH in a flexible symbol (F) or an uplink symbol (UL), and configured grant-based PUSCH repetitive transmission considering multiple TRPs enables actual transmission of the PUSCH in the uplink symbol (UL). Details will be described with reference to FIG. 22.

Figure 22:
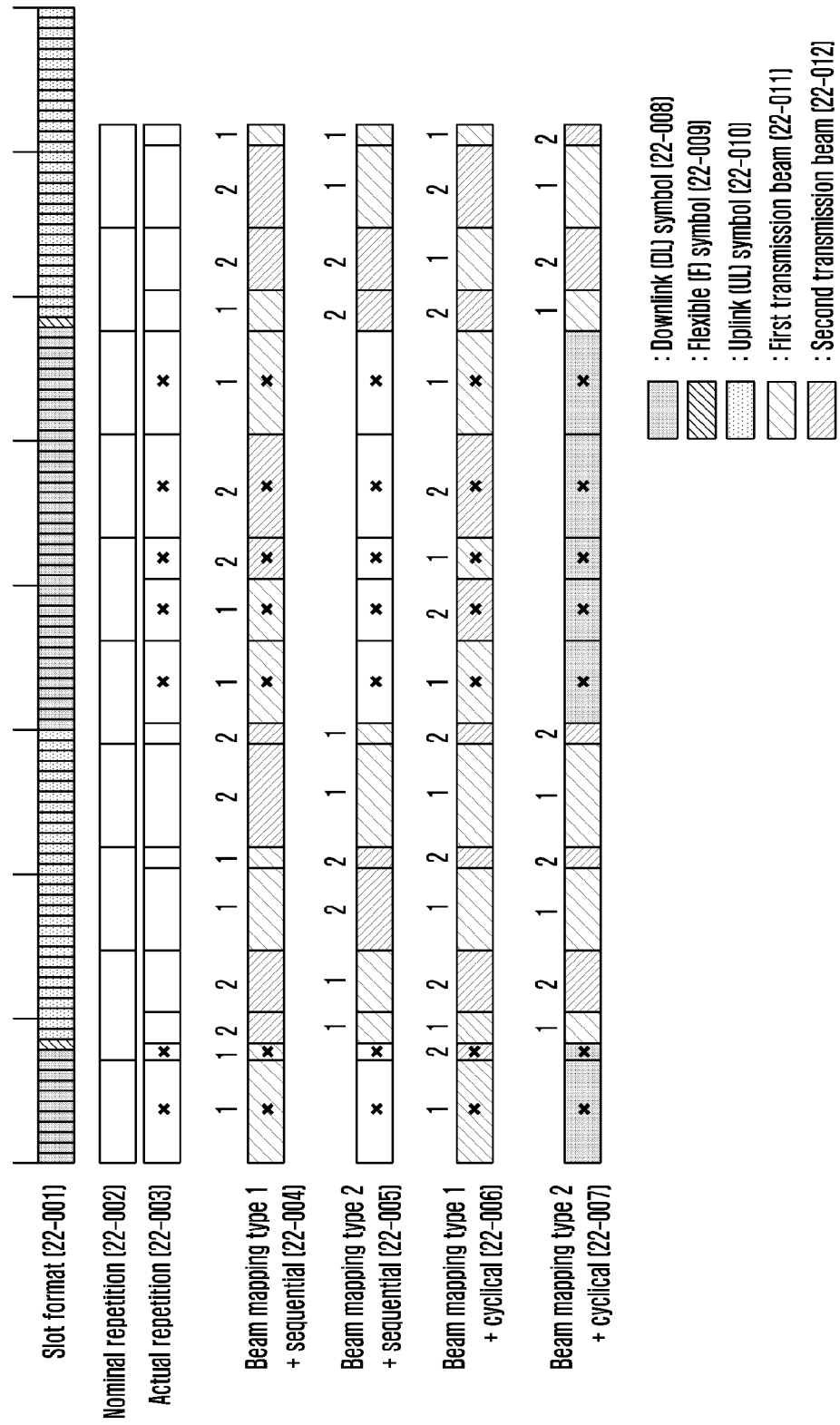
FIG. 22 illustrates various transmission beam mapping methods according to slot formats in relation with dynamic grant-based PUSCH repetitive transmission according to an embodiment of the disclosure.

FIG. 22 illustrates various transmission beam mapping methods according to slot formats with regard to dynamic grant-based PUSCH repetitive transmission according to an embodiment of the disclosure.

A slot format 22-001 of FIG. 22 may be a slot format configured by higher layer signaling, or may be a slot format in which indications through DCI format 2_0 are considered in addition to configuration via higher layer signaling. If the UE receives PUSCH repetition type B, via higher layer signaling, using a PUSCH repetitve transmission method, the number of repetitive transmissions is 10, and the number of transmission symbols per nominal repetition is 10, nominal repetition may be expressed as 22-002. Here, in consideration of a downlink (DL) symbol 22-008, a flexible (F) symbol 22-009, and the uplink (UL) symbol 22-010, the actual repetition actually transmitted during nominal repetition may be expressed as 22-003.

In this case, two transmission beam mapping types may be determined by considering a slot format. Transmission beam mapping type 1 22-004 or 22-006 is understood as performing transmission beam mapping to a PUSCH transmission position in consideration of both the actual transmitted PUSCH and the canceled PUSCH transmission, and transmission beam mapping type 2 22-005 or 22-007 is understood as performing transmission beam mapping to only the actually transmitted PUSCH transmission. Reference numerals 22-004 to 22-007 of FIG. 22 illustrates a method in which transmission beam mapping is performed according to each transmission beam mapping type and transmission beam mapping method (e.g., sequential and cyclical). Here, the transmission beam mapping unit may be actual repetition.

Figure 23A:
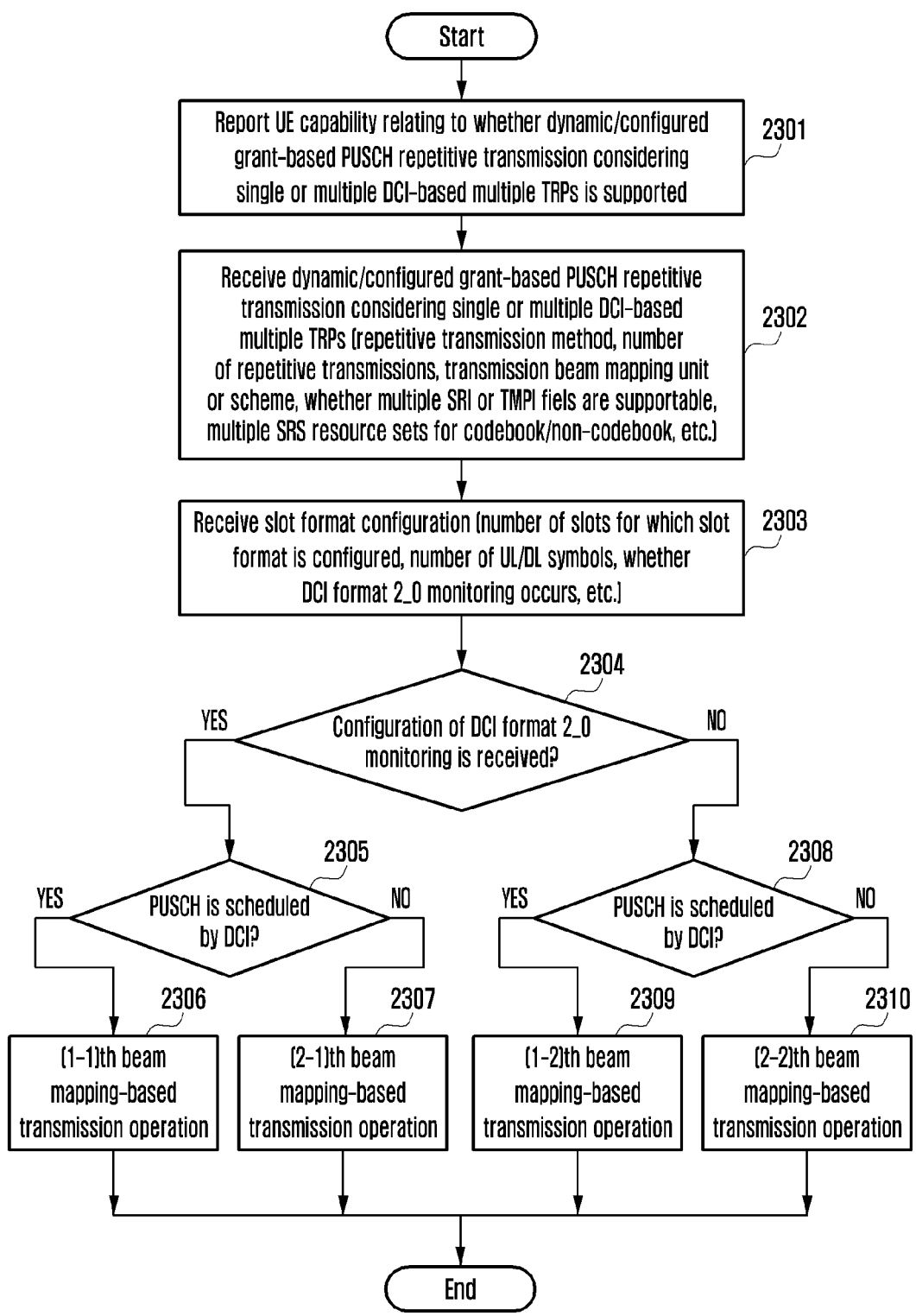
FIG. 23A illustrates a UE operation for transmission beam mapping in consideration of a slot format according to an embodiment of the disclosure.

FIG. 23A illustrates a UE operation of transmission beam mapping in consideration of a slot format according to an embodiment of the disclosure.

As described above, the UE reports, to the base station, UE capability relating to whether dynamic grant-based or configured grant-based PUSCH repetitive transmission considering single or multiple DCI-based multiple TRPs is supported (operation 2301). Thereafter, the UE receives pieces of configuration information related to dynamic grant-based or a configured grant-based PUSCH repetitive transmission considering single or multiple DCI-based multiple TRPs via higher layer signaling (operation 2302). In addition, the UE receives pieces of slot format configuration-related information via higher layer signaling (operation 2303). Depending on whether the UE is configured to monitor DCI format 2_0 (operation 2304), if the UE is configured to monitor DCI format 2_0 and is indicated to perform repetitive transmission of a PUSCH scheduled by DCI (operation 2305), the UE may perform (1-1)th beam mapping-based transmission operation 2306.

Here, the (1-1)th beam mapping-based transmission operation may be determined through a combination of the above transmission beam mapping type 1 or 2, the cyclical or sequential transmission beam mapping method, and the transmission beam mapping unit. Since the PUSCH is scheduled by DCI, PUSCH transmission may be performed in a flexible symbol (F) and an uplink (UL) symbol. If the UE receives configuration or indication of configured grant-based PUSCH transmission (operation 2305), the UE may perform (2-1)th beam mapping-based transmission operation 2307. Here, the (2-1)th beam mapping-based transmission operation may correspond to the transmission beam mapping type 1 or 2, and since it is a configured grant-based PUSCH as described above, PUSCH transmission may be performed only in uplink (UL) symbols. In addition, depending on whether the DCI format 2_0 monitoring is configured in the UE (operation 2304), if the UE is not configured to monitor the DCI format 2_0 and is indicated to perform repetitive transmission of a PUSCH scheduled by DCI (operation 2308), the UE may perform (1-2)th beam mapping-based transmission operation 2309.

Here, the (1-2)th beam mapping-based transmission operation may be determined through a combination of the above transmission beam mapping type 1 or 2, the cyclical or sequential transmission beam mapping method, and the transmission beam mapping unit. Since the PUSCH is scheduled by DCI, PUSCH transmission may be performed in a flexible symbol (F) and an uplink (UL) symbol. If the UE receives configuration or indication of configured grant-based PUSCH transmission (operation 2308), the UE may perform (2-2)th beam mapping-based transmission operation 2310. Here, the (2-2)th beam mapping-based transmission operation may be determined through a combination of the above transmission beam mapping type 1 or 2, the cyclical or sequential transmission beam mapping method, and the transmission beam mapping unit, and since it is a configured grant-based PUSCH as described above, PUSCH transmission may be performed only in uplink (UL) symbols.

Figure 23B:
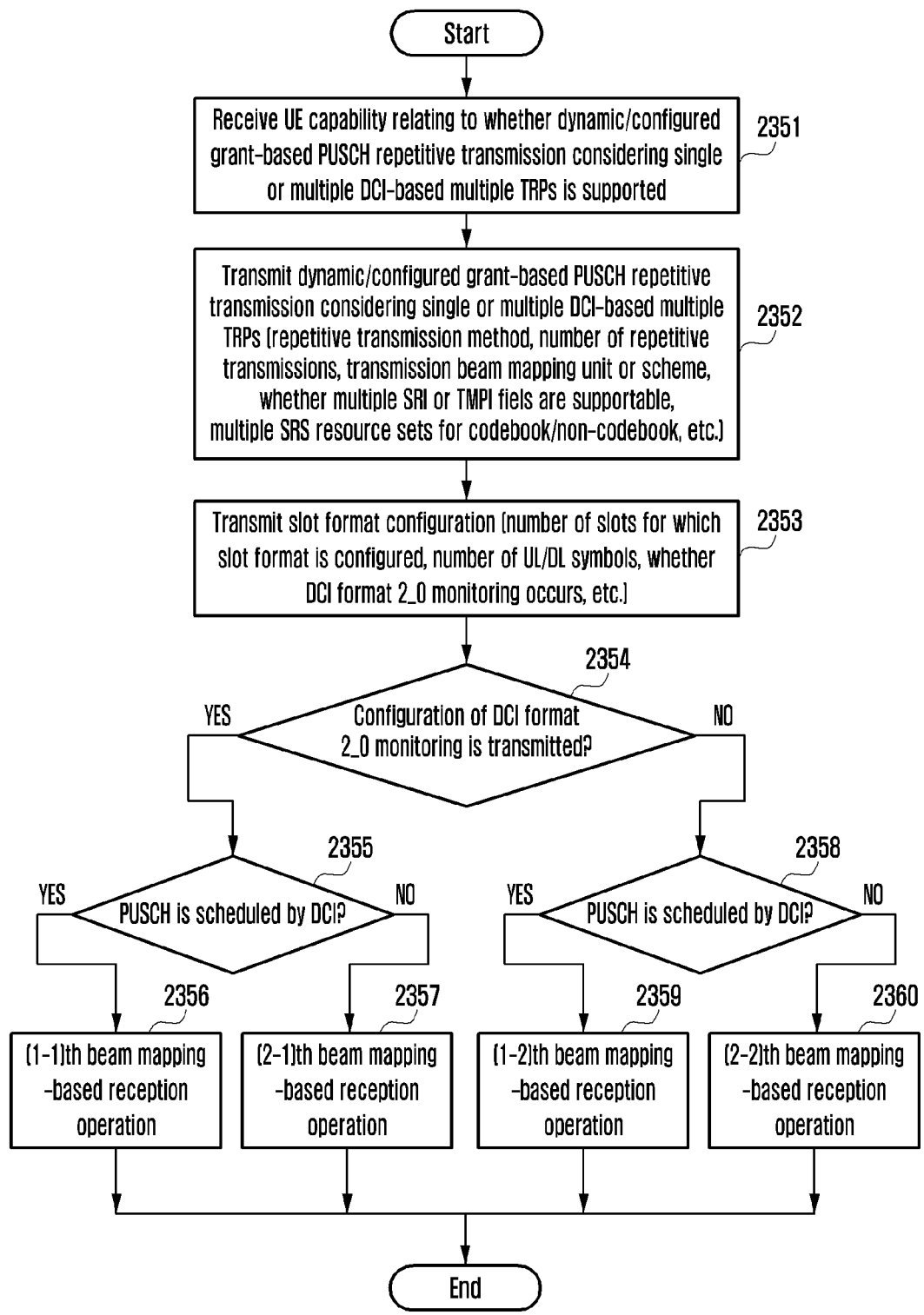
FIG. 23B illustrates a base station operation for transmission beam mapping in consideration of a slot format according to an embodiment of the disclosure.

FIG. 23B illustrates a base station operation of transmission beam mapping in consideration of a slot format according to an embodiment of the disclosure.

The base station may receive, from the UE, UE capability relating to whether dynamic grant-based or configured grant-based PUSCH repetitive transmission considering single or multiple DCI-based multiple TRPs is supported (operation 2351). Thereafter, the base station may transmit pieces of configuration information related to dynamic grant-based or a configured grant-based PUSCH repetitive transmission considering single or multiple DCI-based multiple TRPs via higher layer signaling (operation 2352). In addition, the base station may transmit pieces of slot format configuration-related information via higher layer signaling (operation 2353). Depending on whether the UE is configured to monitor DCI format 2_0 (operation 2354), if the UE is configured to monitor DCI format 2_0 and is indicated to perform repetitive transmission of a PUSCH scheduled by DCI (operation 2355), the base station may perform an operation of (1-1)th beam mapping-based reception operation 2356.

Here, the (1-1)th beam mapping-based reception operation may be determined through a combination of the above transmission beam mapping type 1 or 2, the cyclical or sequential transmission beam mapping method, and the transmission beam mapping unit. Since the PUSCH is scheduled by DCI, PUSCH reception operation may be performed in a flexible symbol (F) and an uplink (UL) symbol. If the UE receives configuration or indication of configured grant-based PUSCH transmission (operation 2355), the base station may perform (2-1)th beam mapping-based reception operation 2357. Here, the (2-1)th beam mapping-based reception operation may correspond to the transmission beam mapping type 1 or 2, and since it is a configured grant-based PUSCH as described above, PUSCH reception operation may be performed only in uplink (UL) symbols.

In addition, depending on whether the DCI format 2_0 monitoring is configured in the UE (operation 2354), if the UE is not configured to monitor the DCI format 2_0 and is indicated to perform repetitive transmission of a PUSCH scheduled by DCI (operation 2358), the base station may perform (1-2)th beam mapping-based reception operation 2359. Here, the (1-2)th beam mapping-based reception operation may be determined through a combination of the above transmission beam mapping type 1 or 2, the cyclical or sequential transmission beam mapping method, and the transmission beam mapping unit.

Since the PUSCH is scheduled by DCI, PUSCH reception operation may be performed in a flexible symbol (F) and an uplink (UL) symbol. If the UE receives configuration or indication of configured grant-based PUSCH transmission (operation 2358), the base station may perform (2-2)th beam mapping-based reception operation 2360. Here, the (2-2)th beam mapping-based reception operation may be determined through a combination of the above transmission beam mapping type 1 or 2, the cyclical or sequential transmission beam mapping method, and the transmission beam mapping unit, and since it is a configured grant-based PUSCH as described above, an oepration of receiving PUSCH, which is transmitted only in uplink (UL) symbols, may be performed.

Figure 24:
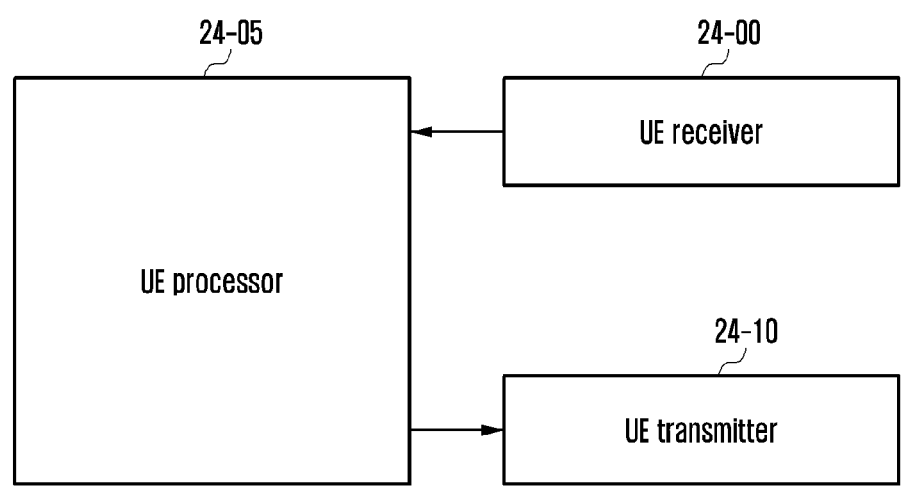
FIG. 24 illustrates a structure of a UE in a wireless communication system according to an embodiment of the disclosure.

FIG. 24 illustrates a structure of a UE in a wireless communication system according to an embodiment of the disclosure.

Referring to FIG. 24, the UE may include a transceiver which refers to a UE receiver 24-00 and the UE transmitter 24-10, a memory (not shown), and a UE processor 24-05 (or UE controller or processor). According to the communication method of the UE described above, the transceiver 24-00 and 24-10, the memory, and the UE processor 24-05 of the UE may operate. However, the elements of the UE are not limited to the above-described example. For example, the UE may include more or fewer elements than the described elements. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only an embodiment of the transceiver, and elements of the transceiver are not limited to the RF transmitter and the RF receiver.

In addition, the transceiver may receive a signal through a wireless channel and output the received signal to the processor, and may transmit a signal, which is output from the processor, through the wireless channel.

The memory may store programs and data necessary for the operation of the UE. In addition, the memory may store control information or data included in a signal transmitted or received by the UE. The memory may be configured by storage media such as ROM, RAM, hard disk, CD-ROM, and DVD or a combination thereof. In addition, multiple memories may exist.

In addition, the processor may control a series of processes to enable the UE to be operated according to the above-described embodiment. For example, the processor may receive DCI configured by two layers and control the elements of the UE to receive multiple PDSCHs at the same time. There may be multiple processors, and the processors may execute a program stored in the memory to perform an operation of controlling the elements of the UE.

Figure 25:
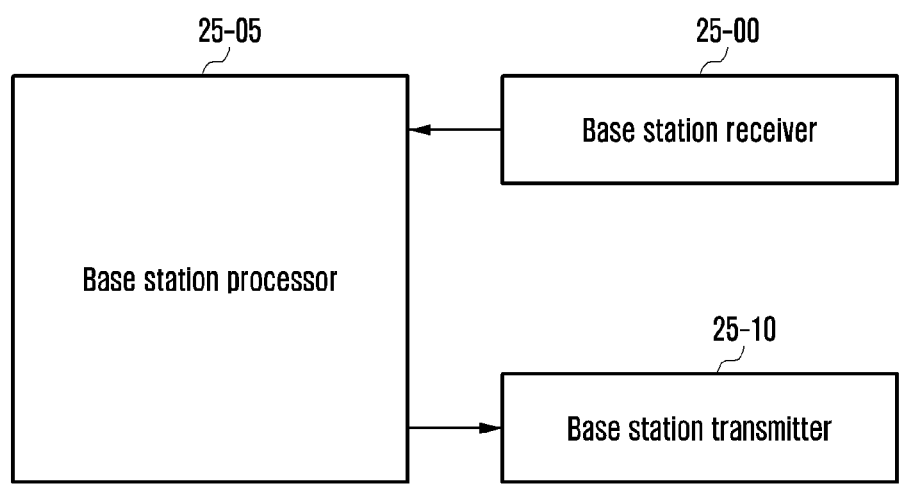
FIG. 25 illustrates a structure of a base station in a wireless communication system according to an embodiment of the disclosure.

FIG. 25 illustrates a structure of a base station in a wireless communication system according to an embodiment of the disclosure.

Referring to FIG. 25, the base station may include a transceiver which refers to a base station receiver 25-00 and the base station transmitter 25-10, a memory (not shown), and a base station processor 25-05 (or base station controller or processor). According to the communication method of the base station described above, the transceiver 25-00 and 25-10, the memory, and the base station processor 25-05 of the base station may operate. However, the elements of the base station are not limited to the above-described example. For example, the base station may include more or fewer elements than the described elements. In addition, the transceiver, the memory, and the processor may be implemented in the form of one chip.

The transceiver may transmit/receive a signal to/from the UE. Here, the signal may include control information and data. To this end, the transceiver may include an RF transmitter for up-converting and amplifying a frequency of a transmitted signal, and an RF receiver for low-noise amplifying and down-converting a received signal. However, this is only an embodiment of the transceiver, and elements of the transceiver are not limited to the RF transmitter and the RF receiver.

In addition, the transceiver may receive a signal through a wireless channel and output the received signal to the processor, and may transmit a signal, which is output from the processor, through the wireless channel.

The memory may store programs and data necessary for the operation of the base station. In addition, the memory may store control information or data included in a signal transmitted or received by the base station. The memory may be configured by storage media such as ROM, RAM, hard disk, CD-ROM, and DVD or a combination thereof. In addition, multiple memories may exist.

In addition, the processor may control a series of processes to enable the base station to operate according to the above-described embodiment. For example, the processor may configure DCI of two layers including allocation information regarding multiple PDSCHs and control each element of the base station to transmit the DCT. There may be multiple processors, and the processors may execute a program stored in the memory to perform an operation of controlling the elements of the base station.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a base station and a terminal. As an example, embodiment 1 and 2 of the disclosure may be combined with each other to operate a base station and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, via higher layer signaling, a physical uplink shared channel (PUSCH) configuration including information on PUSCH repetition and a sounding reference signal (SRS) configuration including information on a first SRS resource set and information on a second SRS resource set, wherein the first SRS resource set and the second SRS resource set respectively include one or more at least one SRS resource;
   receiving a downlink control information (DCI) format including an SRS resource set indicator field with 2 bits, a first SRS resource indicator field and a second SRS resource indicator field, wherein codepoints of the SRS resource set indicator field are mapped to associations of the first SRS resource set and the second SRS resource set to the PUSCH repetition; and
   transmitting the PUSCH repetition by applying at least one of the first SRS resource indicator field or the second SRS resource indicator field according to at least one of the first SRS resource set or the second SRS resource set that is identified as associated with the PUSCH repetition based on the SRS resource set indicator field.

2. The method of claim 1, wherein:
   in case that the SRS resource set indicator field indicates a first codepoint, the first SRS resource set is associated with the PUSCH repetition,
   in case that the SRS resource set indicator field indicates a second codepoint, the second SRS resource set is associated with the PUSCH repetition,
   in case that the SRS resource set indicator field indicates a third codepoint, the first SRS resource set and the second SRS resource set are associated with the PUSCH repetition according to a mapping pattern for the PUSCH repetition, and
   in case that the SRS resource set indicator field indicates a fourth codepoint, the second SRS resource set and the first SRS resource set are associated with the PUSCH repetition according to the mapping pattern for the PUSCH repetition.

3. The method of claim 2, wherein:
   in case that the mapping pattern is configured as a cyclic mapping and the SRS resource set indicator field indicates the third codepoint, the first SRS resource set is applied to a first PUSCH of the PUSCH repetition and the second SRS resource set is applied to a second PUSCH of the PUSCH repetition,
   in case that the mapping pattern is configured as a sequential mapping and the SRS resource set indicator field indicates the third codepoint, the first SRS resource set is applied to the first and the second PUSCH of the PUSCH repetition and the second SRS resource set is applied to a third and a fourth PUSCH of the PUSCH repetition,
   in case that the mapping pattern is configured as the cyclic mapping and the SRS resource set indicator field indicates the fourth codepoint, the first SRS resource set is applied to the second PUSCH of the PUSCH repetition and the second SRS resource set is applied to the first PUSCH of the PUSCH repetition, and
   in case that the mapping pattern is configured as the sequential mapping and the SRS resource set indicator field indicates the fourth codepoint, the first SRS resource set is applied to the third and the fourth PUSCH of the PUSCH repetition and the second SRS resource set is applied to the first and the second PUSCH of the PUSCH repetition.

4. The method of claim 2, wherein:
   in case that the SRS resource set indicator field indicates the first codepoint, the first SRS resource indicator field being is associated with the first SRS resource set,
   in case that the SRS resource set indicator field indicates the second codepoint, the first SRS resource indicator field being is associated with the second SRS resource set,
   in case that the SRS resource set indicator field indicates the third codepoint, the first SRS resource indicator field is associated with the first SRS resource set and the second SRS resource indicator field is associated with the second SRS resource set, and
   in case that the SRS resource set indicator field indicates the fourth codepoint, the first SRS resource indicator field is associated with the first SRS resource set and the second SRS resource indicator field is associated with the second SRS resource set.

5. The method of claim 2, wherein information to configure one of a non-codebook based transmission or a codebook based transmission for the PUSCH repetition is received via the higher layer signaling,
   wherein in case that the codebook based transmission is configured for the PUSCH repetition, the DCI further includes a first precoding information field, and a second precoding information field, wherein a number of bits of the second precoding information field depends on a maximum number of transmission precoding matrix indicators (TPMIs) per layer associated with the first precoding information field,
   wherein in case that the SRS resource set indicator field indicates the first codepoint, the first SRS resource indicator field and the first precoding information field are associated with the first SRS resource set,
   wherein in case that the SRS resource set indicator field indicates the second codepoint, the first SRS resource indicator field and the first precoding information field are associated with the second SRS resource set,
   wherein in case that the SRS resource set indicator field indicates the third codepoint, the first SRS resource indicator field and the first precoding information field are associated with the first SRS resource set and the second SRS resource indicator field and the second precoding information field are associated with the second SRS resource set, and
   wherein in case that the SRS resource set indicator field indicates the fourth codepoint, the first SRS resource indicator field and the first precoding information field are associated with the first SRS resource set and the second SRS resource indicator field and the second precoding information field are associated with the second SRS resource set.

6. A terminal in a communication system, the terminal comprising:
   a transceiver; and
   a processor coupled with the transceiver and configured to:
   receive, via higher layer signaling, a physical uplink shared channel (PUSCH) configuration including information on PUSCH repetition and a sounding reference signal (SRS) configuration including information on a first SRS resource set and information on a second SRS resource set, wherein the first SRS resource set and the second SRS resource set respectively include at least one SRS resource,
   receive a downlink control information (DCI) format including an SRS resource set indicator field with 2 bits, a first SRS resource indicator field and a second SRS resource indicator field, wherein codepoints of the SRS resource set indicator field are mapped to associations of the first SRS resource set and the second SRS resource set to the PUSCH repetition, and
   transmit the PUSCH repetition by applying at least one of the first SRS resource indicator field or the second SRS resource indicator field according to at least one of the first SRS resource set or the second SRS resource set that is identified as associated with the PUSCH repetition based on the SRS resource set indicator field.

7. The terminal of claim 6, wherein:
   in case that the SRS resource set indicator field indicates a first codepoint, the first SRS resource set is associated with the PUSCH repetition,
   in case that the SRS resource set indicator field indicates a second codepoint, the second SRS resource set is associated with the PUSCH repetition,
   in case that the SRS resource set indicator field indicates a third codepoint, the first SRS resource set and the second SRS resource set are associated with the PUSCH repetition according to a mapping pattern for the PUSCH repetition, and
   in case that the SRS resource set indicator field indicates a fourth codepoint, the second SRS resource set and the first SRS resource set are associated with the PUSCH repetition according to the mapping pattern for the PUSCH repetition.

8. The terminal of claim 7, wherein:
   in case that the mapping pattern is configured as a cyclic mapping and the SRS resource set indicator field indicates the third codepoint, the first SRS resource set is applied to a first PUSCH of the PUSCH repetition and the second SRS resource set is applied to a second PUSCH of the PUSCH repetition,
   in case that the mapping pattern is configured as a sequential mapping and the SRS resource set indicator field indicates the third codepoint, the first SRS resource set is applied to the first and the second PUSCH of the PUSCH repetition and the second SRS resource set is applied to a third and a fourth PUSCH of the PUSCH repetition,
   in case that the mapping pattern is configured as the cyclic mapping and the SRS resource set indicator field indicates the fourth codepoint, the first SRS resource set is applied to the second PUSCH of the PUSCH repetition and the second SRS resource set is applied to the first PUSCH of the PUSCH repetition, and
   in case that the mapping pattern is configured as the sequential mapping and the SRS resource set indicator field indicates the fourth codepoint, the first SRS resource set is applied to the third and the fourth PUSCH of the PUSCH repetition and the second SRS resource set is applied to the first and the second PUSCH of the PUSCH repetition.

9. The terminal of claim 7, wherein:
   in case that the SRS resource set indicator field indicates the first codepoint, the first SRS resource indicator field is associated with the first SRS resource set,
   in case that the SRS resource set indicator field indicates the second codepoint, the first SRS resource indicator field is associated with the second SRS resource set,
   in case that the SRS resource set indicator field indicates the third codepoint, the first SRS resource indicator field is associated with the first SRS resource set and the second SRS resource indicator field is associated with the second SRS resource set, and
   in case that the SRS resource set indicator field indicates the fourth codepoint, the first SRS resource indicator field is associated with the first SRS resource set and the second SRS resource indicator field is associated with the second SRS resource set.

10. The terminal of claim 7,
    wherein information to configure one of a non-codebook based transmission or a codebook based transmission for the PUSCH repetition is received via the higher layer signaling,
    wherein in case that the codebook based transmission is configured for the PUSCH repetition, the DCI further includes a first precoding information field, and a second precoding information field, wherein a number of bits of the second precoding information field depends on a maximum number of transmission precoding matrix indicators (TPMIs) per layer associated with the first precoding information field,
    wherein in case that the SRS resource set indicator field indicates the first codepoint, the first SRS resource indicator field and the first precoding information field are associated with the first SRS resource set,
    wherein in case that the SRS resource set indicator field indicates the second codepoint, the first SRS resource indicator field and the first precoding information field are associated with the second SRS resource set,
    wherein in case that the SRS resource set indicator field indicates the third codepoint, the first SRS resource indicator field and the first precoding information field are associated with the first SRS resource set and the second SRS resource indicator field and the second precoding information field are associated with the second SRS resource set, and
    wherein in case that the SRS resource set indicator field indicates the fourth codepoint, the first SRS resource indicator field and the first precoding information field are associated with the first SRS resource set and the second SRS resource indicator field and the second precoding information field are associated with the second SRS resource set.

* * * * *